United States Patent [19]
Khudenko

[11] Patent Number: 6,015,496
[45] Date of Patent: Jan. 18, 2000

[54] IN-SEWER TREATMENT OF WASTEWATER AND SLUDGES

[76] Inventor: Boris M. Khudenko, 744 Moores Mill Rd., Atlanta, Ga. 30327

[21] Appl. No.: 08/824,608

[22] Filed: Mar. 26, 1997

Related U.S. Application Data

[63] Continuation-in-part of application No. 08/532,606, Oct. 12, 1995, Pat. No. 5,616,241, which is a continuation-in-part of application No. 08/181,387, Jan. 13, 1994, Pat. No. 5,514,278, which is a continuation-in-part of application No. 08/102,618, Aug. 5, 1993, Pat. No. 5,514,277, which is a continuation-in-part of application No. 08/046,788, Apr. 12, 1993, abandoned.

[51] Int. Cl.[7] ........................................................ C02F 3/12
[52] U.S. Cl. .......................... 210/603; 210/624; 210/630; 210/747
[58] Field of Search .................... 210/603, 605, 210/607, 624, 630, 747, 170, 608, 609, 612–614, 622, 623, 625, 626, 627, 628, 629, 631, 610, 611

[56] References Cited

U.S. PATENT DOCUMENTS

| | | | |
|---|---|---|---|
| 4,042,494 | 8/1977 | Stoyer | 210/7 |
| 4,115,258 | 9/1978 | Smith et al. | 210/15 |
| 4,169,048 | 9/1979 | Albers, Sr. | 210/603 |
| 4,469,596 | 9/1984 | Kantor | 210/137 |
| 4,514,297 | 4/1985 | Engvist | 210/603 |
| 4,824,563 | 4/1989 | Iwahori et al. | 210/195 |
| 4,857,198 | 8/1989 | Meidl | 210/603 |
| 4,925,564 | 5/1990 | Francis | 210/608 |
| 4,999,111 | 3/1991 | Williamson | 210/624 |
| 5,114,586 | 5/1992 | Humphrey | 210/606 |
| 5,141,647 | 8/1992 | Bhadra | 210/620 |
| 5,160,043 | 11/1992 | Kos | 210/605 |
| 5,213,681 | 5/1993 | Kos | 210/605 |
| 5,246,585 | 9/1993 | Meiring | 210/605 |
| 5,288,405 | 2/1994 | Lamb, III | 210/625 |
| 5,462,666 | 10/1995 | Kimmel | 210/602 |
| 5,578,211 | 11/1996 | Dickerson | 210/630 |
| 5,670,047 | 9/1997 | Burke | 210/603 |
| 5,788,841 | 8/1998 | Dickerson | 210/610 |

*Primary Examiner*—Thomas G. Wyse
*Attorney, Agent, or Firm*—Needle & Rosenberg, P.C.

[57] ABSTRACT

A method and apparatus for in-sewer wastewater treatment comprising steps of largely spontaneously growing acidogenic bacteria in sewer lines and providing methanogenic bacteria in these lines. Methanogenic bacteria can be grown using wastewater, solid, or other waste, or other organic feedstock as a substrate. Methanogenic bacteria can be cultivated at a wastewater treatment plant or at other locations in special reactors, or provided from anaerobic wastewater pretreatment plants. Digestion gases can be either vented out or collected and used.

20 Claims, 31 Drawing Sheets

FIG. 1

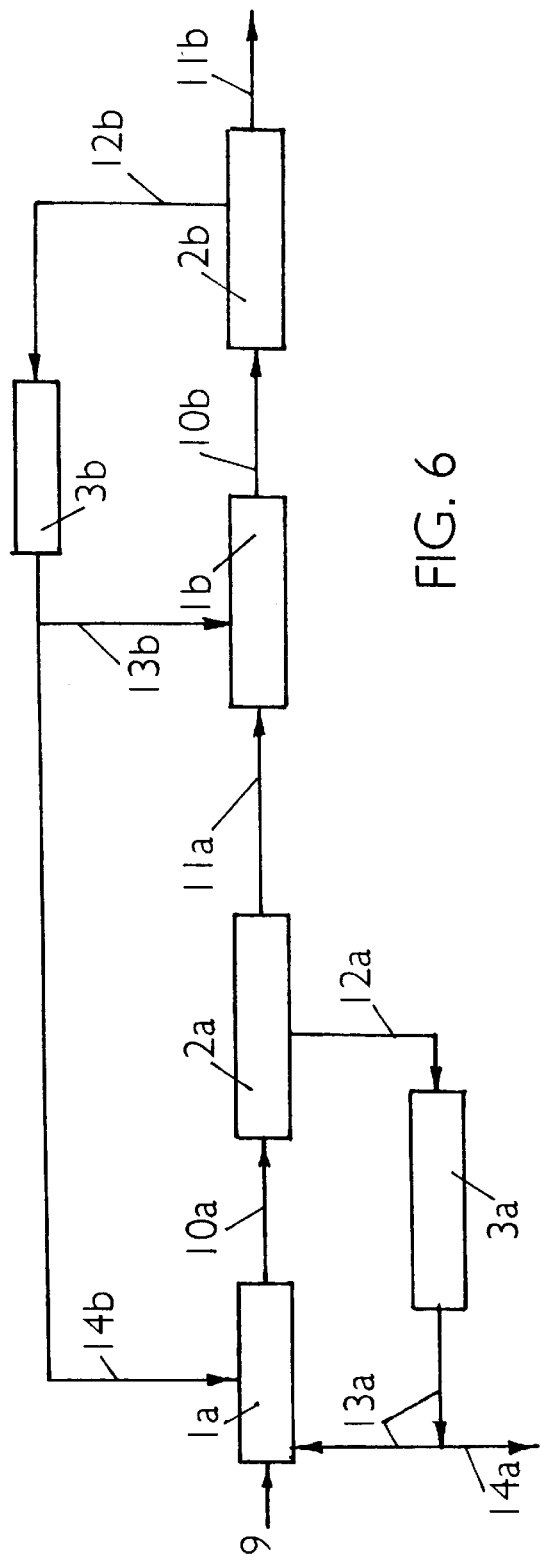
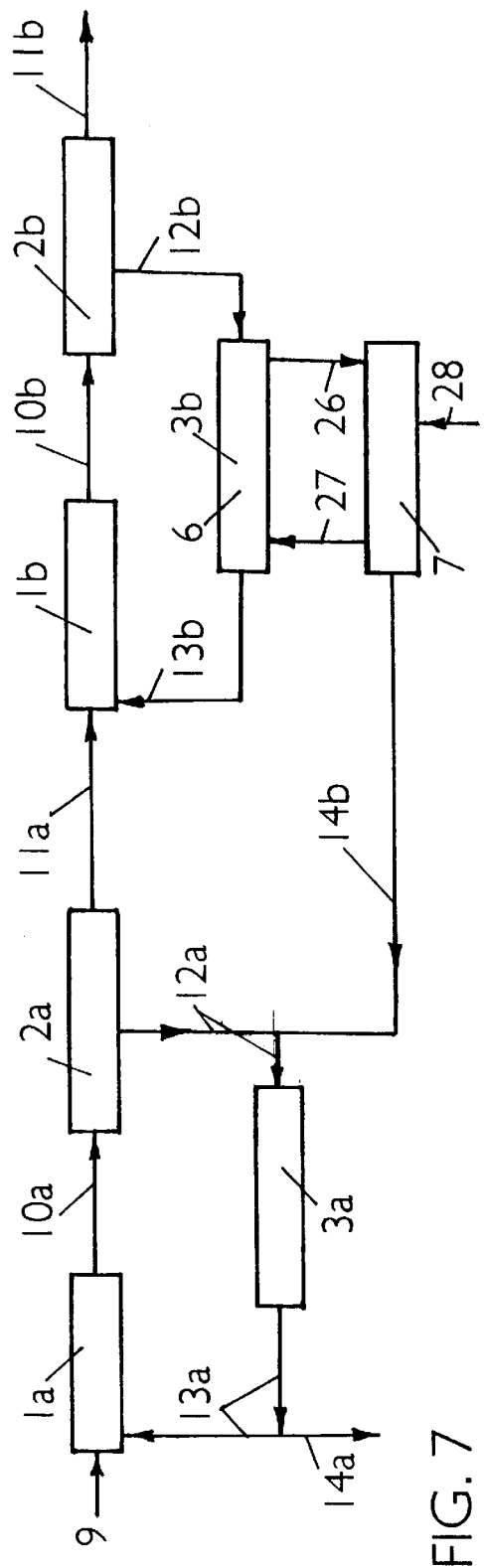
FIG. 6
FIG. 7

FIG. 18
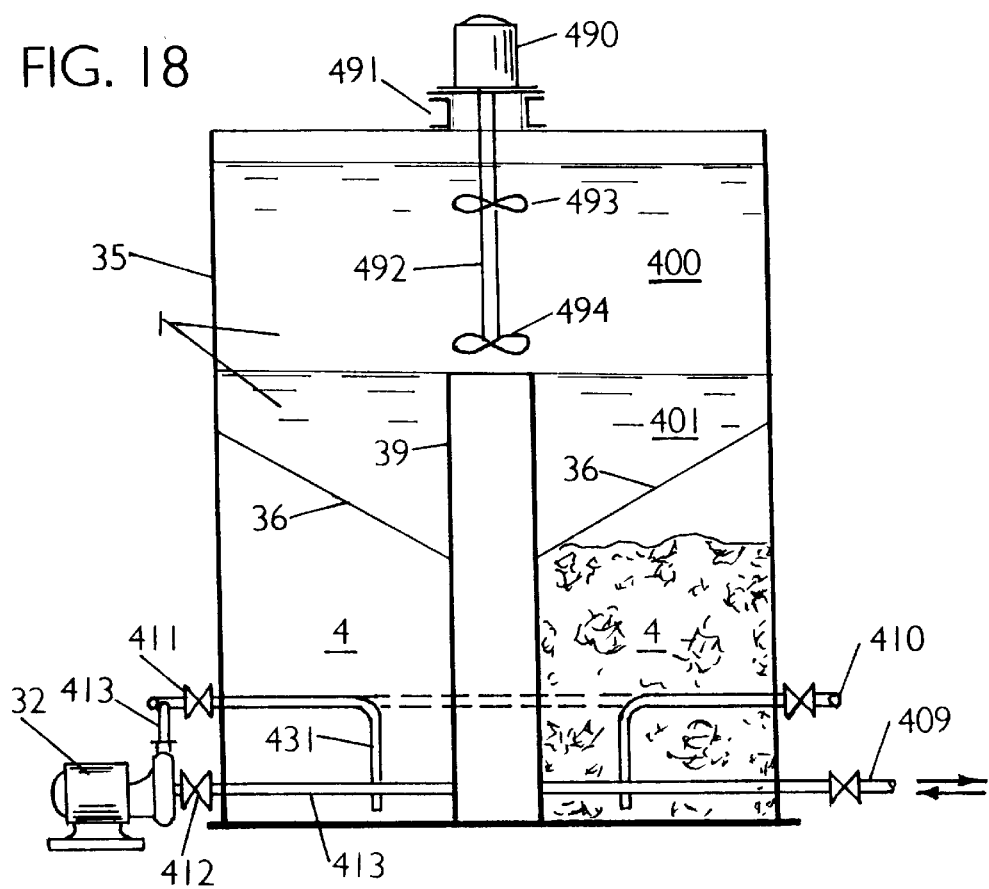
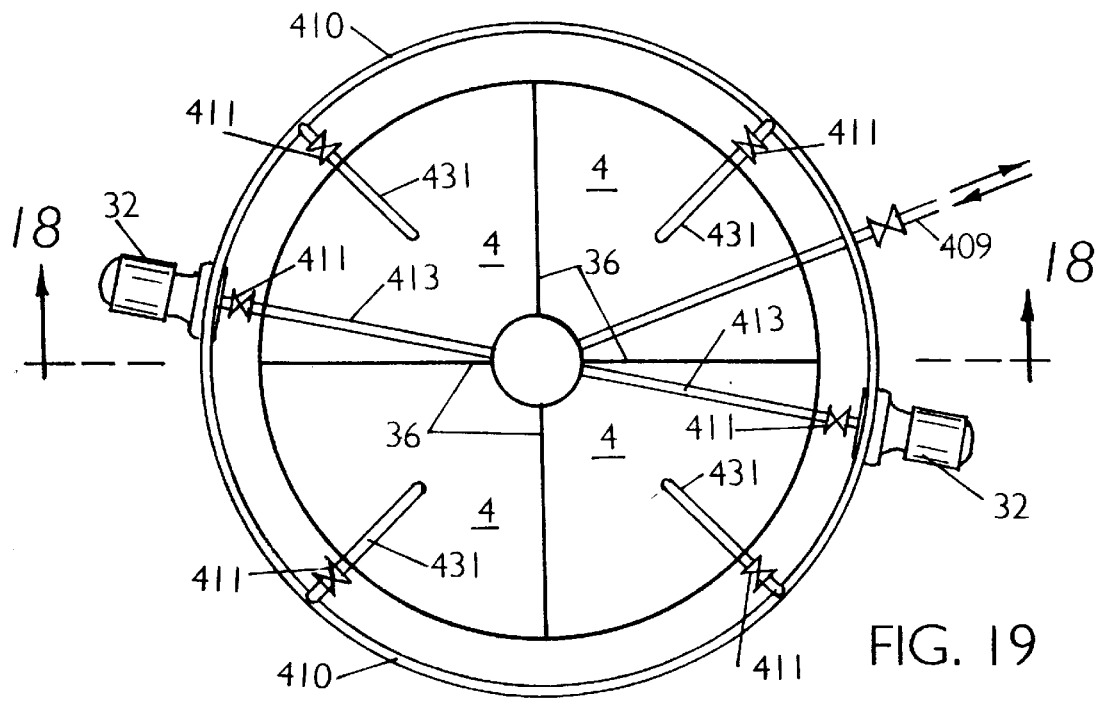
FIG. 19

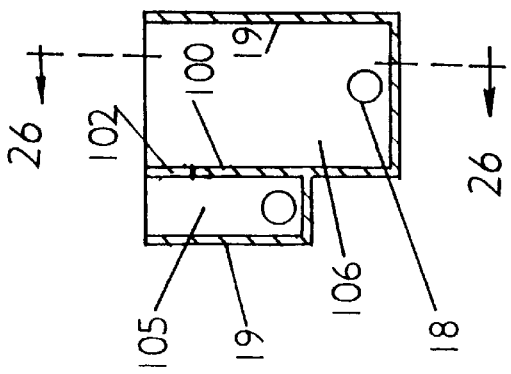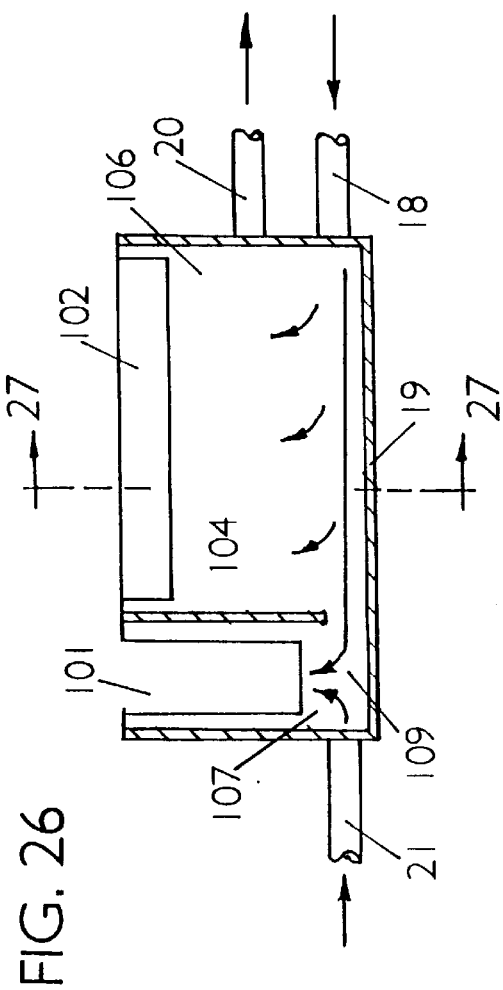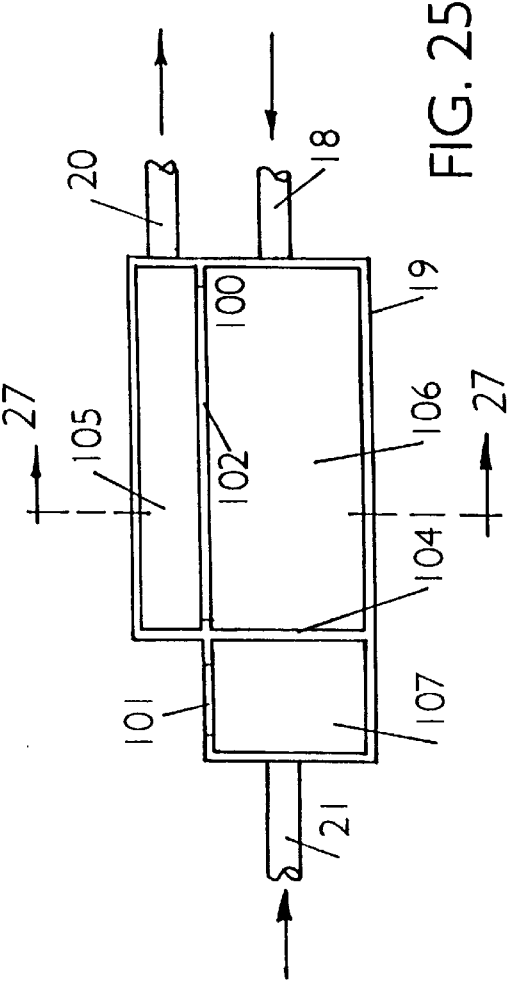

IN-SEWER TREATMENT OF WASTEWATER AND SLUDGES

This application is a continuation-in-part of Ser. No. 08/532,606, filed Oct. 12, 1995, now U.S. Pat. No. 5,616, 241, issued Apr. 1, 1997, which is a continuation-in-part of Ser. No. 08/181,387 filed Jan. 13, 1994, now U.S. Pat. No. 5,514,278, issued May 7, 1996, which is a continuation-in-part of Ser. No. 08/102,618, filed Aug. 5, 1993, now U.S. Pat. No. 5,514,277, issued May 7, 1996, which is a continuation-in-part of Ser. No. 08/046,788, filed Apr. 12, 1993, now abandoned.

BACKGROUND OF INVENTION

1. Field of Invention

This Invention relates to biological treament of Wastewater within sewer pipes, particularly by the use of the acidogenic bacteria growing in the sewer lines and by providing in these lines the conditioned sludge enriched in in other bacteria types.

2. Description of the Prior Art

Many biological technologies have been first applied to the wastewater treatment, and later used in other applications, sometimes related to environmental technologies, wastewater management and treatment methods and apparatuses are described in literature, for example, in the following sources:

*Water and Wastewater Engineering*, Vols 1 and 2 by Gordon Maskew Fair, John Charles Geyer and Daniel Alexander Okun, John Wiley & Sons, 1958;

*Biological Waste Treatment*, by Wesley W. Eckenfelder and Donald J. O'Connor, Pergamon Press, 1961;

*Water Preparation for Industrial and Public Water Supplies*, by A. A. Kastalsky and D. M. Mints, Publishing House Higher Education, Moscow, 1962 (Russian);

*Treatment of Natural Waters*, by V. A. Klyachko and I. E. Apeltsin, Publishing House Stroyizdat, Moscow, 1971 (Russian);

*Physical Chemical Processes*, by Walter J. Weber, Wiley-Interscience, New York, 1971;

"Anaerobic Waste Treatment Fundamentals", by Perry L. McCarty, Public Works, pp.107–112, September 1974, pp. 123–126, October 1974, pp 91–94, November 1974, pp. 95–99, December 1974;

*Biochemical Treatment of Wastewater from Organic Chemicals Manufacturing*, by F. V. Porutsky, Moskow, Publishing House Khimia, 1975 (Russian);

*Chemistry for Environmental Engineering*, by Clair N. Sawyer and Perry L. McCarty, McGraw-Hill, 1978;

Metcalf & Eddy's *Wastewater Engineering*, Vols 1 and 2, Edited by George Tchobanoglous, McGraw-Hill, 1979;

*Biological Process Design* by Larry D. Benefield and Clifford W. Randall, Prentice Hall, 1980;

*Water Chemistry* by Vernon L. Snoeyink and David Jenkins, John Wiley & Sons, 1980;

*Biological Wastewater Treatment* by C. P. Leslie Grady and Henry C. Lim, Marcel Dekker, Inc., 1980;

*Low-Maintenance. Mechanically Simple Wastewater Treatment Systems* by Linvil G. Rich, McGraw-Hill Book Company, 1980;

*Biochemical Processes in Wastewater Treatment* by S. V. Yakovlev and T. A. Karyukhina, Stroyizdat, Moscow, 1980 (Russian);

*Handbook on Design of Wastewater Treatment Systems*, Edited by V. N. Samokhin and Boris M. Khudenko, Allerton Press, New York, 1986;

*Treatment of Wastewater Sludaes* by I. S. Turovskyi, Stroyizdat, Moscow, 1988 (Russian);

*Utilization of Wastewater Sludges* by A. Z. Evilevich and M. A. Evilevich, Stroyizdat, Sankt Peterburg, 1988;

*Industrial Water and Wastewater Systems* by S. V. Yakovlev, Ya. A. Karelin, Yu. M. Laskov, Yu. V. Vorononv, Publishing House Stroyizdat, Moscow, 1990 (Russian);

*Design of Anaerobic Processes for the Treatment of Industrial and Municipal Wastes* Edited by Joseph F. Malina and Frederick G. Pohland, Technomic Publishing Co., 1992.

Various fundamental and practical aspects of the relevant water and wastewater management and treatment processes are described in the above listed sources. These data are also applicable to other processes, for example, conversion of solid and liquid waste and other materials into biogas and biological fertilizers and soil augmentation substances.

The generally accepted wastewater management method comprises steps of collecting wastewater in a system of pipes and channels, transporting it by these pipes and channels to a treatment works, treating it at the said treatment works, discharging the treated effluent into natural bodies of water or on land, or reusing it for water supplies.

The existing wastewater management systems have the following disadvantages:

1. Under anaerobic conditions in the collection pipelines, wastewater in the bulk flow becomes acidified. Volatile and nonvolatile fatty acids are formed, and sulfates are substantially reduced to sulfides, while fatty acids are partially converted to methane. At the gas-water interface in the pipes, sulfuric acid is formed. Therefore, the processes in pipelines can only cause the formation of odorous, poisonous, ignitable and explosive gases, and corrosion of pipes. Similar problems occur at the front end of wastewater treatment plant. Sometimes odor problems may become severe.

Several methods for controlling anaerobic processes in the sewer networks have been used: providing oxidative environment, for example by ventilation of the pipes with air, or by addition of other oxidants; by depressing the growth of sulfate reducing organisms with chemicals effecting specific biochemical steps; or, by raising wastewater pH. All such measures add to the cost of wastewater management and are not focused on wastewater treatment.

2. The wastewater treatment systems are complex, energy demanding, and expensive to build and operate. Improvements to the wastewater treatment facilities is an ongoing process; however, these improvements are separate from the improvements in the collection and separation networks.

Several modifications of wastewater treatment processes have been developed: 1. aerobic (activated sludge process, lagoon systems, and biofiltration), 2. anaerobic (various attached and suspended growth processes), and 3. coupled anaerobic-aerobic systems. Modern biological treatment systems are used for removal of organics and suspended solids, and for control of nutrients. However, these processes do not achieve thorough removal of organics, especially when measured in COD or TOC units, and removals of nitrogen and phosphorous are marginal. The prior art technologies do not provide controls over the balances of organics, nutrients, biomass, and other constituents of wastewater. In suspended growth aerobic systems, sludge recycle from the final sludge separator to the head of the treatment process is provided. These systems often incorporate several functional zones, usually called anaerobic (nonaerated, preferably, with low nitrate and nitrite in the feed), anoxic (nonaerated, nitrite and nitrate present in the feed water) and aerobic (aerated, dissolved oxygen present in the water, nitrification occurs). Mixed liquor is recycled from downstream zones to upstream zones and the separated activated sludge is recycled from the final clarifier to the head of the process. A so-called single sludge is cultivated in all these zones. This is predominantly aerobic sludge. It includes very few strictly anaerobic organisms. Facultative anaerobic organisms develop in the nonaerated zone; therefore, the nonaerated zone in these systems should be more properly called the facultative zone. This term will be used in this application. The sludge recycle from the final clarifier is intended mainly for controlling the average sludge age, or average for the system food to microorganism (F/M) ratio. The upstream facultative zone serves to control the filamentous growth (selector zone) and to release phosphorous for, as believed, its improved uptake in the aerobic zone. The facultatively anaerobic organisms are circulated with the sludge throughout the system. Anoxic zones are used for denitrification: the biological reduction of nitrites and nitrates formed in the aerobic zone and directed to the anoxic zone with the mixed liquor. These systems are used for treatment of municipal and low to moderately strong industrial wastewater. Examples of these systems are described in U.S. Pat. No. 3,964,998 and U.S. Pat. No. 4,867,883. The disadvantages of such systems include the following:

single predominantly aerobic sludge is formed in the system, such sludge having a poor diversity of species and a narrow range of oxidation-reduction and biodegradation ability;

process can be used only for dilute to moderately strong wastewater;

sludge concentration along the process train and along major process zones is almost uniform;

FIM ratio in various process zones varies drastically;

in the downstream sections, the wastewater concentrations are low, while the sludge concentration is about the same as upstream; accordingly, sludge dies off from lack of food, releasing nitrogen, phosphorus, and organics back into the water;

sludge generation by mass and volume is high, so the sludge disposal costs are high;

sludge age is high and so is the corresponding degree of sludge stabilization;

at high sludge stabilization, the content of organics anaerobically convertible to methane is low and Eso is the sludge mass and volume reduction in this conversion;

degradation of soluble organics is poor due to limited oxidation-reduction potential (OPR) range, especially xenobiotic, recalcitrant or poorly degradable organics (halogenated, and others);

usually, the SS content in the influent to the ASP process is limited by about 100 mg/l, otherwise removal of suspended solids is poor;

process stability in response to dynamic overloading and toxic shocks is low;

volatile organics may be emitted to the air in facultative, anoxic and aeration sections.

Anaerobic treatment of wastewater and wastewater sludges is well known in the art. In the past this technology was used mainly for sludge digestion and for simplified treatment of small wastewater streams in septic tanks. Recently, the anaerobic method has been applied to treat larger flows of a more concentrated industrial wastewater, primarily in the food and beverage industries. These more recent applications have revealed general advantages and disadvantages of anaerobic treatment methods. Additionally, fundamental research has been conducted on treatment of more complex wastewater, including industrial wastewater samples and imitations thereof with poorly degradable and toxic organics. This research demonstrated additional capabilities, advantages and problems associated with anaerobic processes. The present status of anaerobic treatment technologies is very thoroughly described in a recent book, *Design of Anaerobic Processes for the Treatment of Industrial and Municipal Wastes*, edited by J. F. Malina and F. G. Pohland, Technomic Publishing Inc., 1992. Additionally, in 1992–1993 the applicant conducted a study of anaerobic treatment of a complex wastewater, which is used in this application to demonstrate advantages of the new and improved method.

Two major anaerobic treatment methods were developed in the past: (1) attached growth processes; and, (2) suspended growth processes. Some modifications are classified as hybrids of these methods. Advantages and disadvantages of prior methods are given in the above mentioned book. The major advantages of anaerobic systems are the low energy requirements, with potentially a net generation of energy, and a relative simplicity of treatment units and operations. Disadvantages of prior anaerobic treatment systems are summarized as follows:

1. Only wastewater with simple soluble substrate (easily degradable nontoxic constituents) can be adequately treated anaerobically.

2. Suspended solids in the wastewater influernt are not satisfactorily degraded unless retention time in the reactor is very long (usually 3 to 15 days or longer). Long retention time requires excessive reactor volumes as in low rate processes, which are difficult to mix well, and therefore, breakthroughs of pockets of poorly mixed and poorly treated waste occur. This reduces average efficiency of treatment.

3. Slowly and poorly degradable, or toxic, soluble constituents of the wastewater influent are not degraded unless retention time in the reactor is very long, or a bed of granular activated carbon (GAC) is provided. In the latter case, a portion of the GAC bed must be periodically replaced due to the accumulation of nondegraded adsorbed material.

4. Liquid in anaerobic reactors often turns acidic due to the accumulation of fatty acids. This can be caused by an overloading with organics, or by a toxic effect of specific constituents in the feed or by poor mixing in low rate processes. Accumulation of fatty acids and the respective drop in pH cause depletion in the methanogenic population. Further accumulation of fatty acids may cause suppression in the growth of acidogens. Inadequate growth of either group of organisms results in a process upset. There are no means for controllable cultivation, maintenance, accumulation and use of major groups of organisms in the prior art anaerobic systems. Since methanogenic organisms have very slow growth rate, the anaerobic process recovery takes a long time. This problem becomes especially difficult during start-up operations because acidity control requires large quantities of alkalies, and the start-up process may last many months, and sometimes a year or longer. Process controls, except pH correction with reagents, are not provided 5. Toxic discharges (for example, slugs of acidic or alkalinic wastewater, or wastewater having elevated concentrations of toxic constituents) can poison the entire sludge population in the reactor, thus requiring a long restarting time.

6. Either thermophilic (about 55° C.) or mesophilic (about 33° C.) are used. At temperatures lower than mesophilic, the process rate becomes very slow.

7. Sludge concentration in the suspended growth processes is low, usually from 10 to 60 g/l. Accordingly, substantial effort is required to dewater sludges by using centrifuges, vacuum filters, filter presses or other expensive methods.

8. Anaerobic processes are not intended for controlling nutrients and heavy metals.

9. Anaerobic processes generate odorous gases such as hydrogen sulfide, and volatile organics. Accordingly, gases need to be collected, even at small treatment plants, and are usually treated and/or combusted.

10. Anaerobic reactors for wastewater treatment have deficient systems for water distribution, gas collection, and sludge separation. Foam and scum often are accumulated in the upper sections of anaerobic reactors. Poor mixing in low rate systems reduces the treatment efficiency.

11. Anaerobic systems for wastewater and sludge treatment have no process controls beyond temperature correction with heating and pH correction by reagents. Poor mixing in low rate processes makes automation difficult because of a resulting random nature of concentrations distributions in the reactors.

12. Anaerobic reactors require a large area, because structural and cost considerations limit the total reactor height to 6 to 9 meters. Special egg-like shapes for avoiding grit accumulation are complex and costly to erect.

In summary, the above mentioned problems numbered 1 to 11 are related to a deficient sludge management strategy in prior art anaerobic wastewater treatment systems, and problems numbered 9 to 12 are related to deficient designs of anaerobic reactors. These two fundamental deficiencies limit the use of anaerobic treatment systems and cause operational problems in many of the systems already built.

The coupled anaerobic-aerobic systems have been developed and used during the past fifty years for treatment of concentrated industrial wastewater. These systems incorporate a separate anaerobic subsystem (functional section) with the final anaerobic clarifier and sludge recycle, and aerobic subsystem separation and sludge recycle step. Only excess aerobic sludge may sometimes be transferred to the anaerobic subsystem. This system has important advantages as compared to aerobic systems: high concentration waste can be treated, lesser quantities of sludge are produced, and better removal of soluble and suspended solid organics can be achieved.

However, anaerobic and aerobic functional sections in the anaerobic-aerobic systems are only mechanistically coupled. Sludges in these sections do not interact: their make-up and properties abruptly change from anaerobic to aerobic stage. The major disadvantages of anaerobic-aerobic systems are as follows:

almost uniform sludge make-up and concentration along the major process zones (poor F/M ratios in various process zones), and poor diversity of species in the sludge in each functional section;

operational difficulties in treating low concentration wastewater;

high sludge age and high degree of sludge stabilization in the aerobic subsystem (low content of organics convertible to methane and low mass and volume reduction in such conversion);

poor removal of suspended solids;

low process stability in response to dynamic overloading and toxic shocks;

low efficiency of degradation of poorly and slowly degradable and toxic organics;

loss of volatile organics to the air in open facultative, anoxic, and aeration sections;

difficulties in removing nutrients (nitrogen and phosphorous).

Several modifications of biofiltration systems have been developed, including aerobic and anaerobic, with and without water recirculation, a single, or multiple-stage system. Various lagoon systems have also been developed. Most often the lagoon systems comprise a series of aerated or nonaerated sections. Hydraulic retention time in lagoons is very long and sludge recycle is not practiced. Processes in lagoons are usually similar to those in ASP, but are not intensive and are less controlled. Some lagoons may have an anaerobic section, often followed with an aerobic sections. Such lagoons are similar to the anaerobic-aerobic systems. Open anaerobic lelgoons produce odors. Large water volume in the systems insures equalization of wastewater and sludge concentrations and provides a substantial process stability. However, poor mixing causes breakthroughs of poorly treated waste, and an overall low process efficiency. These systems are mechanically simple and require low maintenance. Many disadvantages of ASP and anaerobic-aerobic processes listed above are also typical for biofilters, rotating biological contractors, lagoon systems and various other modifications of biological wastewater treatment.

Sludges generated in wastewater treatment processes, for example in biofiltration or activated sludge process, are usually directed for either aerobic or anaerobic biological stabilization. Sludge thickening may precede biological stabilization. Methods of sludge thickening include: gravity thickening in tanks designed as settling tanks, sometimes with gentle mixing; pressure air flotation; thermal gravity thickening/flotation thickening; vibratory filters; drum screens; and centrifuges.

During biological stabilization, sludge is substantially mineralized and becomes nonrotting; however, it retains a large proportion of water, which makes sludge disposal difficult. Accordingly, sludges are usually dewatered and dried, which may be accomplished on drying beds—the method preferred at smaller plants. Separate dewatering and drying are used at larger plants, the methods including vacuum filtration, filter pressing, centrifugation, etc. Separate methods of drying include drying beds, rotary drums, fluidized bed dryers, dryers with opposite jets, etc. Sometimes sludges are thickened, dewatered and dried without biological stabilization, or a chemical stabilization is used instead.

Thermal gravity thickening, and thermal gravity/flotation thickening show significant advantages over other thickening methods. These methods are described in the book *Utilization of Wastewater Sludges*, by A. Z. Evilevich and M. A. Etvilevich, Publishing House Stroyizdat, Leningrad (S. Peterburgh), 1988 (in Russian) and in Soviet Certificates of Invention Nos.: 300420, 1971; 381612, 1973; 1118623, 1984. Advantages include more rapid and more efficient separation (thickening) of sludge particles from water. A major disadvantage of these methods is in that heating of the sludge prior to the separation is done by a heat carrier, for example steam, which requires additional complex equipment, heat exchangers or the like, and energy from an external sources (such as fuel). Sometimes flotation is not stable and portions of the sludge hang up in the mid depth or settle to the bottom of the flotation tank. Additionally, odor due to generation of hydrogen sulfide often occurs.

SUMMARY OF THE INVENTION

In the present invention, wastewater influent and conditioned anaerobic sludge are fed into an anaerobic reactor where they are well mixed. The reactor effects removal from the water and at least partial transformation of constituents of concern; then, the effluent is discharged from the reactor and directed to a sludge separator for separating the anaerobic sludge from the water. Optionally, a periodic batch reactor (sequencing batch) can be used. The reactor volume, or a fraction thereof, can be used as a sludge separator in the batch reactor. The water may be discharged in units for further treatment, or to the environment. The separated sludge is directed into a sludge conditioner, and the bulk of the conditioned sludge is recycled in the anaerobic reactor. The balance of the sludge, equal to the sludge growth amount, is discharged to a sludge disposal or utilization facility.

The sludge conditioning of the present invention may include anaerobic conditioning, a combination of aerobic and anaerobic steps, chemical conditioning, and a combination of chemical and biological conditioning steps including aerobic and anaerobic steps and combinations thereof. Predominantly methanogenic sludge is formed in the sludge conditioner.

Clean anaerobic gases, virtually odor-free and free from hydrogen sulfide, can be generated by the method of the present invention. The sulfide toxicity in the reactors will be eliminated.

Two operation modes of the method are possible: complete and incomplete treatment. Complete treatment involves substantially total acidification of soluble substrate in the feed material and substantially complete methanogenic conversion of fatty acids by recycling massively the methanogens from the sludge conditioner. Only traces of the original soluble organics and of fatty acids remain in the wastewater. Virtually all feed materials can be treated in less than 3 days. Incomplete treatment can be controllably achieved by providing deficient quantity of acidogens, thus, not all original soluble substrate is acidified; or, by recycling deficient amount of methanogens, thus leaving a sizable fraction of fatty acids in the effluent or by both, thus resulting in noticeable residual fatty acids and original organics in the effluent.

Deficient supply of acidogens can be insured by using short retention time in the reactor and by reducing recycle of acidogens from the sludge separator or sludge conditioner. Deficient supply of methanogens is provided by controlling the recycle of the conditioned sludge.

A novel reactor for carrying out the method of the present invention comprises a vertical shell with an optional domed roof. The bottom part of the shell may be used for the sludge conditioning zone, while the upper part of the structure houses the reaction zone. Wastewater influent is fed into the upper reaction zone, and a portion of the sludge from the lower conditioning zone is fed to the upper zone. Each zone may be independently mixed. The reaction zone is a complete mix reactor with virtually the same concentrations of all constituents at any point in the reactor. The treated wastewater carrying residual pollutants can be transferred from the reaction zone to a sludge separator. Sludge from the sludge separator can be returned to the bottom of the structure in the sludge conditioning zone or the reaction zone. The treated separated water may be discharged from the system, while the gas generated in the reaction and sludge conditioning zones is discharged to the atmosphere or, optionally, collected and evacuated at the top of the structure.

In a sequencing batch reactor, the volume of the reactor, or a fraction of such volume, may be used to accommodate the sludge separation zone. Optionally, this zone may be provided with means for degassing the sludge and diverting the gas flow from the sludge separation means. Sludge separation means such as a centrifuge or a filtration device may also be used in sequencing batch reactors with sludge conditioning.

The present invention provides improved anaerobic-aerobic treatment methods by providing novel flow patterns of wastewater and sludges, and by cultivating sludges most appropriate for the concentration and composition of wastewater in a given process section. Cultivation of appropriate sludges is accomplished by providing a broad range of sludge compositions and properties. The present invention uses a combined treatment system with (1) a general counterflow of the biological sludges and wastewater being treated, (2) a high sludge concentration at the head of the system where the organics concentration is also high, (3) a great diversity of sludge organisms in the systems and gradual change in the biocenoses along the system, and (4) an alternating exposure of wastewater constituents and metabolic products to various functional groups of biological sludges. In such systems, the wastewater constituents are exposed to a broad range of environmental conditions: physical, chemical, and biochemical and physical-chemical actions due to the availability of many organism types, enzymes, co-metabolizing species (vitamins, growth substances, steroids, nucleic acids, etc.), a broad ORP range, and favorable chemical make up.

Further improvement is provided by establishing functional process zones with specific biocenoses: anaerobic, facultative, anoxic, aerobic, and polishing. A novel type of functional zone with simultaneous anaerobic, anoxic and aerobic activities is developed for the removal of various classes of organics, including biodegradable and recalcitrant and toxic, through oxidations and reductions in a wide ORP range. Biological and chemical pathways of nitrogen removal are employed in such functional zones.

Yet further improvement is due to recirculation of treated or partially treated wastewater back to the upstream sections of the process and passing down a fraction of biomass from the upstream sections of the process to the downstream locations, thus providing treatment of the original wastewater constituents and metabolic products under alternating oxidation-reduction and enzymatic conditions. Such treatment also includes a thorough nitrogen removal.

Additional improvement is in applying to the treatment systems physical actions, such as magnetic, ultrasonic, or radio frequency electromagnetic fields, physical-chemical actions, such as electrolytic action, adsorption, coagulation-flocculation (including electrocoagulation), and chemical actions, such as addition of strong oxidants ($H_2O_2$, ozone, $Fe^{3+}$, nitrates, nitrites, and other oxyions) or their internal beneficial reuse. Addition of nutrients, such as nitrogen and phosphorous, and micronutrients, such as microelements and, if needed, biostimulators such as vitamins, steroids, folic acid, metal naftenates and nucleic acids.

A further objective of the present invention is to provide a method and apparatus for sludge thickening which does not require energy from external sources, and does not need complex equipment for sludge heating and for sludge flotation. The method is also stable and efficient. Moreover, the method can be combined with sludge stabilization, and with sludge dewatering and drying.

The present invention is based on the ability of aerobic bacteria to consume oxygen for oxidation of organics in the sludge. This is an exothermic process that causes the sludge temperature to rise. The heating effect becomes greater when the concentration of organics in the sludge and the concentration of oxygen in the oxidizer are greater. In any case, it is possible to bring the temperature of activated sludge removed from the bottom of clarifiers, or a mixture of activated sludge and sludge from primary clarifiers to 60–70° C. with the use of air as the oxidizer. In colder climates and at low concentrations of organics, oxygen or oxygen enriched air can be used as an oxidizer. Oxygen enrichment increases the available heat due to less heat loss from the nitrogen present in the air and with water vapors saturating off gases. Increasing of the sludge temperature by aeration will be herein referred to as bioheating.

As in heating with an external heat source, bioheating increases the rate and the efficiency of sludge separation due to lower viscosity of the water phase. However, there is no need for additional energy or fuel, and there is no need for additional heating equipment.

An additional and novel step in the present invention involves controllable bioflotation, which is the process of sludge flotation by gas bubbles generated after the aerobic sludge has been exposed to anaerobic conditions. Under anaerobic conditions, gas is generated by acidogenic and methanogenic bacteria (methane and carbon dioxide), sulfate reducers (carbon dioxide and hydrogen sulfide), and denitrifying bacteria (nitrogen). The process of gas generation and bioflotation can be controlled by controlling the growth and activity of various groups of organisms, or through sludge conditioning.

The process of bioflotation is well known, but improvements for controlling the process are provided herein. These improvements include, separately or in combination, the following:

1) Sludge is bioheated before bioflotation, which increases the process rate and insures bioflotation in colder climates. Bioflotation is achieved by subjecting the sludge to anaerobic conditions wherein methane, carbon dioxide, and/or nitrogen are preferably formed. In some instances, hydrogen sulfide may also be formed. These gases float up the sludge.

The anaerobic reaction step of the bioheated sludge can be conducted on a drying bed, and any presently known type of bed can be used. During this reaction, the sludge is floated up leaving a clear water layer at the bottom. Clear water rapidly filters through the drainage provided at the bed. The floated layer of the thickened sludge subsides down to the bed surface and is kept there until dry.

Alternatively, the anaerobic step and flotation can be performed in a separate flow-through reactor and separator (flotator). These steps can also be performed in a batch reactor: first, anaerobic reaction is carried out, followed by sludge flotation. After the thickened sludge and water are separated, the sludge is directed to a dryer. Any dryer used for sludge drying can be used.

2) Nitrates and nitrites are generated from nitrogen sources (urea or ammonia) or added to and mixed with the aerobically bioheated sludge, or immediately after the bioheating step in order to promote, respectively, denitrification and sludge flotation. Nitrates accelerate the process described in previous paragraphs.

3) The sludge flow is split into parallel aerobic bioheating and anaerobic digestion steps. In the anaerobic, step, long sludge ages are maintained to cultivate denitrifying acidogenic and methanogenic bacteria. Methanogenic and denitrifying bacteria consume fatty acids generated by the acidogenic organisms. At a longer sludge age, methanogenic and denitrifying bacteria deplete the fatty acids and other organic sources required for the growth of sulfate reducing bacteria. Accordingly, the growth of sulfur reducers is suppressed, the hydrogen sulfide is generated in very small quantities, and the process can be kept substantially odor free.

The effluent sludges from both aerobic bioheater and anaerobic conditioner are mixed in the next process step. In this step, conducted without aeration, carbon dioxide, methane, and nitrogen are generated, form bubbles and float up the sludge particles. In a continuous process, the reaction in the mixed aerobic and anaerobic sludges is conducted in a separate reactor, while flotation is conducted in a separate settling (flotation) type tank. Alternatively, the reaction between aerobic and anaerobic sludges and flotation are conducted in a batch reactor wherein a rapid mixing of predetermined portions of anaerobic and aerobic sludges is conducted first, followed by biological reaction with or without mixing, and by sludge flotation (during the biological reaction) without mixing or after the mixing is stopped. Such control strategy accelerates bioflotation, insures process stability and high efficiency in cold and warm climates, and eliminates the problem of odors.

Improvements to the bioflotation relate to sludge conditioning steps. They may be used in conjunction with wastewater treatment and sludge treatment prior to thorough dewatering and drying.

The steps of reacting the mixture of the aerobic and anaerobic sludges can be conducted on any conventional drying bed. During this reaction, the sludge is also floated up, leaving a clear water layer at the bottom. Clear water rapidly filters through the drainage provided at the bed. The floated layer of the thickened sludge subsides down to the bed surface and is kept there until dry.

Yet another objective of the present invention is to provide at least a partial treatment of wastewater in the collection and transportation network. Simultaneously, odorous and noxious gases, including hydrogen sulfide and volatile organics, will be eliminated and pipe corrosion caused by hydrogen sulfide and sulfuric acid in pipelines will be precluded.

In the present invention, the wastewater is at least partially treated within the collection and transportation network of pipes and channels. Predominately anaerobic treatment is used. Optionally, a combined anaerobic-aerobic, aerobic, or biological and physical chemical treatment can be used within the network. The essence of the biological, chemical, and physical chemical treatment steps is already described in the above section of this text. The final treatment, if needed, is provided at the end-of-pipe treatment plants.

The sewer networks constitute, at least partially, the volume for carrying out the reaction steps. As additional reaction volumes, wet pits of pump stations, and specially constructed tanks on the networks can be used. These wet pits and tanks also provide a volume for the concentration and the flow equalization. Due to equalization, the effective hydraulic throughput capacity of sewerage pipes and treatment works may be increased, and the treatment stability at the treatment plants may be improved.

The base version of the method includes spontaneous propagation of acidogenic organisms in the pipe networks, conversion of at least a portion of biodegradable organics into fatty acids and other products of the initial digestion stages, generation of strongly methanogenic sludge outside of the pipe networks and feeding it in the upstream stretches of the sewer network, rapid conversion of the fatty acids to methane, depriving the sulfur reducing organisms of food (fatty acids) by the said rapid conversion and consumption by the methanogens. These process steps provide at least partial removal of organics through their conversion to mostly carbon dioxide and methane, eliminating formation of hydrogen sulfide and greatly reducing volatilization of organics. During this treatment, wastewater does not become acidified and sulfuric acid is not formed. Accordingly, corrosion is largely eliminated.

Methanogenic sludge can be generated in sludge conditioners at the end-of-pipe treatment plant and delivered to the upper reaches of the network system by sludge pipelines, or transported in tanks. Also, anaerobic reactors for generating methanogens using wastewater organics as food can be installed in the upper reaches of the pipe networks. A third possibility would be the use of solid or liquid municipal or industrial waste or other organic feedstock for generating methanogens. In the latter case, the methane generating reactors may be installed either on the pipe network system, or somewhere else.

Yet another objective of the present invention is to control odors at wastewater treatment plants. This can be achieved by installing an anaerobic treatment systems with a sludge conditioner at the head of the treatment plant (before screens). This unit can be fed with raw wastewater and will produce odor-free gases. Optionally, means for size reduction of the coarse admixtures can precede the anaerobic unit. Grit chambers will not be required, because the anaerobic unit will collect the grit in the inverted pyramids at the bottom, from where it is easily removable together with the excess sludge.

The unifying idea in the present invention is based on coupling the anaerobic reaction and various sludge conditioning steps. Such coupling is provided in an optimal manner and results in new and nonobvious effects. For example, proper sludge management allows one to build odor-free, open, true anaerobic reactors or control complete or incomplete treatment.

BRIEF DESCRIPTION OF THE DRAWINGS

These and other features and advantages of the present invention will become apparent from consideration of the following specification, when taken in conjunction with the accompanying drawings in which:

FIG. 6 is a flow chart of a multiple stage anaerobic system with sludge conditioners in each stage;

FIG. 7 is a flow chart of a multiple stage anaerobic system with sludge conditioners in each stage, the second stage conditioner including an aerobic process step;

FIG. 18 is a cross-sectional view of a sequence batch reactor taken along the line 18—18 in FIG. 19;

FIG. 19 is a top plan view of an open structure of a sequencing batch reactor showing a modification of the device illustrated in FIG. 18;

FIG. 23 is a sequencing batch reactor with a gravity separator built in;

FIG. 25 is a top plan view of a splitter box for use with the present invention;

FIG. 26 is a cross-sectional view taken along the line 26—26 in FIG. 27;

FIG. 27 is a cross-sectional view taken along the line 27—27 in FIG. 25;

DETAILED DESCRIPTION OF THE EMBODIMENTS

Figure 1:
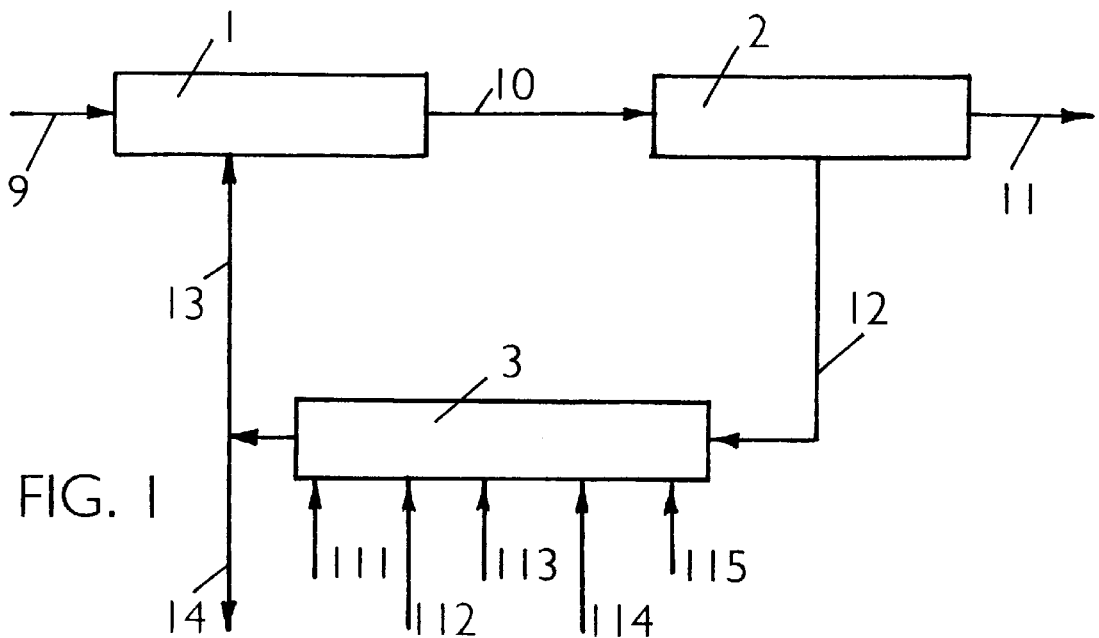
FIG. 1 is a flow chart of an anaerobic system made in accordance with the present invention, with a sludge conditioner.

Referring now more particularly to the drawings, and to those embodiments of the invention here chosen by way of illustration, in FIG. 1 there is an anaerobic reactor 1 with an influent conduit 9 and a line 10 connecting the reactor 1 to a sludge separator 2. The sludge separator 2 is connected to a sludge conditioner 3 by a line 12, and a line 11 is provided from the sludge separator for the liquid effluent. A line 13 connects the sludge conditioner 3 to the anaerobic reactor 1, and a line 14 is provided to discharge sludge to the environment, or otherwise remove it from the present processing system.

The sludge conditioner 3 optionally includes; a plurality of inlets 111, 112, 113, 114 and 115 for feeding nutrients, liquid or solid organics, sulfur bearing reagents, powdered activated carbon, oxyions including nitrites and nitrates, vitamins, biostimulators and microquantities of specific pollutants respectively into the sludge conditioner 3. Alternatively, similar inlets can be provided in the reactor 1 for feeding the reagents and micropollutants directly into the reactor.

In operation, wastewater influent and recycled sludge (second anaerobic sludge) are fed via lines 9 and 13 into the anaerobic reactor 1. The wastewater influent contains soluble and insoluble organics, and some constituents of wastewater may be poorly or slowly biodegradable, or toxic. The recycled sludge carries anaerobic microorganisms in bioflocs and/or granules. The sludge also includes enzymes produced by the microorganisms, alkalinity due to the bicarbonates and specific reagents added, or produced in the course of sludge conditioning. In reactor 1, the organic matter fed with the wastewater undergoes transformations. First, there is partial solubilization and coagulation-flocculation of suspended solids, so that the remaining suspended solids can be separated from the mixed liquor in the sludge separator. Second, there is conversion of the soluble organics by acidogenic organisms into fatty acids, followed by a conversion of fatty acids by methanogenic organisms into methane. Both acidogenic and methanogenic organisms (the first anaerobic sludge) will also produce carbon dioxide. Additionally, a fraction of incompletely converted organics, including poorly and slowly soluble and toxic organics, will be adsorbed by the biological mass in the reactor. These adsorbed organics will be separated from the mixed liquor in the sludge separator, and will not be present in the effluent from the anaerobic process stage.

The acidogenic microorganisms are largely grown in the anaerobic reactor and survive to a small degree in the sludge conditioner, while the methanogenic organisms (the second anaerobic sludge) are cultivated substantially in the sludge conditioner.

For use as the anaerobic reactor, either a suspended growth (mixed reactors) or an attached growth reactor, or a combination of the two, can be used. In the suspended growth reactor, the bulk of the methanogenic sludge is brought from the sludge conditioner. Depending on the conditioning and recycle of acidogenic and methanogenic organisms, the process rate may vary from low to high, an either complete or incomplete treatment may be provided. As an attached growth reactor, upflow or downflow packed media reactor, or a suspended sludge blanket reactor, with or without support media (particles of sand, crushed ceramsite, or granulated activated carbon) can be used. In the attached growth reactor, a partial retention and accumulation of methanogenic sludge occurs in the reactor itself. The rest of the methanogenic sludge is brought from the sludge conditioner.

Mixed liquor from the anaerobic reactor, with the first anaerobic sludge, is transferred through the line 10 to the sludge separator 2. The sludge can consist of flocculent or granular particles or both. The sludge separation step can be accomplished in a gravity separator (settling tank, clarifier, suspended sludge blanket clarifier, etc.), in a filtration device (granular media filters, screens, membranes, etc.), centrifuges, or other means for solid-liquid separation. The anaerobically treated wastewater is evacuated from the sludge separator 2 via line 11, and the separated sludge is transferred to the sludge conditioner 3 via the line 12.

In the sludge conditioner 3, the first anaerobic sludge is treated in accordance with particular requirements of the system. Sludge in the sludge conditioner constitutes only a fraction of the wastewater influent by volume. Accordingly, a very long retention time in the sludge conditioner (weeks to months) is possible at a comparatively small volume of the sludge conditioners. Sludge conditioners may be a single mixed tank, or a series of tanks, or other combinations as described later. The sludge conditioner 3 may be an anaerobic process, or a combination of anaerobic and aerobic biological processes, and chemical and physical chemical processes.

In the course of anaerobic treatment in the sludge conditioner, the flocculated, suspended solid particles are solubilized, and the products of solubilization are decomposed into fatty acids, and further into methane and carbon dioxide. The organics adsorbed in the sludge in the anaerobic reactor, including slowly and poorly degradable and toxic materials, are largely degraded over a long solids retention time.

Sludge recycle from the sludge conditioner 3 brings controllably to the anaerobic reactor 1 a substantial amount of alkalinity so that, in combination with the acid consumption by the recycled methanogens, the pH in the reactor is well buffered with little or no alkalinic reagent requirements. The total retention time in the novel system, on the influent flow basis, may be from several hours to under 3 days as compared to 3 to 15 days and longer in prior art suspended growth systems.

Sulfates, nitrates, nitrites and chromates and other oxyions are controllably reduced to sulfides, nitrogen, and trivalent chromium. These processes may occur in the anaerobic reactor or in the sludge conditioner, or both. Sulfides will precipitate heavy metals, for example, copper, mercury, zinc, and chromium.

Since the bulk of sulfides can be associated with calcium, magnesium, and iron, addition of sulfur-bearing species, sulfur, sulfuric acid, polysulfides, etc., can be provided in the anaerobic reactor or in the sludge conditioner (via inlet 113). Reduction of nitrates and nitrites (for example, recycled to the anaerobic reactor with aerobically treated and nitrified water) results in removal of a nutrient, nitrogen.

The degree of sulfate reduction is controlled by the availability of the fatty acids, which are the carbon source for the sulfate reducing organisms. Massive recycle of methanogens from the sludge conditioner results in rapid consumption of fatty acid. Accordingly, sulfate reducers are deprived of carbon source and their growth is suppressed. Small quantities of generated sulfides react with sulfate to form insoluble elementary sulfur.

If wastewater influent has substantial concentrations of poorly, or slowly degradable organics, for example certain surfactants, or toxic, partially degradable organics, for example methylene chloride or chloroform, powdered activated carbon can be added to the reactor or to the sludge conditioner (via inlet 114) in order to adsorb these constituents and retain them in the system, mainly in the sludge conditioner, for a longer time so these constituents will be substantially degraded.

In the case of toxic slugs in the wastewater influent, the sludge in the anaerobic reactor becomes poisoned and inactivated. This may happen in any reactor type, without exception. In the present method with the sludge conditioning step, the sludge stored and undergoing the conditioning in the sludge conditioning step is off line and is not poisoned by the toxic slug of wastewater; accordingly, only a short-duration process upset may occur.

The conditioned sludge from the conditioner 3 is fed into the anaerobic reactor 1 via line 13. A portion of the stabilized and conditioned sludge (concentration from 80–90 to 150–180 g/l), which is equal to the amount grown and accumulated over a given period of time, is discharged via line 14 over the same period of time.

Figure 2:
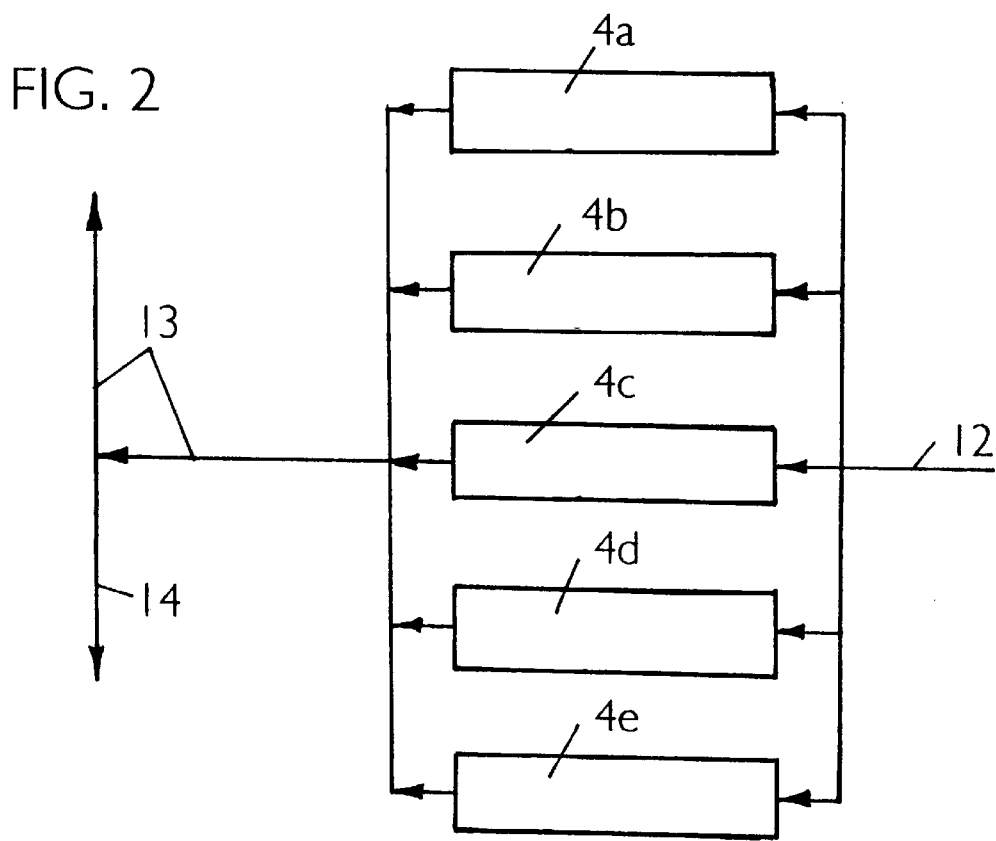
FIG. 2 is a flow chart of a multichannel sludge conditioner for use in the system of FIG. 1.

FIG. 2 illustrates one form of sludge conditioner 3 which comprises multiple parallel anaerobic compartments designated at 4a to 4e, with a manifold 12 for sludge infeed and a manifold 13 for sludge outfeed. A line 14 is provided for sludge discharge, either to the environment or to another processing system.

The sludge conditioning is arranged as a multichannel system with parallel compartments, each compartment being operated in a semibatch mode. For example, sludge from the compartment 4e is recycled to the anaerobic reactor 1, while all other compartments are in the batch mode, conditioning the sludge without any sludge exchange with the reactor 1. The compartments are in a queue, and can be controllably put in the recycle mode for a specified period on a sequential basis (for example, at a recycle period equal to one week per compartment, the total turnaround period for five compartments will be five weeks, or the sludge age increment due to the sludge conditioner is five reeks).

Alternatively, various compartments may be used for various conditioning methods. For example, some compartments can be aerobic, others anaerobic.

Figure 3:
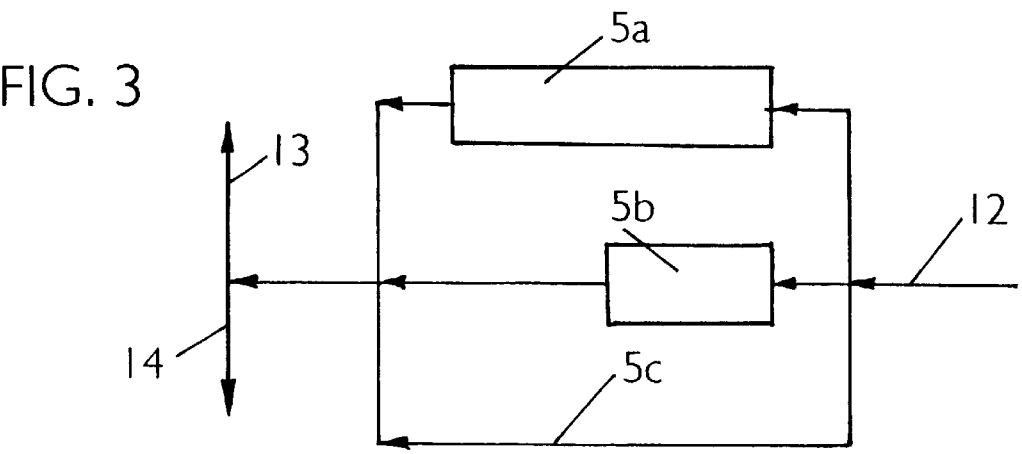
FIG. 3 is a modified form of a multichannel sludge conditioner.

FIG. 3 shows another sludge conditioner 3, this conditioner comprising multiple parallel anaerobic compartments 5a, 5b and 5c. The different compartments have different volumes, the compartment 5c being a by-pass with a zero volume. The manifold 12 provides for sludge infeed, manifold 13 for sludge outfeed, and pipe 14 for sludge discharge.

In this conditioner, the sludge conditioning step involves substeps of continuous sludge conditioning in parallel chambers of different sizes. Such treatment permits cultivation of the combined recycle sludge with a broad range of sludge age, and various groups of organisms. For example, the short-time compartment 5c will support the growth of acidogenic organisms, the medium-time compartment 5b will provide good growth of organisms responsible for solubilization of suspended solids, and the long-time compartment 5a will support methanogenic growth. A special compartment for growing sulfate reducers and generating sulfides can be provided. Such a compartment may be fed with a carbon source (including wastewater) and a sulfur source such as sulfates. Sulfides formed in this compartment can be used for removal of heavy metals from wastewater. A modification of this conditioner may be a channel with a distributed infeed along the length and a single outfeed at the channel end, so that different infeed portions of the conditioned sludge have different ages. Sludge composition may differ from that in a multichannel conditioner.

Figure 4:
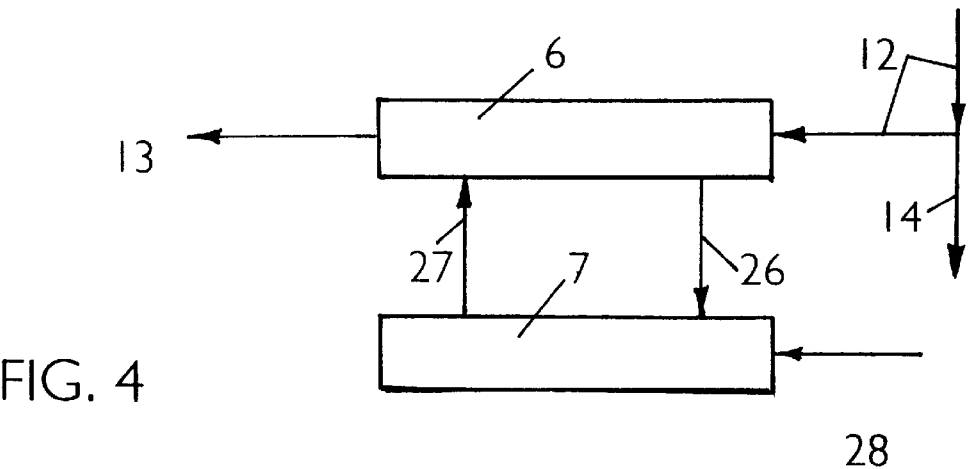
FIG. 4 is a flow chart of a sludge conditioner comprising parallel anaerobic and aerobic steps.

FIG. 4 shows a sludge conditioner 3 comprising an anaerobic compartment 6 and an aerobic compartment 7, the two compartments being connected by lines 26 and 27 for sludge transfer between them. The line 12 is for sludge infeed, 13 for outfeed, and 14 for sludge discharge. There is a line 28 for feeding oxygen, air, or enriched air supply into the aerobic compartment 7.

The sludge conditioner 3 is subdivided into an anaerobic compartment 6 and aerobic compartment 7. A portion of the sludge from the anaerobic compartment 6 is fed to the aerobic compartment 7, and the aerobically treated sludge is returned to the anaerobic compartment 6. In the aerobic compartment 7, some organics, especially those resistant to the anaerobic transformations, will undergo aerobic destruction. Because the aerobic processes have greater sludge yield, the mass of sludge grown in the system will increase as compared to anaerobic processes. This will create mass capable of adsorbing organic and inorganic constituents in the anaerobic reactor 1, and removing respective pollutants from the wastewater influent.

Aerobic treatment is also one means for raising the temperature of the sludge in the sludge conditioner. The increased temperature increases the process rate and the degree of organics destruction. Moreover, the organisms and enzymes generated in the heated sludge conditioner will be active, although not self sustaining, in the anaerobic reactor. This will be useful for treatment of wastewater that is at low temperatures. Alternatively, the heating could be achieved by the use of conventional sludge heating.

Figure 5:
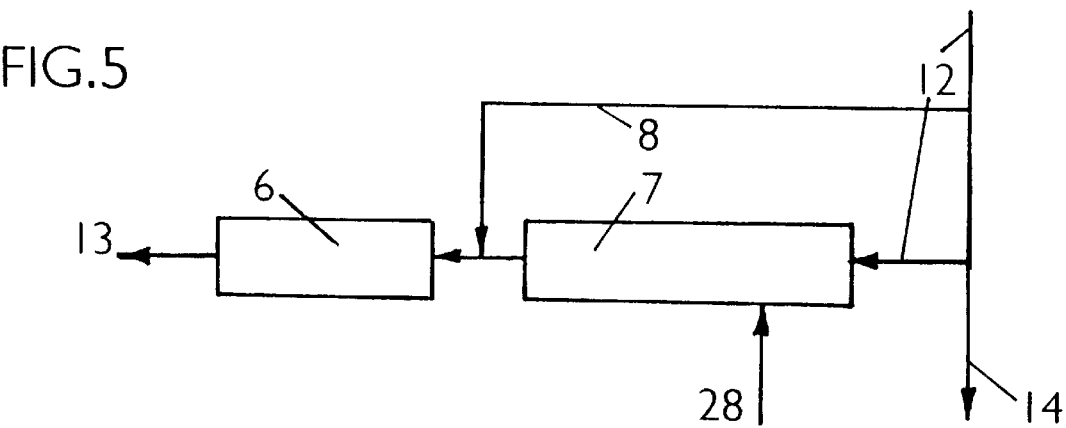
FIG. 5 is a flow chart of a sludge conditioner comprising sequential aerobic and anaerobic steps.

FIG. 5 shows a sludge conditioner 3 comprising an aerobic compartment 7 and an anaerobic compartment 6 connected in series by a line 29. If desired, there may be a line 8 for by-passing the aerobic compartment 7 and directing the sludge into the anaerobic compartment 6. As in the previously described embodiments, there is an infeed line 12 and an outfeed line 13. The discharge line 14 optionally by-passes the compartment 7 and immediately discharges the sludge from the system.

In the device of FIG. 5, a portion of the sludge from the sludge separator 2 is fed to the aerobic compartment 7. The aerobically treated sludge is subsequently transferred to the anaerobic compartment 6. The balance of the sludge from the sludge separator is by-passed directly to the anaerobic compartment 6. In the aerobic compartment 7, some organics, especially those resistant to the anaerobic transformations, will undergo aerobic destruction. Because the aerobic processes have greater sludge yield, the mass of sludge grown in the system will increase as compared to the use of anaerobic processes only. This will create mass capable of adsorbing organic and inorganic constituents in the anaerobic reactor 1 and removing respective pollutants from the wastewater influent. As is mentioned above, the aerobic treatment will also increase the temperature of the sludge.

In FIGS. 1 to 5, multiple sludge separators can be used. For example, the same type and size separators may be provided in each sludge conditioning channel, or different type and size separators can be used in different channels. One sludge separation device may be used for several sludge conditioning channels. Various types of sludge conditioners can be connected in series or parallel.

Referring now to FIG. 6 of the drawings, a multiple stage anaerobic system with sludge conditioning is illustrated. There is a first stage anaerobic reactor 1a, a sludge separator 2a, and a sludge conditioner 3a arranged as discussed in connection with FIG. 1, and the lines are numbered as in FIG. 1 with a suffixes. In the system of FIG. 6, however, the effluent line 11a is connected to the second stage of the system. The second stage of the system is also like the system of FIG. 1, and the parts are numbered the same, with a b suffix. It will be seen that the discharge 14b returns to the first stage anaerobic reactor 1a.

In this embodiment of the invention, the wastewater influent is subjected to treatment in a multiple stage anaerobic system with sludge conditioning. The wastewater influent is fed into the anaerobic reactor 1a via line 9 (optionally, a portion of the influent may be fed to the second stage reactor 1b), and the influent undergoes controllable incomplete treatment as previously described. The mixed liquor is then transferred to the sludge separator 2a via line boa. From the sludge separator 2a, the sludge is directed through the line 12a to the sludge conditioner 3a, where it undergoes the transformations previously described. The conditioned sludge is partially recycled to the anaerobic reactor 1a through the line 13a, and the balance is discharged via line 14a. The wastewater effluent from the sludge separator 2a is fed in the anaerobic reactor 1b via line 11a, where it undergoes the controllable complete treatment as previously described; then, the mixed liquor is transferred to the sludge separator 2b via line 10b. From the sludge separator 2b, the sludge is directed through the line 12b to the sludge conditioner 3b, where it undergoes the transformations previously described. The conditioned sludge is partially recycled to the anaerobic reactor 1b by the line 13b, and the balance is transferred to the first process stage anaerobic reactor 1a via line 14b.

The advantage in the use of two or more stages is in the effect of "counterflow" of the sludge and the wastewater. In particular, the poorly degradable and especially poorly adsorbable organics will be partially removed in the first process stage. The sludge in the sludge conditioner will substantially transform the poorly degradable and poorly adsorbable organics; however, due to the nature of these organics, the residual quantity of them will be recycled back to the first stage anaerobic reactor, and therefore will be lost from the first stage sludge separator. These residual quantities will be additionally removed in the second process stage. This advantage is also very important for the removal of heavy metals and specific pollutants. In a one-stage process, the sludge circulating in the system is loaded with heavy metals, so that the new portions of the wastewater influent bring new quantities of heavy metals in contact with sludge already substantially saturated with heavy metals. Such sludge has low accumulation capacity and cannot hold additional heavy metals. In the two or more stage process, the first stage sludge removes the bulk of heavy metals. In the second stage, much "cleaner" sludge scavenges the residual heavy metal admixtures.

FIG. 7 illustrates another multiple stage anaerobic system with sludge conditioning, this system being the system of FIG. 6 with a sludge conditioner as shown in FIG. 4. The parts are numbered as in FIG. 6 and in FIG. 4. It will be seen that the effluent line 11a leads to the second stage reactor 1b, and the discharge line 14b from the second stage leads to the line 12a for input to the conditioner 3a. Other parts and connections are as previously discussed.

In operation of this embodiment, the wastewater influent is subjected to treatment in a multiple stage anaerobic system with sludge conditioning. The wastewater influent is fed into the anaerobic reactor 1a via line 9, where it undergoes the incomplete treatment as previously described; then, the mixed liquor is transferred to the sludge separator 2a via line 10a From the sludge separator 2a, the sludge is directed through the line 12a to the sludge conditioner 3a, where it undergoes the transformations previously described. The conditioned sludge is partially recycled to the anaerobic reactor 1a by the line 13a, and the balance is discharged from the system via line 14a.

The wastewater effluent from the sludge separator 2a is fed into the anaerobic reactor 1b via line 11a where it undergoes the treatment previously described, then the mixed liquor is transferred to the sludge separator 2b via line 10b. From the sludge separator, the sludge is directed through line 12b to the sludge conditioner 3b, where it undergoes the transformations previously described. The conditioned sludge is partially recycled to the anaerobic reactor 1b by the line 13b, and partially fed via line 26 into the aerobic conditioner 7. A portion of the aerobically conditioned sludge is returned to the anaerobic conditioner 3b, and the balance is transferred to the first process stage anaerobic sludge conditioner 3a via line 14b. The advantages of the two or more stage arrangement have been discussed above.

Referring to FIGS. 8, 9, 10, and 11, there is shown a combined structure for anaerobic reactor and sludge conditioner. The structure consists of a polygonal (FIG. 9), cylindrical (FIG. 10), or square (FIG. 11) vertical shell 35 with an optional domed top 37. The domed top may be a pyramid, or a cone, or other similar shape. The top 37 then mounts a gas collection section 33, and a gas discharge pipe 34. The inside bottom part of the structure has a pyramidal or conical shape. The bottom part accommodates the sludge conditioner to constitute the sludge conditioning zone, while the upper part is for the anaerobic reactor to constitute the anaerobic reactor zone.

Figure 8:
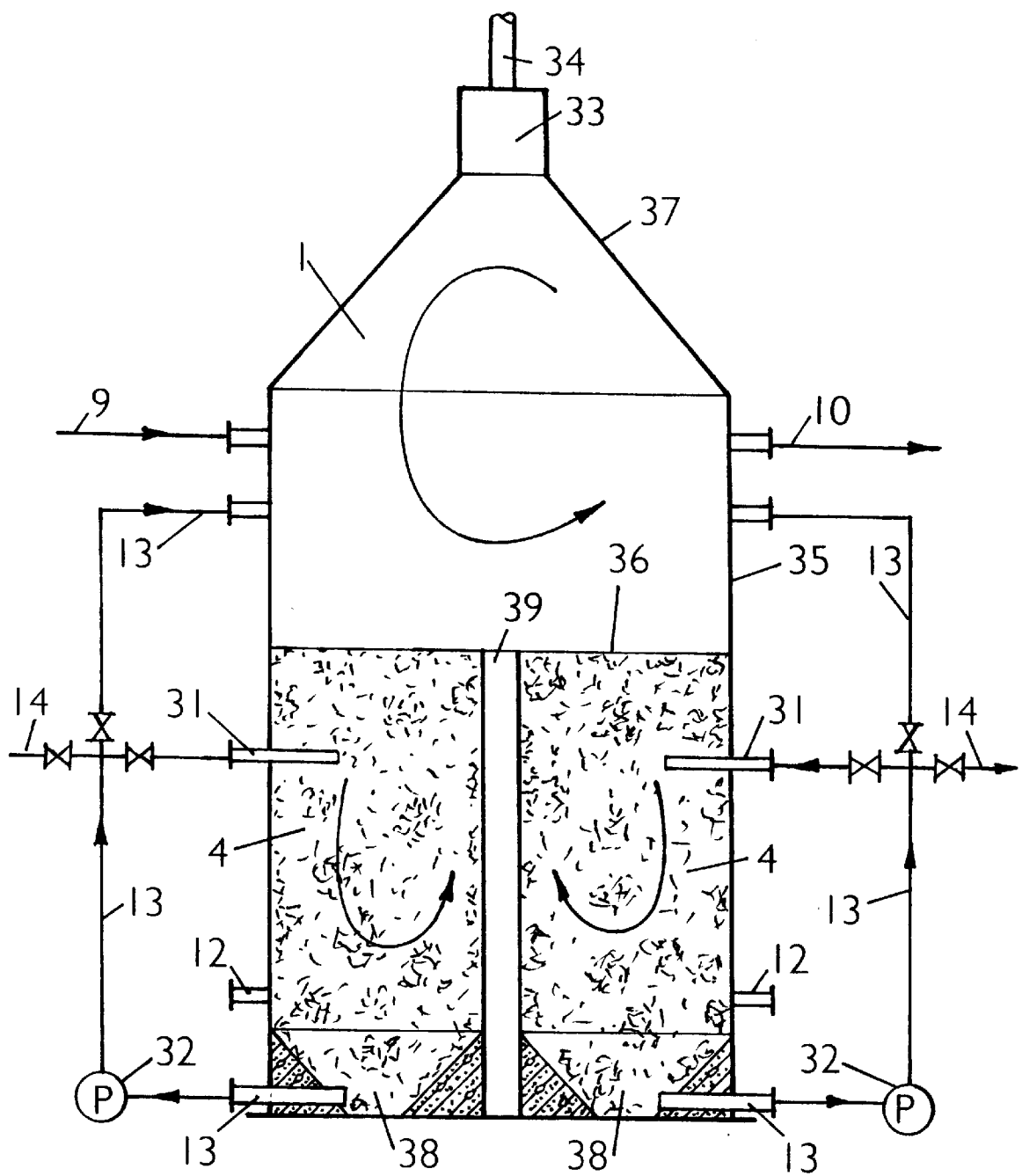
FIG. 8 is a vertical cross-sectional view of a structure made in accordance with the present invention for anaerobic treatment of wastewater.
Figure 9:
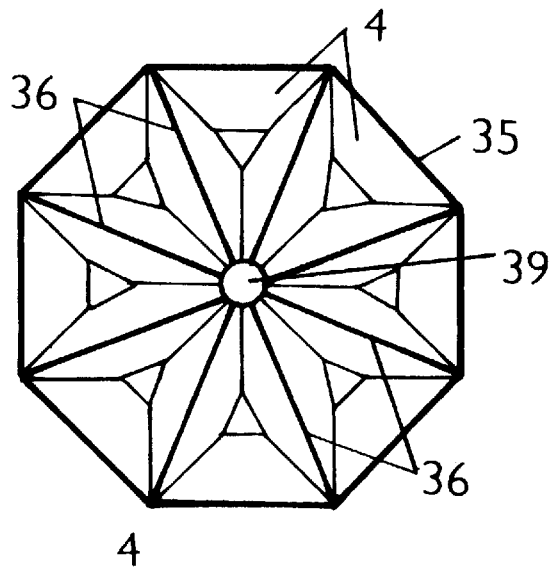
FIG. 9 is a horizontal cross-sectional view of a bottom part of a polygonal structure similar to that shown in FIG. 8.
Figure 10:
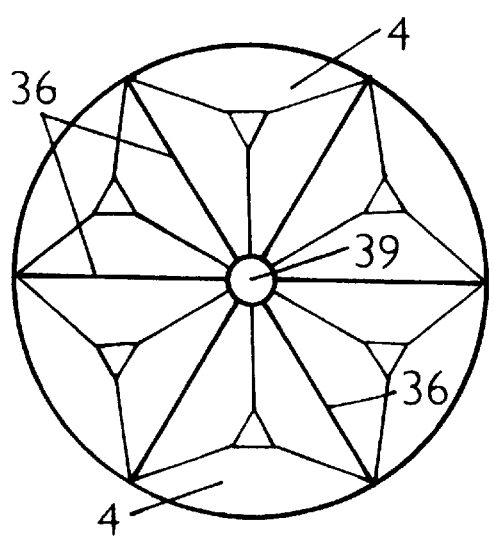
FIG. 10 is a horizontal cross-sectional view of a bottom part of a circular structure similar to that shown in FIG. 8.

Optionally, the lower part of the structure is separated into multiple compartments 4 (FIGS. 9, 10 and 11) by vertical walls 36. A central connection element 39 may be also provided as shown in FIGS. 8, 9 and 10. Pyramidal bottom 38 is provided in each sludge conditioning compartment 4, and each compartment 4 is provided with outlet pipes 13 and 31, and a pump 32 as means for moving the sludge to effect mixing.

The upper part of the structure may be separated into multiple compartments by extending some or all of the partitions 36 upward into the gas collection section 36 above the liquid level.

Lines 9 for wastewater influent and 10 for discharge of the anaerobic mixed-liquor are provided in the upper part of the structure. Pipes 13 and pumps 32 are provided for moving the sludge between the sludge conditioning zones 4 (or a single zone 4) and the reactor zone 1. Pipes 12 and 14 are provided in the sludge conditioning compartments 4 for transferring the sludge from a sludge separator to the sludge conditioning zones 4 and for discharging stabilized excess sludge from the sludge conditioning zones 4.

Optionally, sludge from the sludge separator can be returned to the reaction zone 1, for example, through additional connections to pipes 13 or 9. In such a case, the structure corresponds to a combination of flow charts shown in FIGS. 2 and 3.

In operation, the wastewater influent is fed into the reaction zone 1 via line 9. Conditioned sludge is fed from one of the multiple sludge conditioning zones 4 (or from a sole conditioning zone) into the reaction zone 1 by one of the pumps 32, via lines 213. Sludge and wastewater in the reaction zone 1 are mixed by either gases generated in the reaction zone and in the sludge conditioning zones 4, or by a mixing device (propeller mixer, circulating pump, gaslift, etc.). The gases generated in the apparatus will flow up in the gas bell 33 to be evacuated via the pipe 34. A portion of the sludge in the mixed liquor in the reaction zone 1 settles down into the sludge conditioning zones 4. The remaining sludge is discharged through the pipe 10 with the mixed liquor from the reaction zone 1 to a sludge separation device; and, after separation from the treated water the sludge is returned to a sludge conditioning zone 4. Sludge in the conditioning zones 4 is continuously or periodically mixed by mixing devices. Circulation pumps 32 and lines 213 and 31 are one example of mixing means. A propeller mixer, or a jet pump can also be used. A mixing device in the sludge conditioning zone in a combined structure as shown in FIG. 8 should not produce significant uncontrollable sludge transfer from the sludge conditioning zones 4 to the anaerobic reaction zone 1. Periodically or continuously, a portion of the stabilized conditioned and thickened sludge is discharged from the system via line 14. Grit, present in the wastewater influent will settle and accumulate at the pyramidal bottom in each compartment 4. In such system grit will be easily removed with the sludge discharge. Various previously described reagents, powdered activated carbon, liquid and solid organics can be fed into the system either with the wastewater influent via line 9, or through lines 13 with the sludge return after the sludge separator.

Optionally, the upper reaction zone 1 is separated into multiple compartments by extended upward walls 36. Each reaction compartment is associated with the fixed sludge conditioning zones. For example, a total of two reaction zones are associated with eight conditioning zones, four conditioning zones per reaction zone. The groups of reaction and conditioning zones are connected sequentially, and counterflow of sludge is provided as previously described.

When the apparatus of FIG. 8 is used for sludge digestion, sludge is fed into the reaction zone and is inoculated with acidogens present and growing in this zone and with methanogens mostly pumped from compartments 4. A partially digested sludge settles from zone 1 to compartments 4, wherein the biological conversions are completed. The effluent from zone 1 is directed to a sludge separator, for example, a centrifuge or a gravity thickener. The fugate or the supernatant are returned to the water treatment train, while the sludge is fed again to the apparatus shown in FIG. 8. Treated sludge is discharged from compartments 4 of this apparatus in a thickened form at a much higher concentration than in conventional digestors. Due to conditioning of the sludge and its thickening, the process stability, rate, and loadings per unit volume greatly increase as compared to conventional digestors.

Figure 12:
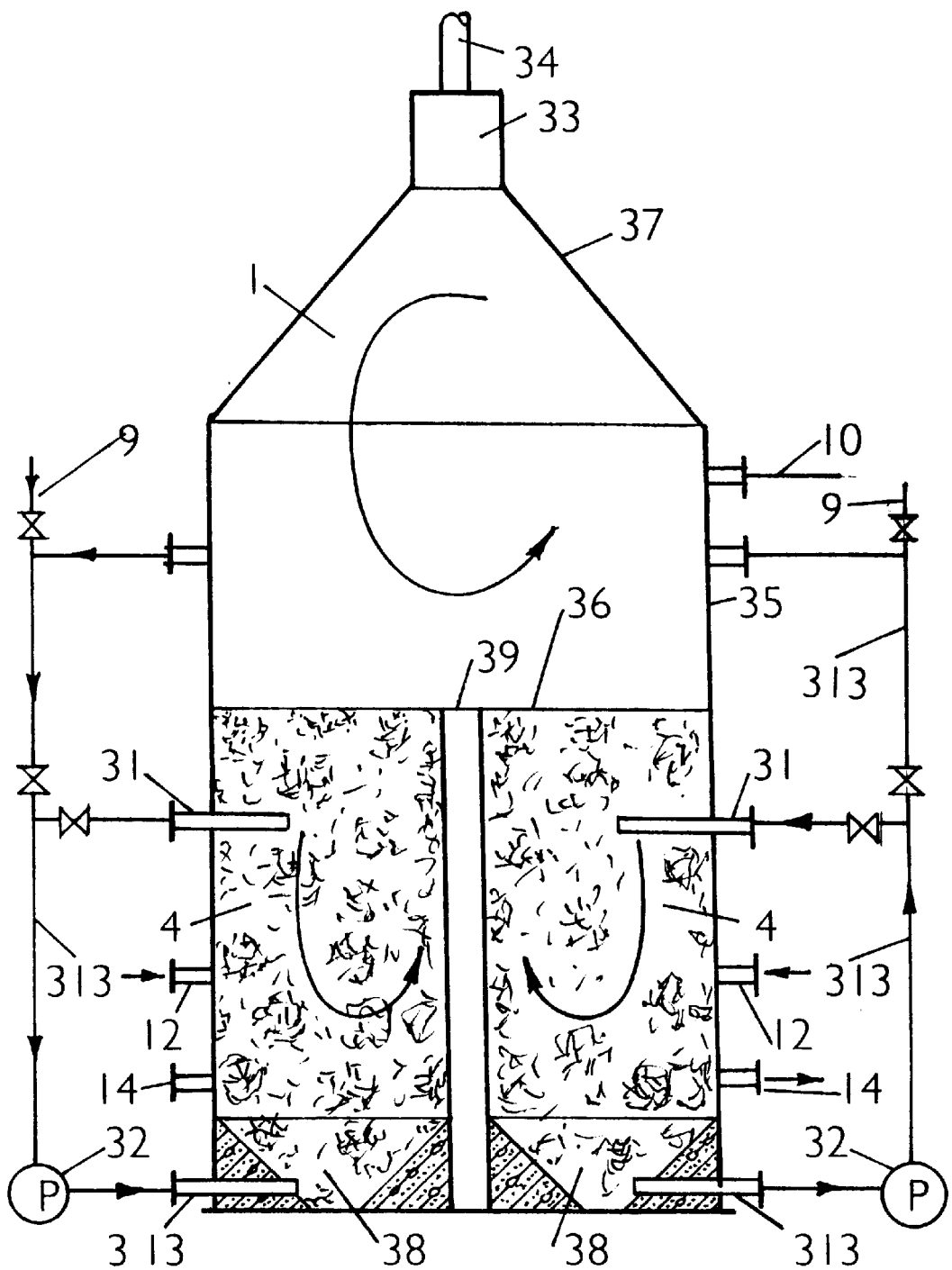
FIG. 12 is a vertical cross-sectional view similar to FIG. 8 and showing a modification thereof.

Referring to FIG. 12, there is shown an alternative combined structure for anaerobic reactor and sludge conditioner. This structure is similar to the above described arrangement, but with a few changes.

Lines 9 for wastewater influent and 10 for the anaerobic mixed liquor are connected to the sludge circulation pipes 313 and 31. Pipes 313 and pumps 32 are provided for moving the sludge between the sludge conditioning zones 4 and the reactor zone 1. Pipes 12 and 14 are provided for feeding the sludge from a sludge separator to the sludge conditioning zones 4 and for discharging the excess sludge.

In this arrangement, the wastewater influent is fed via lines 9 and 313. Circulation may be assisted in the selected sludge conditioning zone 4 by the pump 32; and, such circulation assists also in the reaction zone 1. A suspended sludge blanket is formed in the selected sludge conditioning zone 4, and for the period of selection the selected sludge conditioning zone becomes a part of the reaction zone. Sludge and wastewater in the reaction zone 1, and the selected sludge conditioning zone 4, are kept in the fluidized state by the use of the pump 32, and additionally mixed by gases generated in the reaction zone 1 and in the sludge conditioning zones 4. The gases generated in the apparatus flow up into the gas bell 33 and are evacuated via pipe 34. A portion of the sludge in the mixed liquor in the reaction zone 1 settles down into the sludge conditioning zones 4 which are not selected at the time. The remaining sludge is discharged with the mixed liquor from the reaction zone 1 to a sludge separation device through the pipe 10; and, after separation from the treated water, is returned to a sludge conditioning zone 4. Sludge in the conditioning zones 4 is mixed as was discussed above.

Figure 13:
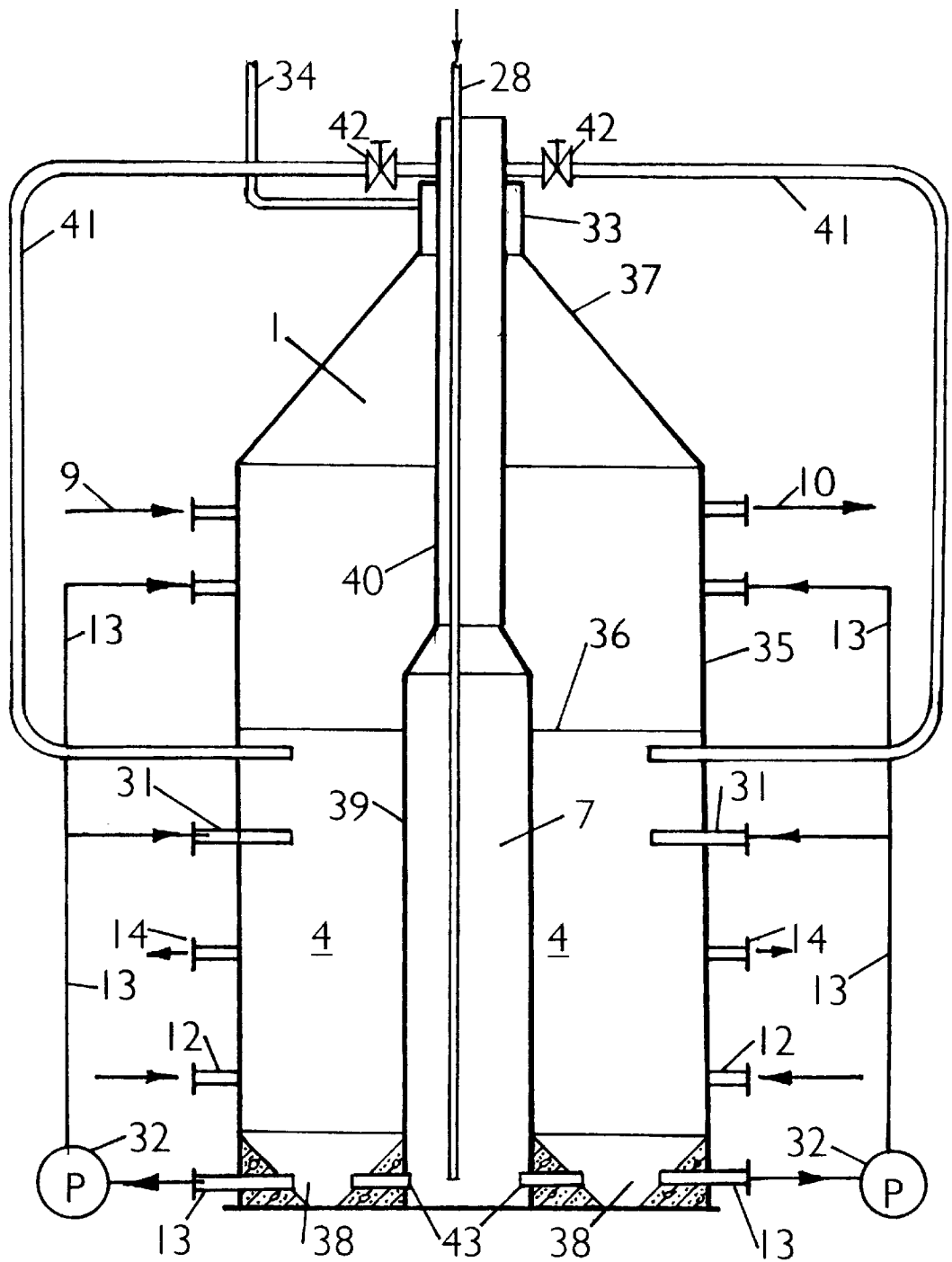
FIG. 13 is a vertical cross-sectional view showing another modification of the structure shown in FIG. 8.

Referring next to FIG. 13, there is shown another variation of the combined structure for anaerobic reactor and sludge conditioner. Again, the structure is similar to that shown in FIG. 8, but with some changes.

In FIG. 13, there is an enlarged central connection element 39 with an extension section 40 protruding through the gas collection section 33. The volume inside the element 39 and extension section 40 optionally comprise the aerobic section 7 of the sludge conditioner. Section 7 is provided with a pipe 28 for air, or oxygen, or oxygen enriched air. Alternatively, the volume inside the element 39 and section 40 can be used for generating sulfides, and pipe 28 may be used for feeding a source of sulfur, for example, aluminum sulfate. Pyramidal bottom 38 is provided in each sludge conditioning compartment. Each compartment is provided with pipes 13 and 31 and a pump 32 as means for sludge mixing, and also with pipes 43 for transferring the anaerobic sludge to the aerobic sludge conditioning section 7. Pipes 41 with valves 42 connect the upper part of the aerobic section 7 with each anaerobic section 4.

Lines 9 for wastewater influent and 10 for the anaerobic mixed liquor are provided in the upper part of the structure. Pipes 13 and pumps 32 are provided for moving the sludge between the sludge conditioning zones 4 and the reactor zone 1. Pipes 12 and 14 are provided for feeding the sludge from a sludge separator to the sludge conditioning zones and for discharging the excess sludge from the sludge conditioning zones.

It will be understood that most of the operation of this embodiment is the same as the embodiment shown in FIG. 12, so the description will not be repeated. The difference, however, is that a portion of the sludge in a selected sludge conditioning zone 4 is transferred via pipe 43 into the aerobic sludge conditioning zone 7 and aerated with air, or oxygen, or oxygen-enriched air supplied through the pipe 28. Aerobically treated and heated sludge is transferred back to the selected zone 4 by opening a valve 42 on line 41. Various lifting means can be used for transferring the sludge between the selected anaerobic zone 4 and the aerobic zone 7. In FIG. 13, the transferring means is an airlift, which also accomplishes the aeration in the central well 39 and the standpipe 40. Alternatively, a pump can be used for the sludge transfer between zones 4 and 7.

Since sulfides are oxidized into sulfates in the aerobic zone 7, heavy metals become soluble. They can be removed from the system with a small amount of water by removing a portion of water from the aerobic sludge. Metals can be reduced to an even smaller volume by using known methods, and water virtually free of metals may be returned to the water train. Periodically or continuously, a portion of the conditioned sludge is discharged from the system via line 14. Various previously described reagents, powdered activated carbon, or liquid and solid organics can be fed into the system either with the wastewater influent via line 9, or through lines 13 with the sludge return after the sludge separator.

An alternative operation of this apparatus with all baffles 36 extended upward and inside the gas collection means 33 can be as follows: some "total height" zones will be operated at maximum flow while others are operated at reduced flow or zero flow. All zones are operated in parallel as separate reactors with the time clock change in sequencing of the sections operated at maximum, reduced and zero flows. Sludge in sections with less than maximum flow is being conditioned.

Yet another alternative operation of this apparatus is with the use of the element 39 and section 40 for sulfides generation. A sulfur source such as aluminum sulfate, and organics such as wastewater are fed via pipe 28 into anaerobic environment in the element 39. As in conventional anaerobic reactors, hydrogen sulfide is generated. Liquid from this volume bearing hydrogen sulfide is brought to the reaction zone 1 via pipes 41, wherein heavy metals are precipitated. Metal sulfides remain with the anaerobic sludge. Aluminum ions are used up to precipitate phosphorus, which also remains in the sludge.

Figure 11:
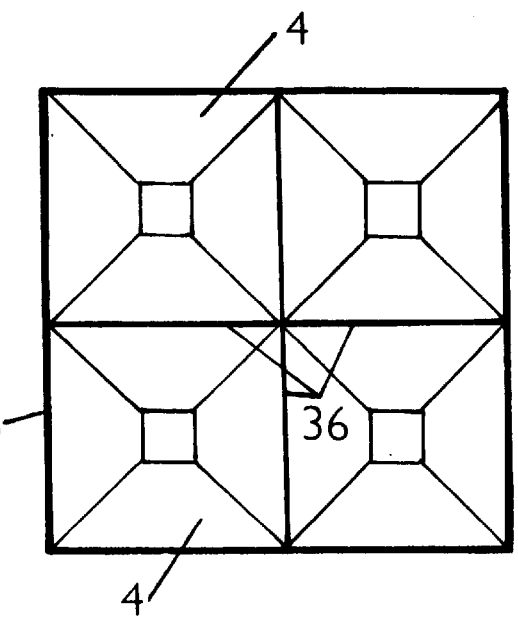
FIG. 11 is a horizontal cross-sectional view of a bottom part of a square structure similar to that shown in FIG. 8.
Figure 14:
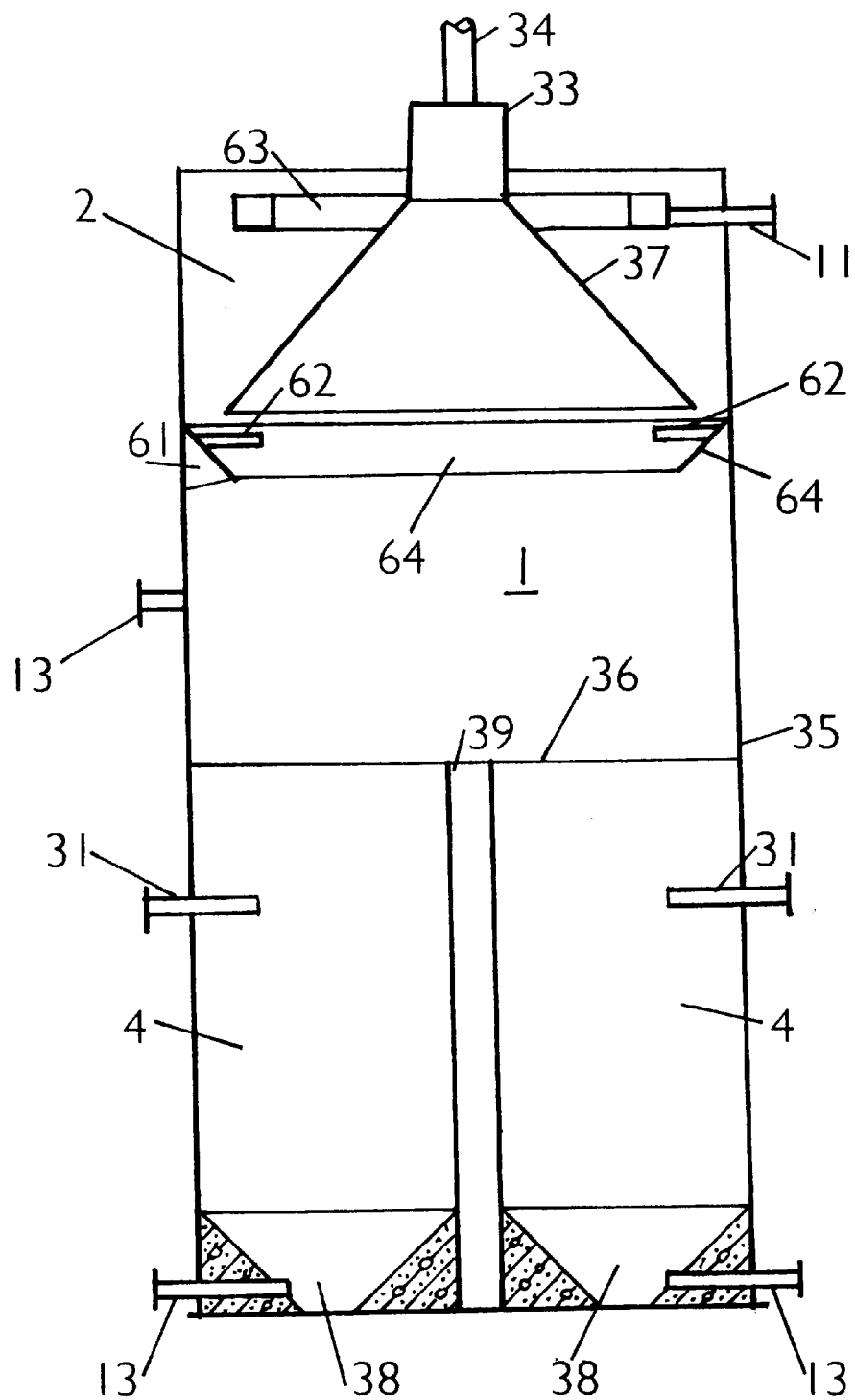
FIG. 14 is a vertical cross-sectional view showing yet another modification of the structure shown in FIG. 8.

Another variation of the combined structure is shown in FIG. 14. Again, the shape may be as shown in FIGS. 9, 10 or 11 and discussed above. In this embodiment of the invention, the outer shell 35 of the structure is extended upward to a level above the liquid level in the gas collection section 33. The space above the cone 37, separated by the extended shell 35, houses the sludge separation zone 2. The base of the top cone 37 has a diameter smaller than the diameter of the outer shell 35 so that a circular opening 64 is formed between the top cone 37 and the shell 35. An inclined circular baffle 61 is provided for gas collection in the inner space along the structure shell 35. Gas pipes 62 connect the gas space under the baffle 64 with the gas space under the cone 37. A water collection trough 63 with an influent pipe 11 is positioned at the water level in the sludge separation zone 60.

The lower portions of the device are the same as in FIG. 8, and the description will not be repeated.

In operation of this embodiment, the wastewater influent is fed into the reaction zone 1 via line 9. Conditioned sludge is fed from one of the sludge conditioning zones 4 in the reaction zone 1 by one of the pumps 32 via lines 213. Sludge and wastewater in the reaction zone 1 are mixed by either gases generated in the reaction zone and in the sludge conditioning zones 4, or by a mixing device such as a propeller mixer, circulating pump, gaslift, etc. The gases generated in the apparatus will flow up into the gas bell 33 and will be evacuated via pipe 34. Gases collected under the baffle 61 are directed beneath the cone 37 by pipes 62. A portion of the sludge in the mixed liquor in the reaction zone 1 settles down into the sludge conditioning zones 4. The remaining sludge is discharged with the mixed liquor from the reaction zone 1 to a sludge separation zone 2 through the opening 64; and, after separation from the treated water, is returned through the same opening 64, back to the anaerobic reaction zone 1 and ultimately to the sludge conditioning zones 4. The gravity-clarified water in the sludge separation zone 2 is collected in the trough 63 and discharged from the system via pipe 11. Scum removal means, means for forced sludge transfer to the sludge conditioning zones 4 instead of the reaction zone 1, and other available options may be provided. Sludge in the conditioning zones 4 is continuously or periodically (for example, on a time clock basis) mixed by mixing devices such as the circulation pumps 32 and lines 213 and 31. Alternatively, a propeller mixer, or a jet pump can be used. A mixing device in the sludge conditioning zone in a combined structure as shown in FIG. 14 should not produce significant, uncontrollable sludge transfer from the sludge conditioning zones 4 to the anaerobic reaction zone 1. Periodically or continuously, a portion of the conditioned sludge is discharged from the system via line 14. Various previously described reagents, powdered activated carbon, or liquid and solid organics can be fed into the system either with the wastewater influent via line 9, or through lines 13 with the sludge return after the sludge separator.

Figure 15:
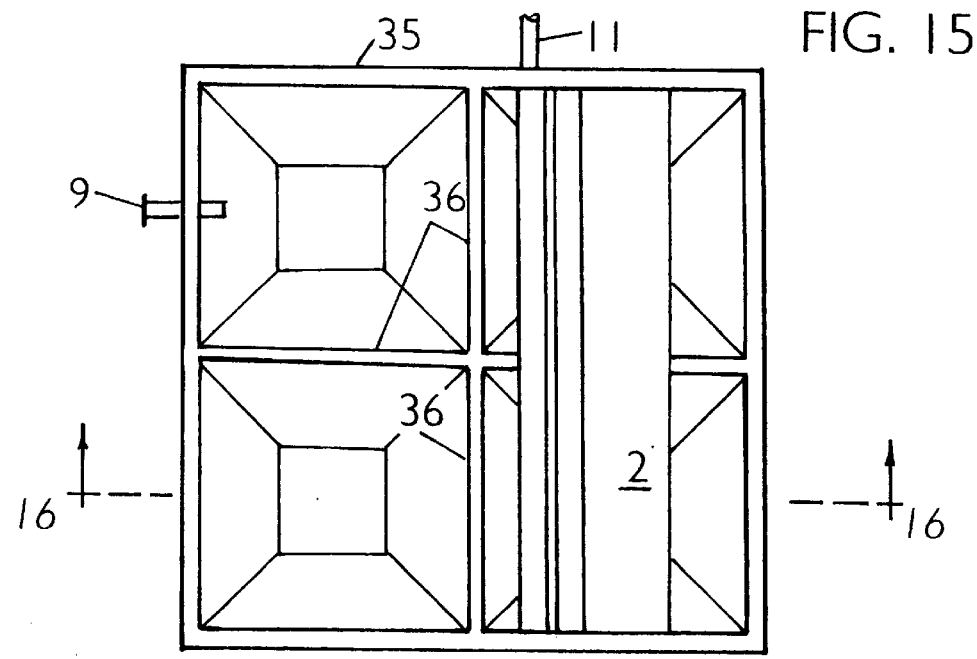
FIG. 15 is a top plan view of an open structure for use in the present invention.
Figure 16:
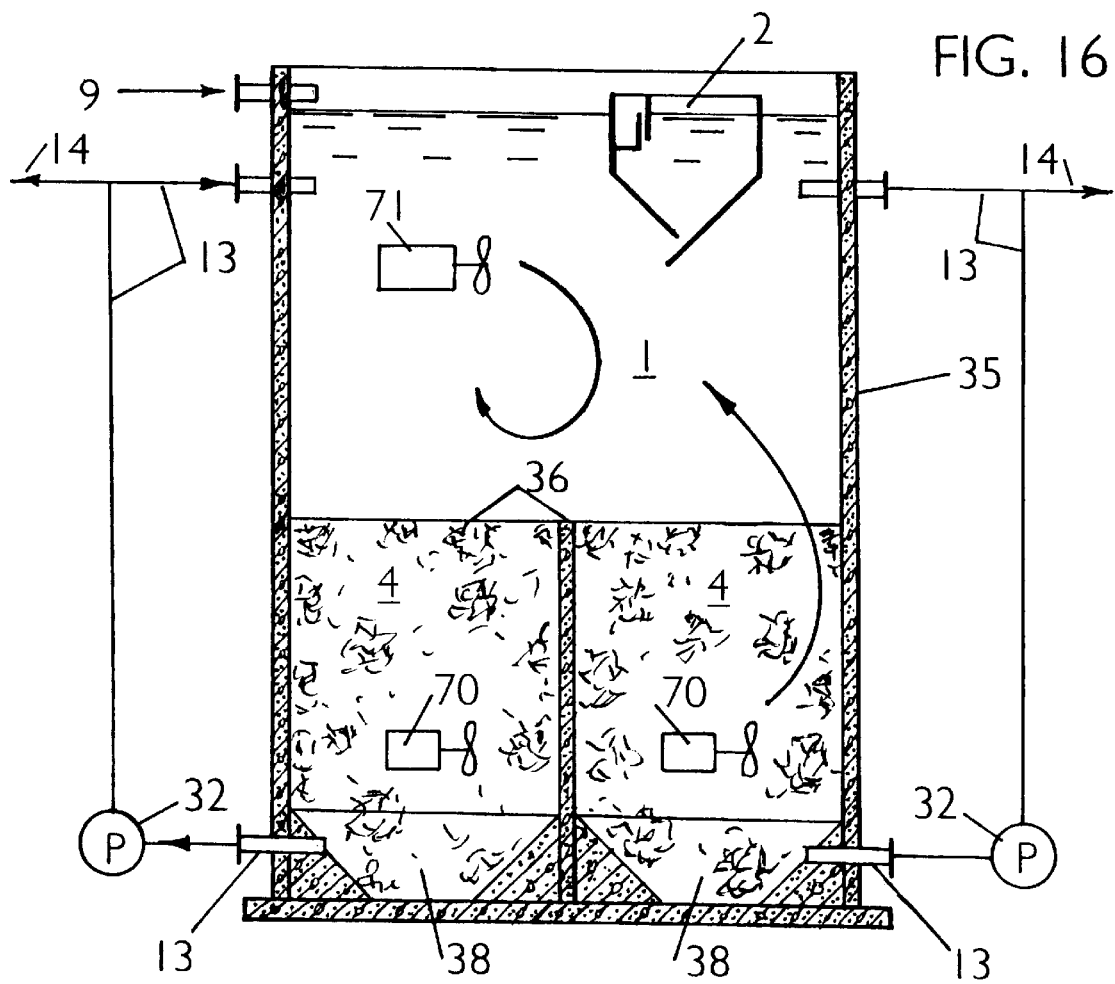
FIG. 16 is a cross-sectional view taken along the line 16—16 in FIG. 15.

Referring now to FIGS. 15 and 16, there is shown a combined open structure for wastewater treatment, sludge separation and reconditioning. The structure consists of a rectangular tank formed by outer walls 35, and having internal partitions 36 extended for a fraction of the total tank height. These partitions 36 form multiple sludge conditioning compartments 4, each compartment having a pyramid bottom 38.

The tank volume above the level of partitions 36 houses the anaerobic reactor 1. A sludge separating means 2 in the form of a settling trough is disposed in the reactor volume. Pipes 9 and 11 are provided for wastewater influent and for treated wastewater respectively. Means 70 for mixing sludge is in each sludge conditioning compartment 4, and means 71 for mixing the anaerobic mixed liquor is in the reactor area 1. As here shown, the means 70 and 71 are submersible mixers. The structure also includes means for transferring the conditioned sludge from each sludge conditioning compartment 4 to the reactor zone 1, for example a pump 32 and pipes 13. Pipes 14 are provided for discharging the excess sludge from the sludge conditioning zones. The sludge conditioning in this apparatus corresponds to the combination of the flow charts shown in FIGS. 2 and 3.

In the operation of this embodiment, wastewater influent is fed into the anaerobic reaction zone by pipeline 9, the sludge is fed in the anaerobic reaction zone 1 by the pump 32 via pipes 213 from a selected sludge conditioning compartment 4. The liquid in the anaerobic reaction zone is mixed by the gases, generated in the reaction and sludge conditioning zones, and also by the mixing device 71. The mixtures including the wastewater undergo transformations as previously described. The gases leave the anaerobic reaction zone through the open top of the apparatus. Appropriate sludge conditioning results in: (a) a sufficiently high pH in the reaction zone (near neutral to slightly alkaline) so that hydrogen sulfide is substantially dissociated into nonvolatile ions; (b) a low content of volatile fatty acids and other odorous compounds in the mixed liquor; and, (c) low hydrogen sulfide generation due to the lack of carbon source for sulfate reducing organisms, so that the gases leaving the anaerobic reactor are composed mainly of nonodorous methane and carbon dioxide.

The mixed liquor is transferred into a sludge separation means 2, such as a settling trough, a clarifier, a centrifuge, or a filtration device. The clarified water after the sludge separation device 2 is evacuated from the anaerobic system, while the sludge is returned in the anaerobic reaction zone 1 and eventually in the sludge conditioning zones 4. The sludge in the sludge conditioning zones undergoes transformations as previously described. A sludge mixing means is provided in each sludge conditioning zone. It can be a circulation pump, a propeller mixer (mixer 70 in FIG. 16), or the like. Addition of the necessary reagents, powdered activated carbon, liquid or solid organics, etc. as previously described, can be provided. The excess sludge can be discharged via pipes 14.

Figure 17:
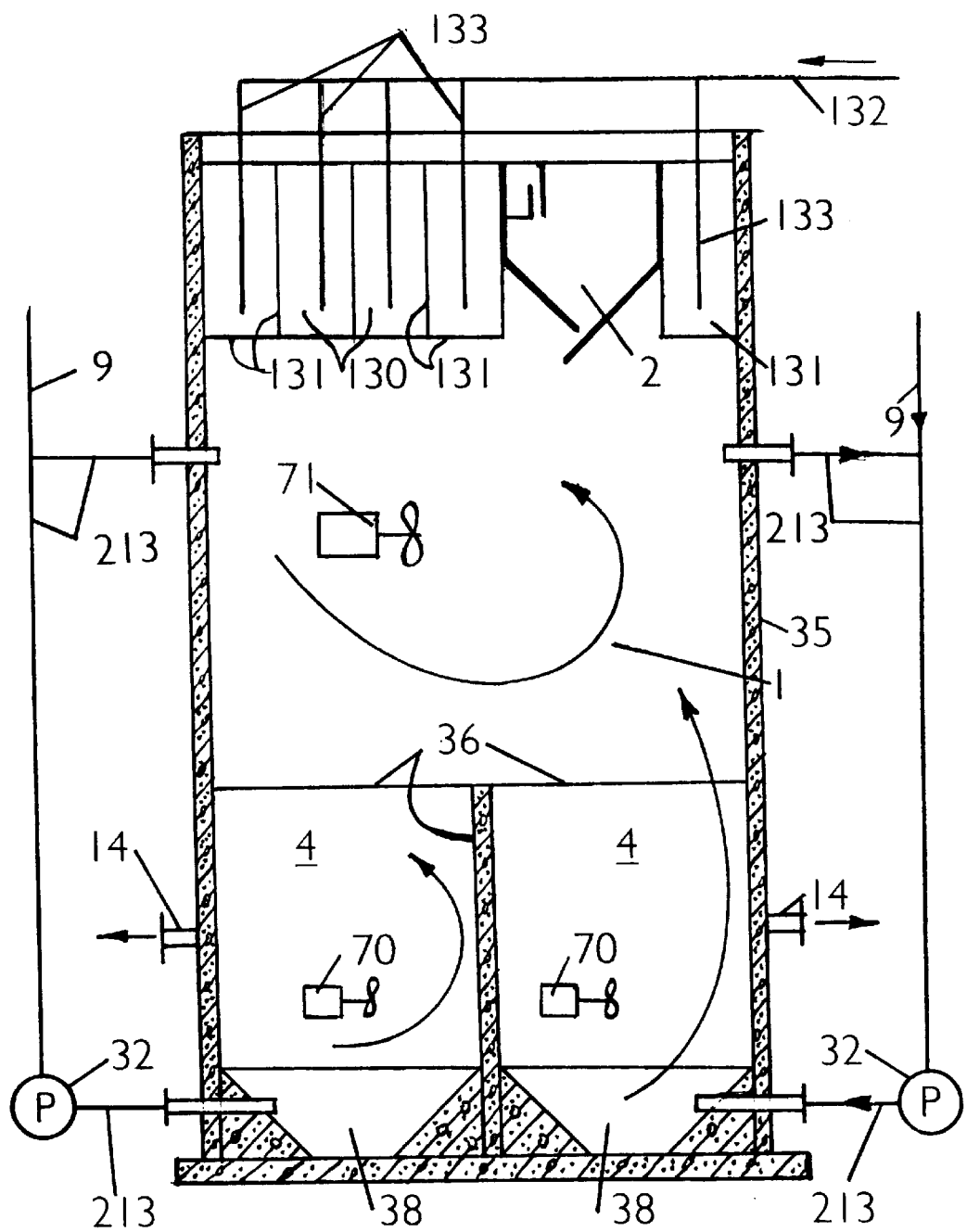
FIG. 17 is a vertical cross-sectional view showing a modification of the device shown in FIG. 16.

FIG. 17 illustrates a variation of the structure shown in FIG. 16. The difference in FIG. 17 is the provision of aeration compartments 130 over the entire open surface of the open anaerobic structure. These aeration compartments 13 are formed by an array of vertical baffles 131, with air supplied to the compartments via main 132, and distribution lines 133. Alternatively, compartments 130 can be formed by inclined submerged baffles as described in the U.S. Pat. No. 4,472,358, or other packed media may be provided.

Thus, the embodiment shown in FIG. 17 is similar to the device of FIG. 16, and the operation is similar. The difference in the embodiment of FIG. 17 is that further elimination of odorous gases is achieved by the use of the aerated compartments 130 supplied with air via pipe 132 and air distribution branches 133. Aeration causes propagation of the aerobic and facultative organisms which consume residual odorous organics and oxidize residual hydrogen sulfide.

The mixed liquor is transferred from the anaerobic reaction zone into a sludge separation means 2, such as a settling trough, a clarifier, a centrifuge, or a filtration device. After the sludge separation device 2, the clarified water is evacuated from the anaerobic system, while the sludge is returned to the anaerobic reaction zone 1, and eventually to the sludge conditioning zones 4.

The balance of the operation is like the embodiment of FIG. 16, and will not be repeated.

Apparatuses illustrated in FIGS. 8 to 17 correspond to combined flow charts such as those shown in FIGS. 1 to 5, and have multiple sludge separators. For example, in FIGS. 14, 16, and 17 a sludge separator 2 is used to return sludge through a zero volume channel, such as 5c in FIG. 3, and a sludge separation zone at the interphase of the reactor 1 and conditioners 4 is used to return sludge to the plurality of conditioners 4 (as in FIG. 2).

A sequencing batch reactor is shown in FIGS. 18 and 19. It consists of the outer shell 35 housing the reaction zone which is subdivided into volumes of influent 400 and dilution (optional) 401; and, the sludge conditioner consists of a single or multiple chambers 4 formed by the central pipe 39 and radial baffles 36. A bladed mixer 490 is supported by a structure 491, the mixer having a shaft 492 carrying one or more sets of mixer blades 493 and 494. A circulation and mixing pump 32, with pipes 410, 413, and 431, and valves 411, 412, is provided. Pipe 409 for feeding influent and discharging effluent is connected to the central pipe 39. An optional dome for gas collection may be provided.

The apparatus is operated as follows: As the cycle begins, the liquid level is at the top of the dilution level. Gradually, influent fed through pipe 409 fills the influent volume 400. During the filling step, sludge from a single or selected multiple compartments 4 is mixed with wastewater using pump 32, and piping and valving, and also the mixer 490. Mixing continues until the wastewater is sufficiently treated, which can be determined by chemical analyses or through measuring gas production intensity. After that, all mixing is stopped and sludge is allowed to settle below the influent volume. The influent volume is decanted via the central pipe 39 and pipe 409. Gas can be discharged to the air. After that, the cycle is repeated.

The optional diluting volume serves to reduce the occasional high concentrations of toxic slugs in the influent, thereby avoiding sludge poisoning and insuring adequate treatment.

Figure 20:
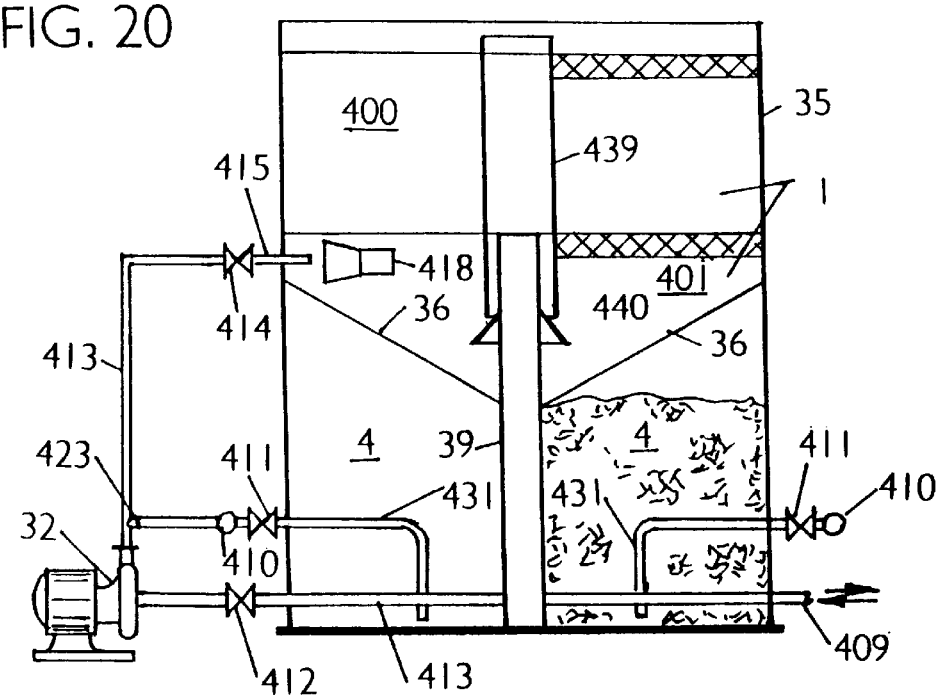
FIG. 20 is another modification of the structure shown in FIG. 18.

The apparatus shown in FIG. 20 differs from that shown in FIGS. 18 and 19 by the casing 439 installed around and above the central pipe 39, by the gas deflecting cone 440 placed under the casing 439, and also by the use of an injection mixer 418 provided with pipe 415 and valve 414.

The operation of this apparatus is also similar to that described for FIGS. 18 and 19. The provision of the casing 439 and cone 440 helps to avoid drafting of the floating sludge into the effluent as it descends from the upper to the lower position. It also reduces gas mixing effect on the settling sludge because the gas passage in the casing 439 and the central pipe 39 are excluded. Optionally, the space between the central pipe 39 and the casing 439 serves as a suspended sludge blanket clarifier. Accordingly, it separates clarified water from sludge particles entering this space through a slot between the cone 440 and the casing 439. The clarification option requires that the upflow velocity in the said space is low and limited to the settling velocity of sludge particles in the sludge blanket.

Figure 21:
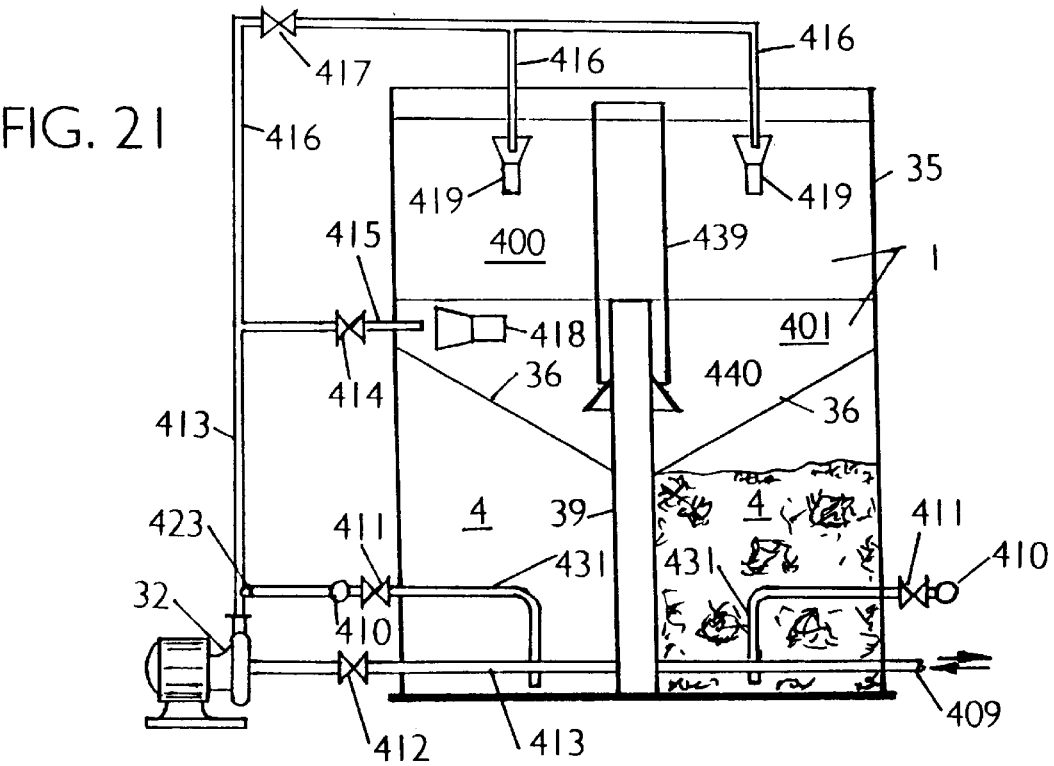
FIG. 21 is yet another improvement of the structure shown in FIG. 18.

The apparatus shown in FIG. 21 is a further improvement of apparatus shown in FIG. 20 by using additional injection mixers 419 at the top of the reactor, provided with pipes 416 and a valve 417. Operation of injectors 419 allows for degassing and sinking of the floating and buoyant sludge. Accordingly, the effluent carries out less suspended solids.

Figure 22:
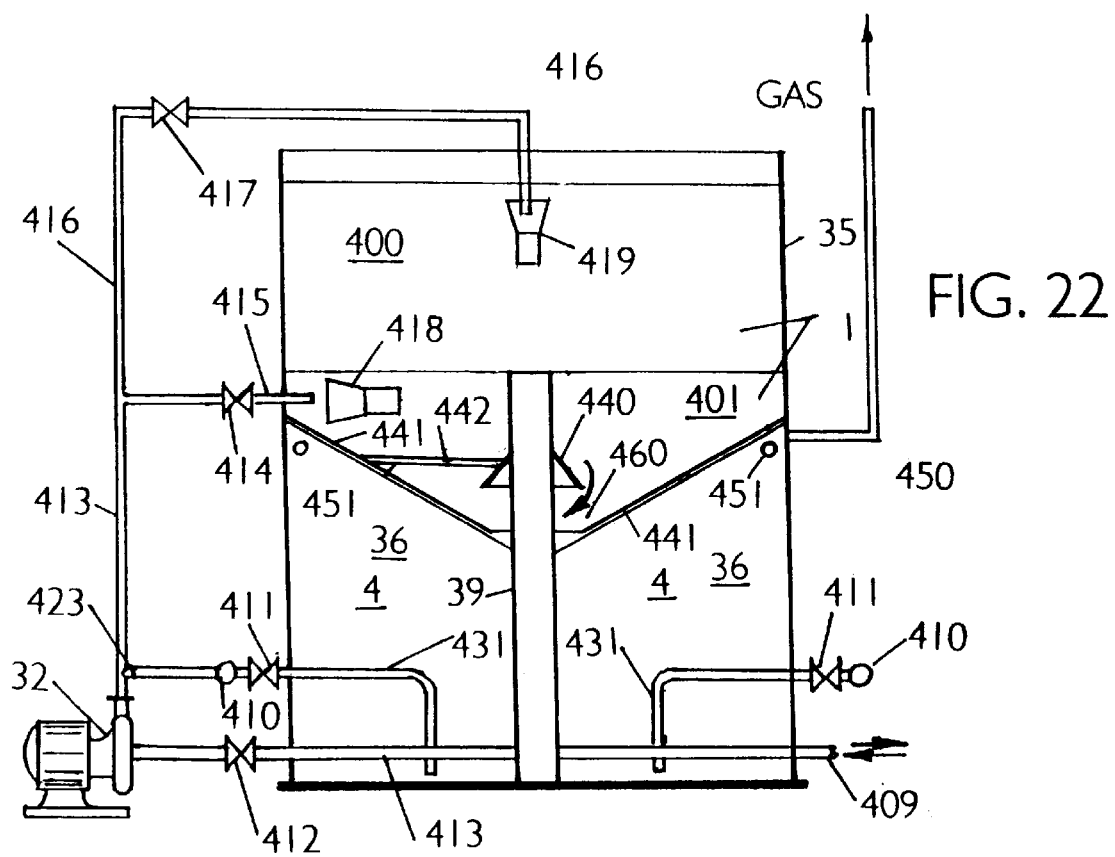
FIG. 22 is another alternative of the sequencing batch reactor.

The embodiment shown in FIG. 22 is yet another improvement of the apparatus shown in FIGS. 18 and 19. It has a cone 440 around the central pipe 440 and a cone 441 formed by a plate covering the peripheral section of compartments 4. Baffles 36 are provided with gas openings 451. An upper section of the cone 440 is connected to the cone 441 by a gas pipe 442. A gas removal pipe 450 is connected to the upper section of cone 441. A slot 460 is formed between cones 440 and 441 allowing the sludge to settle into compartments 4 and excluding gas flow from these compartments into the reaction/sludge separation zone.

In the course of operation, a portion of the gas generated in sludge conditioning compartments 4 is collected under cones 440 and 441, and is evacuated by pipes 442 and 450. At the end of the cycle, sludge is degassed in the reaction zone by mixers and settles into the sludge compartments 4. Accordingly, the decanted effluent is better clarified.

Figure 23:
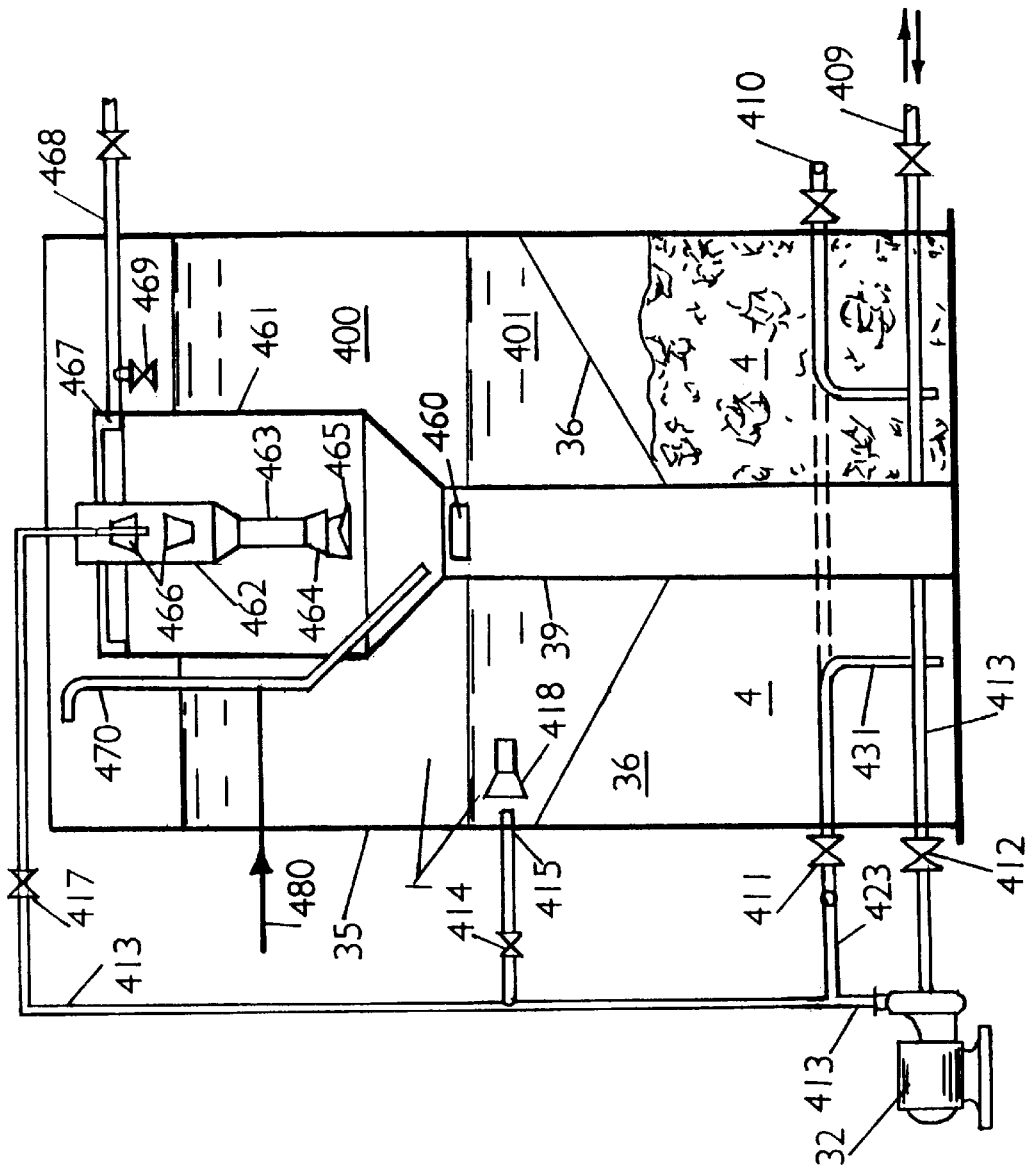

FIG. 23 illustrates a sequencing batch reactor similar to that shown in FIGS. 18, 19 and 20, and is provided with a built-in degassing and settling tank 461. The settling tank 461 is provided with a central degassing/water distribution unit comprising a wider section 462 with circulation cones 466 (see U.S. Pat. No. 4,472,358) and pipe 413, a narrower section 463 with water distribution cones 464 and 465, with a circular trough 467 for collecting clarified water with pipes 468 and 469 for effluent discharge and recirculation, with a sludge airlift 470 and air pipe 480. The weight of settling tank 461 is supported by structure 460 on top of the central pipe 39.

The system operates as follows: The influent is gradually added from the minimum water level to the maximum water level. Pump 32 mixes and circulates the sludge and wastewater from the selected sludge compartment 4 to the reaction zones 400 and 401 via pipes 413 and 415 and injection device 418, and also via settling tank 461. In the wider section 462, due to turbulence and circulation around the cones 466, sludge is degassed. The clarified water from the settling tank is recycled in the reaction zone through line 469, and separated sludge is returned to the reaction zone by airlift 470. When a batch of wastewater is adequately treated, line 469 is closed and line 468 is opened to discharge the treated clarified effluent. When the water level drops to the minimum level, the cycle is repeated.

Figure 24:
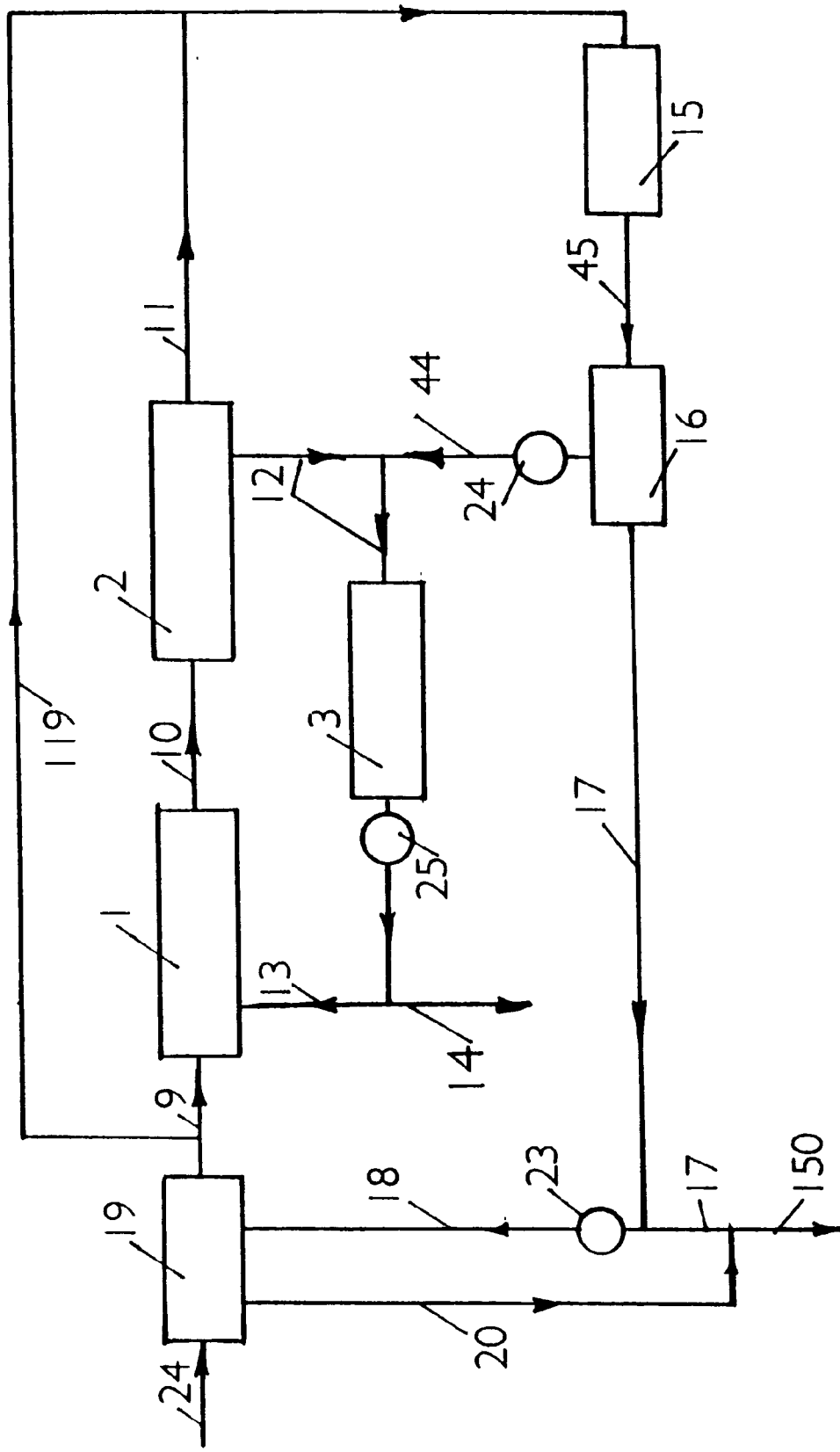
FIG. 24 is a flow chart showing a wastewater treatment plant including a coupled an anaerobic treatment stage and an aerobic treatment stage.

The embodiment of the invention shown in FIG. 24 includes an anaerobic reactor 1, the output of which is directed by pipe 10 to a sludge separator 2. The sludge from the sludge separator 2 passes through the pipe 12 and into the sludge conditioner 3, while the liquid effluent goes through the pipe 11 and into the aerobic reactor 15. The discharge from the aerobic reactor 15 is directed to the sludge separator 16.

The discharge from the sludge separator 16 includes the aerobic sludge, which is moved by the pump 24 through the pipe 44 and into the sludge conditioner 3. Optionally, this sludge can be directed to reactor 1. The liquid effluent passes through the pipe 17 from which it may be discharged to the environment, or at least partially directed to the anaerobic reactor 1 to be recycled.

It should be noticed that reactor 1 is operated in the incomplete treatment mode, and there is a by-pass line 119 to allow the influent from the line 21 to be directed immediately to the aerobic reactor in order to generate a greater quantity of aerobic sludge.

The system shown in FIG. 24 is known under name "coupled anaerobic/aerobic method". The use of the anaerobic stage with sludge conditioning is a novel feature of the system. Advantages of this stage have already been discussed. As in all coupled systems, separate sludges are cultivated in each stage, and there are no interactions between these sludges because they are forcibly (by the use of sludge separation means) separated. As in any conventional system, reactor 2 can include facultative anaerobic, anoxic, aerobic and other functional zones. However, these zones will be operated with a single sludge.

The additional novel feature of the apparatus shown in FIG. 24 is the use of the fluid flow control box 19. Briefly, the influent from the line 21 enters the box 19, and is discharged through the line 9. Recycled material from the sludge separator 16 enters the box 19 from the pipe 18, and excess liquid is discharged through the line 20. There is a nearly constant flow from the box 19 through the pipe 9, so the entire system can be maintained with substantially constant flow.

The flow control box 19 is shown in more detail in FIGS. 25–27, and it will be seen that there is a body including a large compartment 106 and a smaller, side compartment 105. There is a common wall 100 between the compartments 106 and 105, and the upper edge defines a notch 102 which acts as a weir. The box 19 also includes an end compartment 107. The compartment 107 adjoins the compartment 106, and is separated therefrom by a baffle 104. The baffle 104 does not extend all the way to the bottom of the compartments, so fluid flow is allowed between the two compartments through the passage 109. A side wall of the compartment 107 defines an opening 101 which is narrow, but extends down a substantial distance.

In operation, therefore, the wastewater influent is fed into the compartment 107 via pipe 21. The wastewater flow rate Q varies from $Q_{min}$ to $Q_{max}$. A recycle flow, $Q_r = Q_{max} - Q_{min} =$ Constant, is fed into the compartment 106 from the line 18. From the compartment 106, a portion of the recycle flow is transferred under the baffle 104 through the passage 109 and merges with the flow Q of the influent. The balance of the flow $Q_r$ overflows the broad weir 102 and flows into the compartment 105, then into the pipe 20. The influent Q and recyclate from the line 18 flow through the opening 101. This combined flow may go in line 9 (FIG. 24).

The use of a broad opening as the weir 102 provides nearly constant water level in the compartments 106 and 107; therefore, a nearly constant flow rate is provided across the opening 101. This is advantageous from the operations standpoint.

Figure 28:
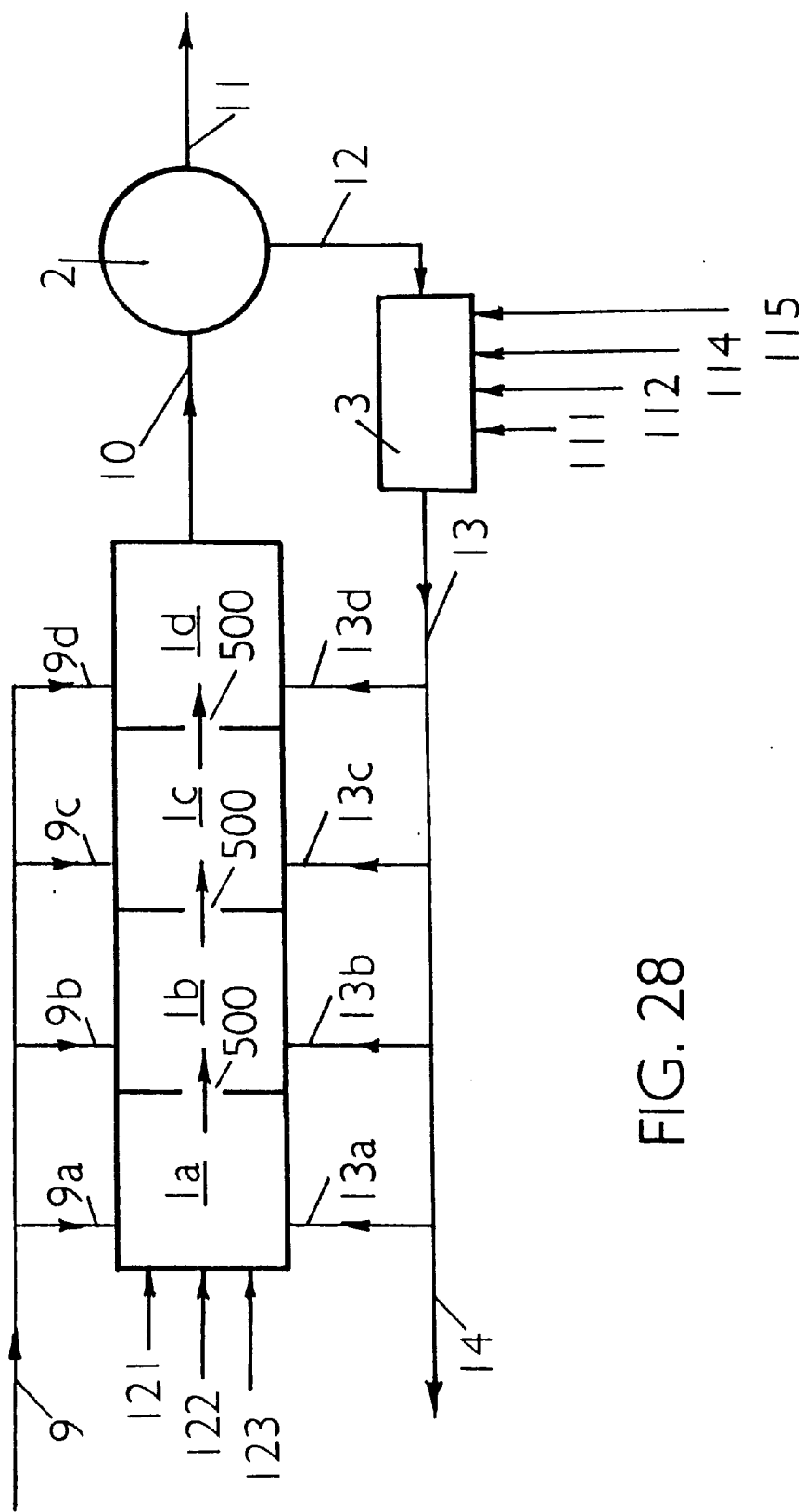
FIG. 28 is a flow chart showing an anaerobic block with a reactor comprising multiple sequential cells.

A further modification of the anaerobic apparatus, shown as a portion of the system in FIG. 24, is the use of the multiple cell anaerobic reactor 1 as illustrated in FIG. 28. This reactor comprises multiple sequential reactors 1a, 1b, 1c, and 1d, having one-way passages 500 for mixture of wastewater and sludge. The influent distribution piping 9, 9a, 9b, 9c, 9d is; connected to at least cell 1a, 1b, 1c, 1d. Lines for feeding reagents 121, 122, 123, for example, nutrients, PAC, neutralization chemicals, sulfur bearing substances, etc., are connected to cell 1a. Optionally, reagents can be supplied in any or all cells. Line 10 connects the last reactor cell 1d with the sludge separator 2. Sludge conditioner 3 is provided with the feed line 12 and the conditioned sludge line 13 branching into lines 13a, 13b, 13c, and 13d, each connected to an individual reactor cell 1a, 1b, 1c, and 1d. Lines 111, 112, 113, 114, 115 for feeding various reagents to the sludge conditioner are also provided.

Apparatus shown in FIG. 28 can be adapted to various modes of operation. For example, it can be operated in the incomplete treatment mode by feeding wastewater mostly in the inlet cell 1a thus insuring good acidification, and feeding a deficient flow of methanogen mostly in last sections (1c, 1d) of the reactor thus reducing contact time for methanogens to consume fatty acids. The reactor 1 can also be optimized to treat time variable organic loading by distributing unequal fractions of influent cells 1a, 1b, 1c, 1d and produce equalized effluent. Or, it can be optimized to minimize the reactor volume by providing distributed feed of influent and/or conditioned sludge among cells 1a, 1b, 1c, 1d. Alternatively, cells may be used for different functions. For example, the entire influent may be fed into cell 1a with no, or very little, feed of the conditioned sludge into this cell. Then, cell 1a becomes an acidification step. The following cells, 1b, 1c, 1d may be fed with the conditioned sludge to be operated in a methanogenic regime. Accordingly, such a reactor affords flexibility of operation.

Figure 29:
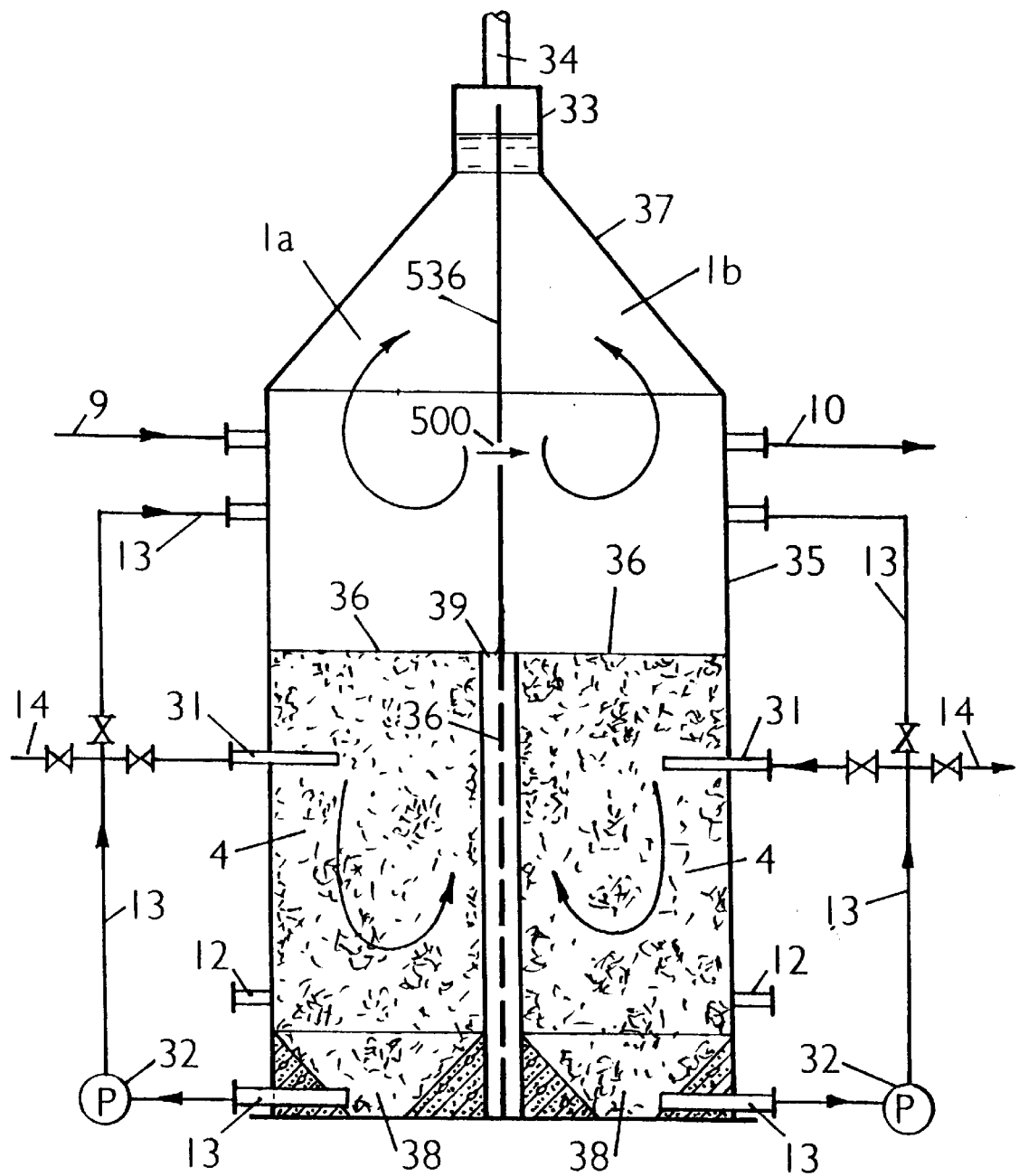
FIG. 29 is a cross-section of a reactor with multiple sludge compartments and multiple reactor cells.

FIG. 29 is an example of a reactor with multiple sludge compartments 4 and multiple reactor cells 1a and 1b. This structure is similar to FIG. 8 and differs only by extending some or all baffles 36 upward using extensions 536. These extensions go into the gas collection section 33, and divide the total reaction space into multiple cells. One-way passages 500 are provided in the extension baffles 536. The apparatus is operated as a sequence of cells in the embodiment shown in FIG. 28. Optionally, sludge conditioning compartments located under a given reaction cell can be used in conjunction with another (not overlying) reaction cell.

Figure 30:
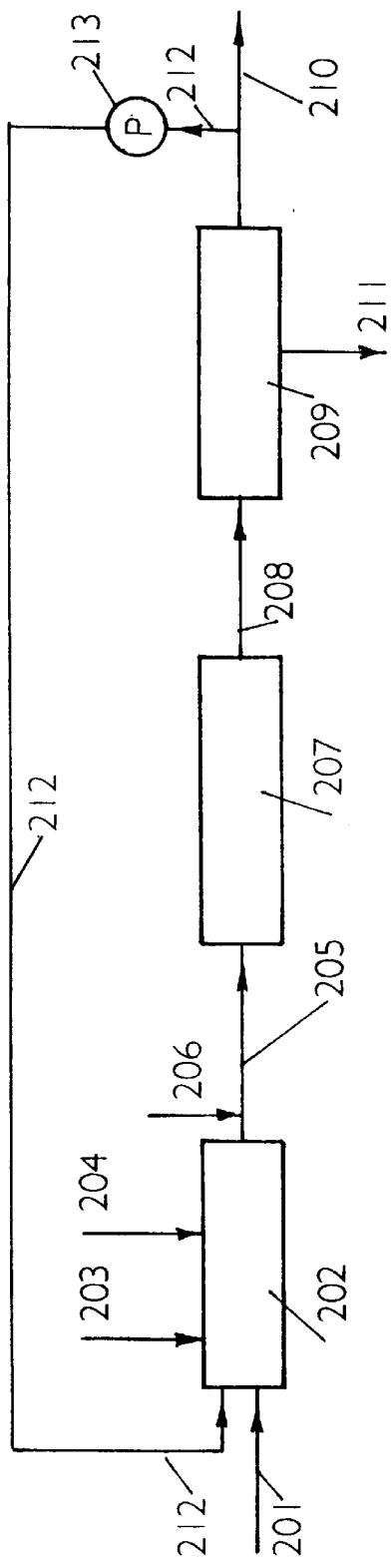
FIG. 30 is a flow chart of a system for sludge thickening made in accordance with the present invention, with sludge bioheating and bioflotation.

Referring now to that embodiment of the invention shown in FIG. 30, there is an aerobic reactor 202 with the influent conduit 201, and a line 203 for supplying an oxidizer, an optional line 204 for feeding nitrates, nitrites or other source of nitrogen (e.g. urea), a line 205 connecting the reactor 202 to an anaerobic reactor 207 (preferably with sludge conditioning zones as in FIGS. 8 or 19), an optional line 206 for feeding nitrates or nitrites into reactor 207 (or line 205 connected to the reactor 207), a line 208 connecting reactor 207 to a sludge/water separator 209, lines 210 and 21 Connected to the separator 209 for the evacuation of sludge and water respectively, and a line 212 with a pump 213 connecting the sludge pipe 210 to the bioheating reactor 202.

In operation, the sludge is fed via line 201 in the aerobic reactor 202. The oxidizer (air, or oxygen enriched air, or oxygen) is also fed into reactor 202. Optionally, nitrates, nitrites or other source of nitrogen are also added to or generated in the reactor 202. In the reactor 202, organics of the sludge are oxidized and heat is generated. Accordingly, sludge temperature increases and viscosity of the liquid phase decreases, providing improved conditions for sludge/water separation. Most of the nitrogen forms in the liquid phase are converted into nitrites and nitrates. From reactor 202, sludge is transferred into the anaerobic reactor 207 via line 205. Optionally, nitrates and/or nitrites are added to the sludge in the line 205 or in the reactor 207. In reactor 207, aerobic sludge is converted into anaerobic sludge and at least partially digested. Digestion is enhanced and accelerated due to the elevated temperature of the sludge fed into the reactor 207. During digestion, carbon dioxide, methane, and nitrogen are produced in the form of small bubbles. The digesting sludge is transferred via line 208 to the flotation type sludge/water separator 209 wherein the bulk of sludge floats up and is evacuated through the pipe 210; the water is evacuated via pipe 211. Optionally, a portion of the floated sludge is recycled to the reactor 202 via line 212 with the use of conveying means (a pump) 213. The organic fraction of the recycled sludge is additionally oxidized in the aerobic process in reactor 202 thus providing higher temperature of the sludge in the reactor 202 and further down the flow. The anaerobic process rate and the sludge/water separation are accelerated at higher temperature.

Figure 31:
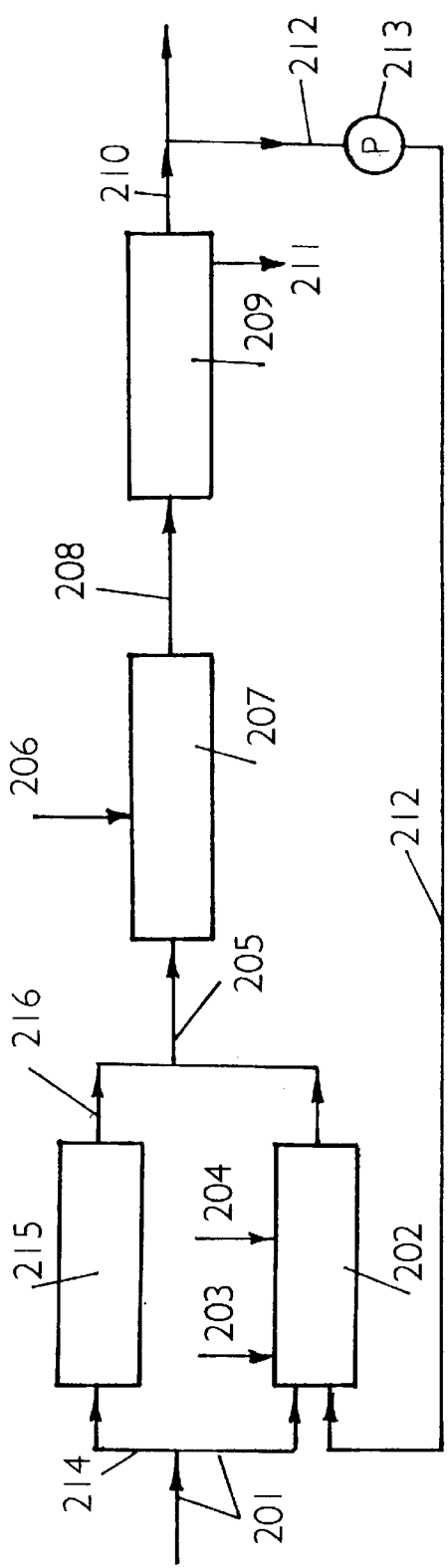
FIG. 31 is a modified form of the system for sludge thickening comprising parallel aerobic bioheating and anaerobic sludge conditioning steps followed by a bioflotation step.

FIG. 31 shows another system for sludge thickening comprising a feed pipe 201 connected to an aerobic bioheating reactor 202. Reactor 202 is provided with line 203 for oxidizer supply and optional means 204 for feeding nitrates, nitrites or other sources of nitrogen. A branch 214 is connected to pipe 201 and leads to an anaerobic reactor 215 installed in parallel to reactor 202. The aerobic reactor 202 and anaerobic reactor 215 are connected to the anaerobic reactor 207 by pipes 205 and 216. The reactor 207 (preferably, with sludge conditioning zones) is optionally provided with a line 206 for feeding nitrates and/or nitrites. Reactor 207 is connected by means of pipe 208 to the sludge/water separator 209. Pipes 210 and 212 are provided in the separator 209 for evacuation of the floated sludge and water respectively. A branch 212 with a pump 213 is provided for recycling of a portion of the sludge to the aerobic reactor.

In addition to the process steps previously described, an anaerobic cultivation step, carried out in reactor 215, is employed in this system. In this step, anaerobic organisms are cultivated so that, when heated, aerobic and anaerobic sludges are mixed, the anaerobic process in the reactor 207 is accelerated by the inoculum from the reactor 215, and the volume of this reactor is reduced. A portion of the recycled floated sludge can be optionally fed in the anaerobic cultivation step, reactor 215. This will increase temperature in the cultivation step and accelerate the process rate.

Figure 32:
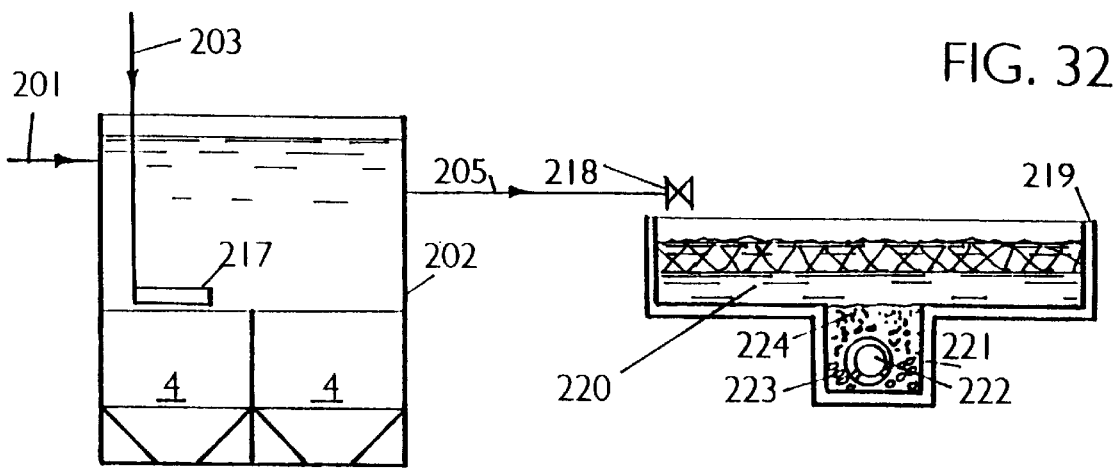
FIG. 32 is a schematic diagram of a system for sludge thickening, dewatering and drying comprising a bioheating unit and a drying bed functioning as sludge flotation, thickener and a drying means.

FIG. 32 illustrates a system for sludge thickening and drying. The system comprises an aerobic bioheating reactor 202 having anaerobic sludge conditioning compartments 4 with sludge circulation means (not shown) at the bottom, sludge feed pipe 201, and oxidizer via line 203 and aerators 217. Reactor 202 is connected to a sludge bed 219 by a pipe 205 with a valve 218. The sludge bed 219 may have a concrete bottom 220 with one or several drainage channels 221 housing perforated drainage pipes 222. Pipes 222 are surrounded by a gravel layer 223 overlaid with a sand layer 224.

Operation of the system shown in FIG. 32 is as follows. sludge is periodically fed via pipe 201 into the reactor 202 and aerated by air (or oxygen enriched air, or by oxygen). During aeration, sludge becomes heated. A fraction of the sludge is anaerobically conditioned in compartments 4. A portion of the heated sludge is periodically added with some anaerobic sludge from compartments 4 and is transferred via pipe 205 by opening valve 218 onto the sludge bed 219. On the bed 219, aerobic sludge inoculated with added anaerobic sludge rapidly turns anaerobic, gases are generated, and the sludge particles are floated by these gases to the top of the sludge charge leaving the bottom layer as comparatively clear water. Clear water flows laterally to the channel 221, filters through the sand 224 and gravel 223 layers in the drainage pipe 222, and is evacuated from the system via drainage pipe 222. The floated sludge layer subsides and remains on the concrete floor 220 until dry. Dry sludge is removed from the bed manually or mechanically. A thin layer of sand over the channel 221 may also be removed. This sand should be replaced periodically with fresh sand. Optionally, the entire bed may be made of sand layer.

Due to the use of the conditioned anaerobic sludge with massive supply of methanogens, fatty acids are rapidly consumed and sulfides are not generated. Moreover, complete treatment of filtrate occurs and its recycle back to the water treatment train does not increase the organic loading on the treatment processes.

Figure 33:
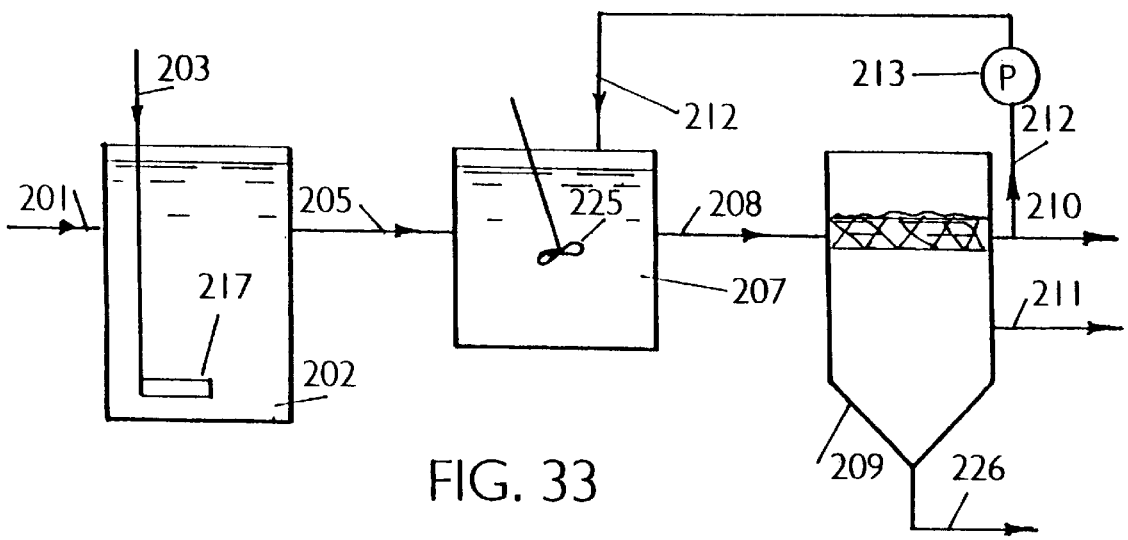
FIG. 33 is a schematic diagram of a system for continuous sludge thickening comprising a bioheating means, an anaerobic reactor and a sludge/water separator.

FIG. 33 illustrates another modification of the system for sludge thickening. This modification comprises an aerobic bioheating reactor 202 with line 201 for feeding the raw sludge, a line 203 and aerators 217 for feeding oxidizer (air, oxygen enriched air, or oxygen) and line 205 for transferring the bioheated sludge to the anaerobic reactor 207. Reactor 207 is equipped with a mixing means 225. This reactor is connected to the sludge/water separator 209 via pipe 208. Separator 209 is provided with pipes 210, 211, and 226 for removal of the floated sludge, clear water, and heavy sediments respectively. An optional sludge recycle pipe 212 with a pump 213 connects the line 210 with the reactor 207.

The system illustrated in FIG. 33 is operated in a continuous regime. Raw sludge is fed via pipe 201 into the reactor 202, oxygen for aeration is supplied through the line 203 and aerators 217. Organic matter of the raw sludge is consumed and oxidized by bacteria, and the sludge is bioheated. The heated sludge is transferred via pipe 205 into the anaerobic reactor 207, wherein the contents are mixed by means 225. At least partial digestion of the sludge occurs in the reactor 207 and digestion gases are generated. After that, the sludge is conveyed to the sludge/water separator 209 via pipe 208. In the separator 209, gases float up the sludge particles and an underlying layer of comparatively clear water is formed. A small quantity of heavy particles settles down in the separator 209. Floated sludge is evacuated via pipe 210 and directed to a further treatment, for example, to a rotary dryer. A portion of the floated sludge is optionally recycled for inoculation to the reactor 207 via pipe 212 by a pump 213. Clear water is discharged through the pipe 211, and heavy sediments are removed through the pipe 226.

Figure 34:
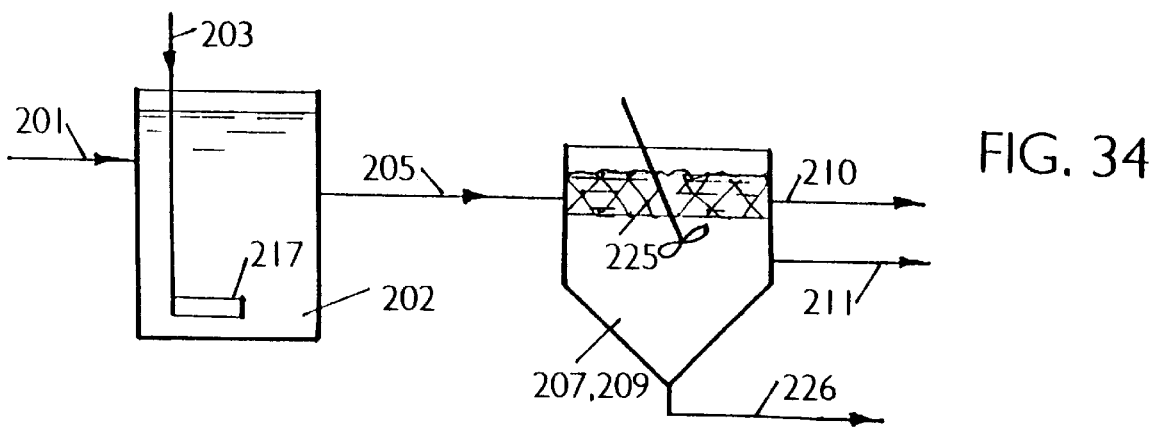
FIG. 34 is a schematic diagram of a system for periodic (batch) sludge thickening comprising a means for bioheating and a combined anaerobic reactor and sludge/water separator.

FIG. 34 illustrates a system for periodic (batch) treatment of sludge. The system comprises an aerobic reactor 202 for sludge bioheating and a reactor/separator 207, 209) for anaerobic digestion and sludge flotation. Reactor 202 is provided with a pipe 201 for feeding raw sludge, and a pipe 205 for transferring the bioheated sludge from reactor 202 to reactor 207, 209. An oxidizer line 203 and aerators 217 are provided in the reactor 202, while a mixer 225 is installed in the reactor 207, 209. Reactor 207, 209 is also provided with pipes 210, 211, and 226 for the evacuation of the floated sludge, discharge of the clarified water, and discharge of the heavier sediments.

The system illustrated in FIG. 34 is operated as follows. Raw sludge is fed into the reactor 202 by the pipe 201 until the maximum level is reached. During this fill time, the sludge is aerated with air, or oxygen, or oxygen enriched air, and becomes bioheated. A portion of the heated sludge equal to the volume of the reactor 207, 209 is transferred by the pipe 205 to the anaerobic reactor 207, 209. In this reactor, the sludge is at least partially digested and the anaerobic gases are generated. Mixing may be provided during the digestion period. After the digestion period, mixing is stopped and the sludge flotation is allowed to proceed. At the end of the flotation period, the bulk of the sludge, clarified water, and heavier sediments are removed from the reactor 207, 209. A portion of the sludge is left for inoculation of the next batch. By this time reactor 202 may already be filled again. Then, a portion of the heated aerobic sludge is transferred to the reactor 207, 209 and the cycle is repeated.

Figure 35:
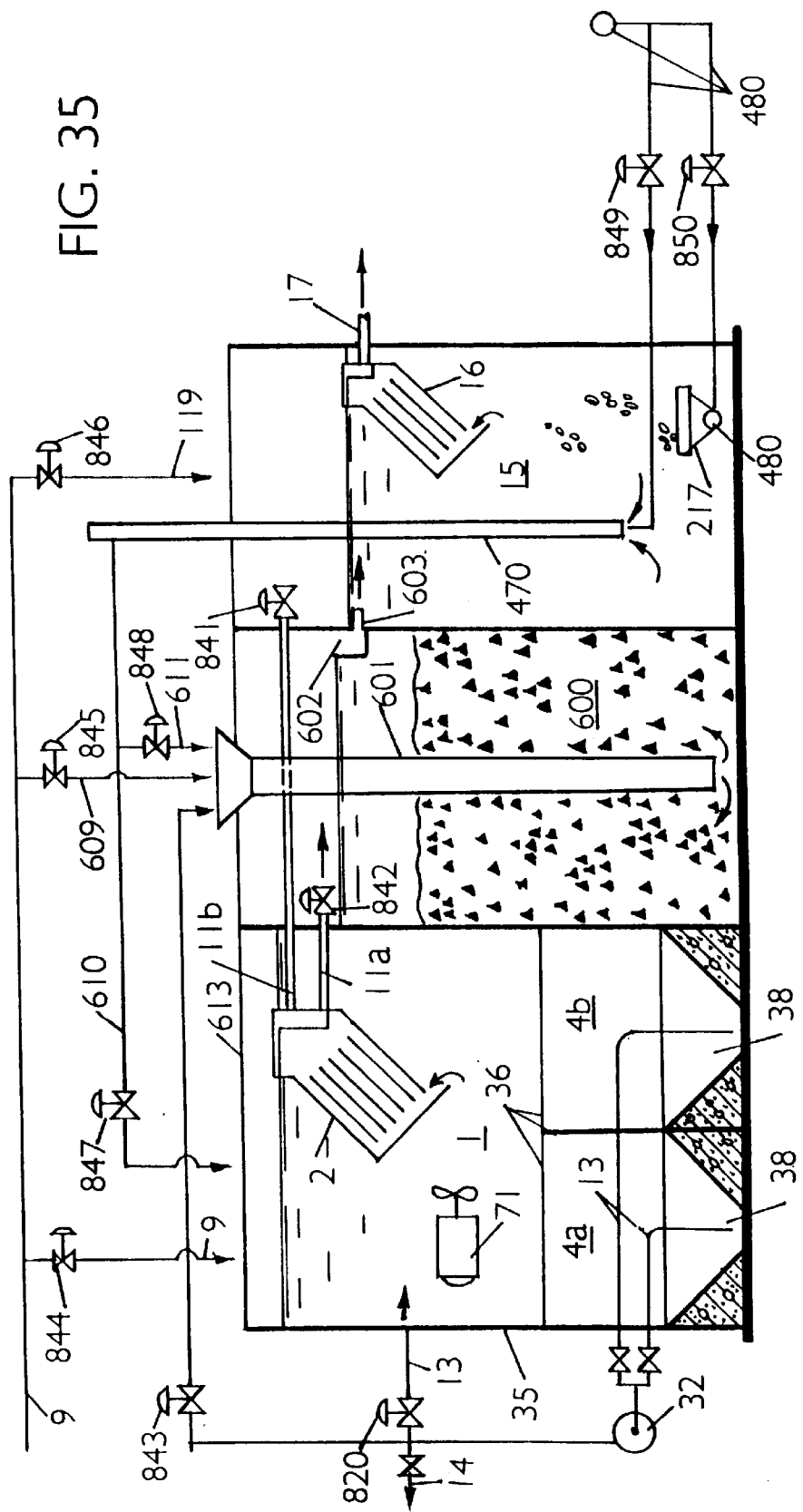
FIG. 35 is an elevational view of a combined anaerobic-aerobic process with a zone of a simultaneous presence of aerobic and anaerobic sludge.

FIG. 35 illustrates a layout of the improved anaerobic-aerobic system. The system comprises the anaerobic reaction stage 1 disposed above multiple sludge conditioning sections, or compartments, 4a, 4b, etc. There is a combined upflow reaction-sludge-separation stage 600 having a central downcoming pipe 601 and collection trough 602, and a reaction stage 301 with a sludge separator 300.

The anaerobic reaction stage and sludge conditioning sections are equipped with a sludge separation device 2, such as a lamella clarifier. The clarifier has outlets 11a and 11b connected to stages 600 and 15 respectively, a mixing means 71, influent feed pipe 9 with branches 609 and 119, and line 13 with branch 613 for sludge recycle from the sludge conditioners to the anaerobic reaction stages 1 and 600 by means of a pump 32, and a line 14 for sludge discharge.

The combined reaction-sludge-separation stage consists of a downflow pipe 601 and an upflow section 600. A water collection trough 602 is installed at the top of the section 600. This trough is discharged into aerobic section via line 603. Section 600 is preferably an upflow suspended sludge blanket reactor. Optionally, section 600 may be filled with a fluidizable medium, such as sand, granular activated carbon, crushed porous baked clay (ceramsite) or other suitable medium. The suspended sludge blanket and fluidizable media are preferred in cases when a risk of plugging the fixed medium exists. Adsorption media, such as carbon, or attached biomass, constitute an active material in the bed. Also optionally, packed bed of stone or fixed plastic media can also be used.

The reaction stage 15 is equipped with air pipes 480, aerators 217, and an airlift means 470 for transferring mixed liquor from the reactor stage 15 via lines 610 and 611 to sections 1 and 600. Means (not shown in figures) are provided for the optional feeding of the powdered activated carbon (PAC), coagulants and other reagents listed in the previous discussions. Optionally, stage 15 may be a submerged biological filter, a GAC upflow reactor, or other reactor type or a combination of reactors.

Motorized and manual valves are provided on air, wastewater and sludge lines.

The system is operated as follows. Wastewater is fed into the anaerobic reaction stage 1 and is mixed by the mixing device 71 with the anaerobic sludge grown in this stage and conditioned in the sludge conditioner 40. Some conditioned sludge is recycled via line 13 by a pump 32. The excess conditioned sludge is discharged via line 14. Mixed liquor is partially clarified in the sludge separator 2 with the sludge falling back into the reactor stage 1, and a fraction of incompletely treated clarified water being discharged via pipe 601 to the reaction stage 600. The balance of the clarified water is transferred to the reaction stage 15 via line 118. Biological and other processes in the anaerobic functional zone are the same as previously described. Additionally, a small flow of the anaerobic conditioned sludge may be directed via line 613 to pipe 601 and reactor 600. Organics in the incompletely treated clarified wastewater and the mixed liquor after the anaerobic stage are represented mostly by easily degradable fatty acids and other simple compounds. Only a small proportion of the constituents in this stream are residuals of poorly degradable and toxic and recalcitrant organics.

The clarified water and conditioned sludge from the anaerobic stage 1 and conditioners 4, and the mixed liquor from the aerobic stage 15, are fed to the downflow pipe 601 of the reaction stage 600. In part, GAC is regenerated by desorption of certain constituents and readsorbtions of them by the PAC flowing through and removing these constituents from the reactor and eventually (with wasted sludge) from the system. Optionally, a portion of the wastewater influent is also fed into section 600 via line 609 and pipe 601. The flow from the stage 15 via airlift 470 and pipe 611 may carry substantial quantities of nitrates and nitrites. From the downflow pipe 601, the mixture of waters and aerobic and anaerobic sludges is directed into the upflow section 600. For the purposes of discussion, it is assumed that the section is filled with a fluidized GAC, which is the first active material; operation of this section with other fluidizable material or with a fixed bed is very similar. The GAC layer is fluidized by the upflow. GAC is retained in the section 600, while the lighter biological sludge, with or without PAC, is passing through the section 600 and is fed into the reaction stage 15 via pipe 603. PAC and associated biomass, or their combination, constitutes a second active material in the reaction zone. The combined sludge in the section 600 is composed of aerobic and anaerobic organisms. The biomass attached to the GAC particles is predominantly anaerobic, while that attached to the PAC particles coming from section 15 is aerobic. Therefore, enzymes originated in aerobic and anaerobic environments simultaneously act upon and degrade organics, including residual quantities of recalcitrant and toxic compounds. Moreover, nitrates and nitrites are reduced by denitrifying organisms to nitrogen and water. Some nitrites and nitrates will be reacting with poorly degradable, recalcitrant and toxic organics. Optionally, nitrates and nitrites may be added in the section 600 to increase the effect of oxidation of such organics. Chemical reaction between ammonia and ammonium ions, and sulfide and sulfide ions on one hand and nitrites and nitrates and sulfites and sulfates result in formation of nitrogen and sulfur.

The stage 600 described in this embodiment is a novel reaction-separation method and device in which part of the sludge is retained (grown and immobilized) on the GAC, and another portion is passed through with the PAC (or in form of biological flock found in usual sludge). Optionally, the fluidized bed may be formed by a granular anaerobic sludge grown with PAC. The adsorption capacity of either GAC, or granular sludge with PAC is regenerated biologically using active agents associated with aerobic and anaerobic sludges simultaneously present in the system. Optionally, multiple parallel stages 600 operated simultaneously, or in a queue may be used.

Aerobic biochemical processes occur in the reaction stage 15, possibly with the nitrification. The nitrogen control in the effluent is provided by chemically reacting ammonia and nitrites and nitrates and biological reduction of nitrates and nitrites in the reaction-separation stage 600. Ammonia is generated in anaerobic stages 1 and 600. Reaction between nitrogen oxides and ammonia and/or sulfides reduce the total ammonia to a greater extent than denitrification alone, so that the nitrogen leaving the section 600 is just what is needed for aerobic organisms in stage 15. Therefore, a thorough nitrogen removal is provided. Phosphorus control is provided by partial biological uptake and by addition of reagents, such as iron and aluminum coagulants, or others, preferably to the reaction stage 15.

Figure 36:
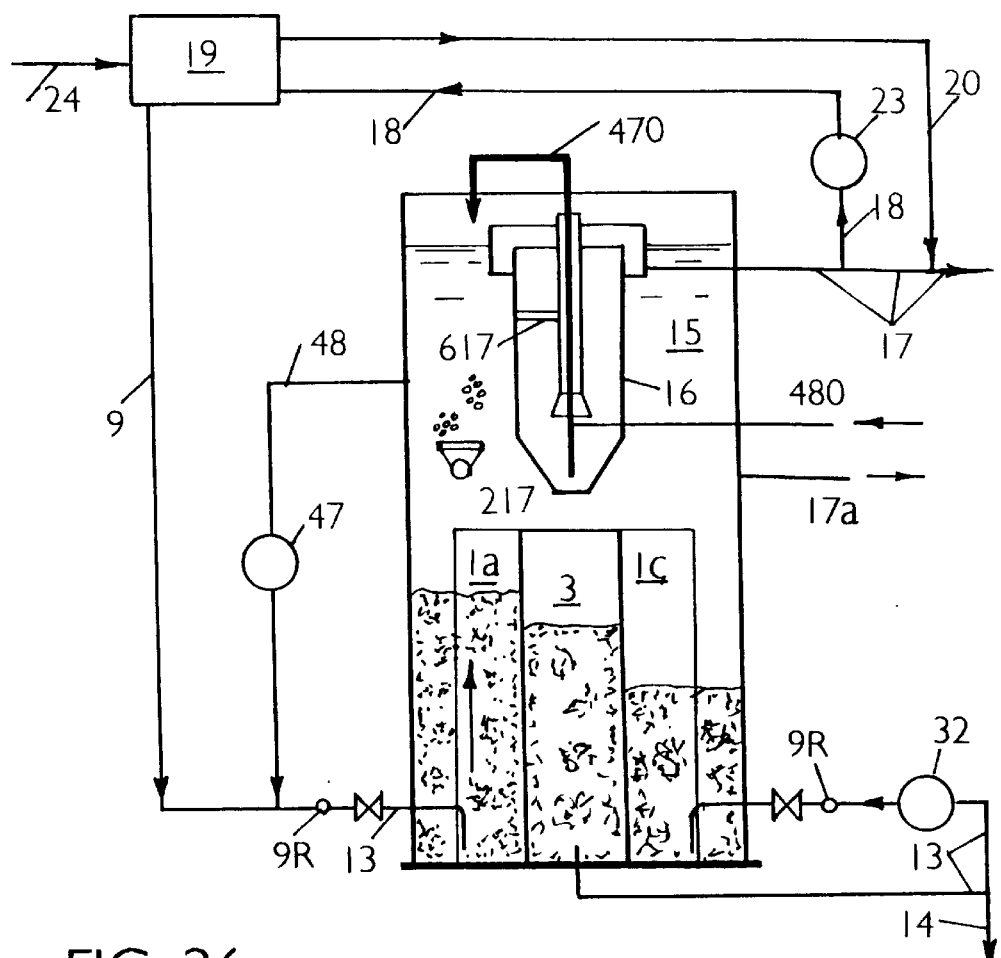
FIG. 36 is another form of apparatus similar to FIG. 35 but having the aerobic zone disposed above the anaerobic zone.
Figure 37:
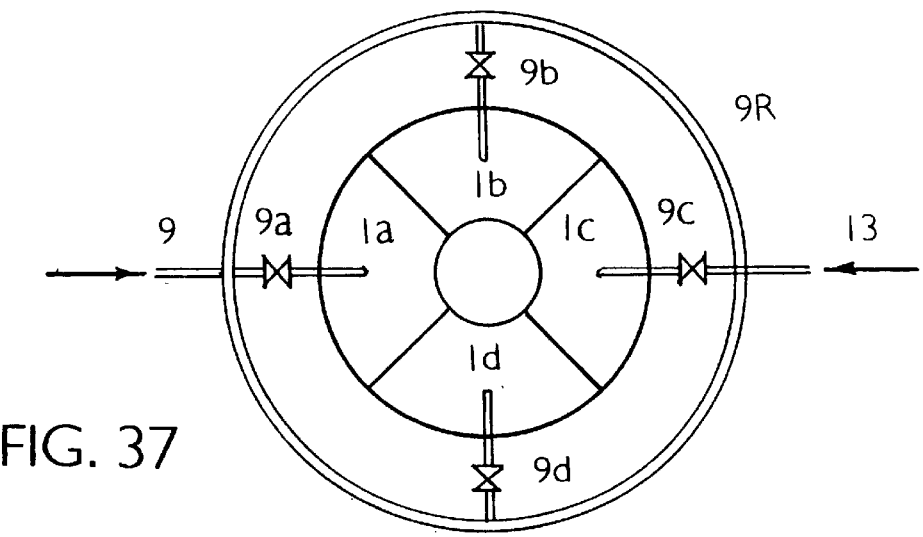
FIG. 37 is a plan view of the anaerobic section of the apparatus shown in FIG. 36.

Referring now to FIGS. 36 and 37, there is shown an alternative apparatus for practicing the method of this invention. The apparatus consists of an anaerobic reaction stage 1 made of several compartments 1*a*, 1*b*, etc., an anaerobic sludge conditioner 3 located centrally relative the said anaerobic compartment 1, an aerobic reaction stage 15 disposed above the anaerobic compartment 1 and the sludge conditioner 3, and a sludge separator 16 located in the upper section of the aerobic reaction stage 15.

The anaerobic compartments 1*a*, 1*b*, 1*c*, etc. can be a free volume section with a fluidized blanket of anaerobic sludge or, optionally, be loaded with fluidizable coarse bed media such as sand, granular activated carbon, or crushed packed porous clay (ceramsite) or they may have a fixed bed of stone or plastic contact medium or other packing type. Granular anaerobic sludge with or without PAC can also be used as a fluidizable material. The aerobic reaction zone 15 can optionally be packed with a support material providing the attached growth as in submerged biofilters. The aerobic stage is equipped with aerators 217. Feed line 24 for the influent is connected to a constant flow box 19, this line continues downward as line 9 and is connected to a ring pipe 1R having branches 1*a*, 1*b*, 1*c*, etc. with valves for each anaerobic compartment 1*a*, 1*b*, 1*c*, etc. A line 48 with a pump 47 connects aerobic stage 15 to the anaerobic compartments 1 via lines 9, 9R and branches 9*a*, 9*b*, 9*c*, etc. Line 13 and pump 32 connect the bottom part of the sludge conditioner via the ring pipe 9R and branches 9*a*, 9*b*, 9*c*, etc. to the bottom part of the anaerobic compartments 1*a*, 1*b*, 1*c*, etc. Pipe 14 is the sludge discharge. Pipe 617 connects the volume of the aerobic stage 15 to the separator 16, which is shown here as a vertical flow clarifier. An airlift 470 is installed in the clarifier 16 for transferring the separated sludge to the aerobic reaction stage 15. Pipe 18 further connected to pipe 17 is provided at the clarifier 16 of the effluent discharge. The effluent recycle pipe 18 with a pump 23 connects the effluent pipe 18 to the constant flow box 19. An overflow pipe 20 connects the box 19 to the effluent line 17. Means for feeding various reagents (not shown) as previously described are also provided. These means may be attached to feed said reagents to either aerobic reaction stage 15 or anaerobic compartments 1.

The system is operated as follows. The wastewater influent and the recycled effluent are fed via lines 24 and 20 into the constant flow box 19. The constant flow of the influent and recycled effluent mixture produced by the box 19 is fed via lines 9, 9R, and 9*a*, 9*b*, 9*c*, etc. into the selected compartments 1*a*, 1*b*, 1*c*, etc. A recycled flow of the mixed liquor from the aerobic reaction compartment 15 is fed into the anaerobic compartments 1*a*, 1*b*, 1*c*, etc. by the pump 47 via line 48. One or several compartments can be selected by opening or closing valves on branches 9*a*, 9*b*, 9*c*, etc. The upflow streams fed into the selected anaerobic compartments fluidize the bed of biological sludge, or the bed of the coarse material supporting the sludge (sand, GAC, ceramsite). The original organic materials and metabolic products from the aerobic reaction stage 15, including nitrates and nitrites, are anaerobically converted in the compartments 1 forming anaerobic biomass, methane, carbon dioxide, hydrogen, sulfides, nitrogen, and residual fatty acids and other organics, including residual poorly degradable and toxic constituents. If GAC is packed in compartments 1 and PAC is added to the mixed liquor, preferably in the aerobic reaction stage 15, the processes occur in the manner as described above. This anaerobic stage converts organics and inorganics, including nitrogen removal. Recycle via line 48 provides a repeated (alternating) anaerobic-aerobic treatment of organics and metabolic products. The suspended solids and some organics are coagulated and flocculated by both the aerobic sludge brought in via recycle pipe 48, and the conditioned anaerobic sludge fed via lines 13 and 9*a*, 9*b*, 9*c*, etc. and the anaerobic sludge cultivated in the compartments 1. The process can further be improved by applying previously described physical, physical-chemical and chemical actions to the anaerobic system in compartments 1.

The mixed liquor leaving the selected compartments 1 enters an area below the aerators 217 and above the top of compartments 1. Here, part of the sludge settles down by gravity into the sludge conditioner 3, and onto the top of compartments 1 that are not selected at the time. Anaerobic sludge is conditioned in the sludge conditioner as previously described. Part of this sludge is recycled to the anaerobic reaction compartments 1, and the balance is discharged through the line 14. The liquid flow from the selected anaerobic compartments 1 with residual organics and with the residual suspended solids enters the aerobic reaction stage, is subjected to the aerobic treatment with corresponding organics removal, suspended solids coagulation-flocculation by the sludge, nitrification, and partial phosphorus removal due to the microbial uptake. Coagulants and flocculants; can be added to improve the sludge settling and for removal of phosphorus. PAC and other reagents can also be used with the benefits previously described. If the optional support medium is provided, an attached growth of aerobic biomass will occur. It will improve nitrification-denitrification in the aerobic reaction stage 15. The anaerobic gases will cross the aerobic reaction stage 15 and become additionally treated. Thus, residual hydrogen sulfide will be partially oxidized to sulfite and sulfate, and partially converted to sulfur. Ammonia will react with nitrites and nitrates to become nitrogen. Organic gases will be mostly absorbed and aerobically metabolized. Methane will be partially absorbed, metabolized by methanotrophic bacteria and support the growth of such bacteria. This is very useful for co-metabolizing the chlorinated organics. The aerobic mixed liquor is fed into the clarifier 16 through pipe 17, precipitated to the bottom of the clarifier, and recycled back to the aerobic reaction stage via airlift. The clarified water is evacuated at the top of the clarifier via line 17. Part of the clarified water is discharged by line 17 and the balance is fed by pump 23 via line 18 to the constant flow box 19. The excess recycle flow is discharged by line 20 to the effluent discharge line 17. The aerobic sludge is partially circulating in the aerobic reaction stage 15, and partially is pumped through the anaerobic compartments 1 by line 48 and pump 47, and partially precipitates to the anaerobic sludge conditioner 3. Regardless of the pathway, all aerobic sludge is eventually transferred to the previous, anaerobic stage. Optionally, section 15 may be separated into multiple compartments operated as facultative, anoxic, aerobic, and polishing process steps.

Modifications to the system presented by FIGS. 36 and 37 may include multiple sludge conditioning zones, a single upflow reaction zone, the use of a downflow fixed bed reaction zone instead of the upflow reaction zone, additional polishing zone, for example, a chemical-biological treatment in a biofilter with the addition of PAC and coagulants for the purposes previously described.

The system depicted in FIGS. 36 and 37 can also be used as a sequencing batch reactor with anaerobic-aerobic cycles. In batch mode, the sludge separation means 16 is not required, and an alternative discharge line 17a for the effluent is provided.

The batch system is operated as follows: At the beginning of the cycle, the liquid level in the reactor is at the level of pipe 17a. Gradually, the reactor is filled and the liquid is pumped by pump 47 through selected compartments 1, thus undergoing initial anaerobic treatment. Aerobic sludge originally placed on the top of the anaerobic sections 1 is also involved in the anaerobic cycle. Later, the filling continues and aeration starts. Now, partially treated aerobically, wastewater-is recycled through compartments 1. This constitutes alternating anaerobic-aerobic treatment. After complete filling and additional aeration and anaerobic-aerobic recycle, the treated wastewater is allowed to separate from the settling sludge. Separated water is decanted. The aerobic sludge remains on top of anaerobic compartments. A portion of anaerobic and aerobic sludges is conditioned in sludge conditioner 3. Conditioned sludge is recycled and periodically discharged from the system. Optionally, a portion of the reaction compartments 1 may be aerobic. In such a case, aeration means can be provided in these sections.

The system given in FIGS. 36 and 37, either flow-through or batching, can also be used for sludge digestion.

Systems shown in FIGS. 35, 36 and 37 are examples of a new generic type which can be called combined anaerobic/aerobic system. It combines the properties of the coupled anaerobic/aerobic system (distinct sludges, anaerobic upstream, aerobic downstream; highest sludge concentration in the front section where the waste concentration is the greatest) and the properties of the ASP with facultative anaerobic, anoxic, and aerobic zones but with a single sludge. This combination is achieved by recycling all sludge transferred from upstream sections and grown in the downstream sections (sections 15 in FIGS. 35 to 37) back to the upstream sections (1 in FIGS. 36, 37 and 600 and 1 in FIG. 35), transferring a portion of the sludge from upstream to downstream sections (in FIG. 35 pumping some sludge from conditioners 4 via line 613 to the section 600, and transferring sludge from section 600 down to section 15; in FIGS. 36 and 37, some anaerobic sludge carried up by the flow in compartments 1 is admixed with the sludge in aerobic compartment 15). Accordingly, there is a smaller downflow and a greater upflow of sludges in the new (combined) system, with the resultant counterflow of water (down) and sludge (up) and the excess sludge wastage at the upstream. In such a system, both the water with admixtures in it, and the sludges are exposed to the widest range of environmental conditions, enzymes, ORP, etc., and can be better converted and degraded, while discharged sludge is stabilized.

Figure 38:
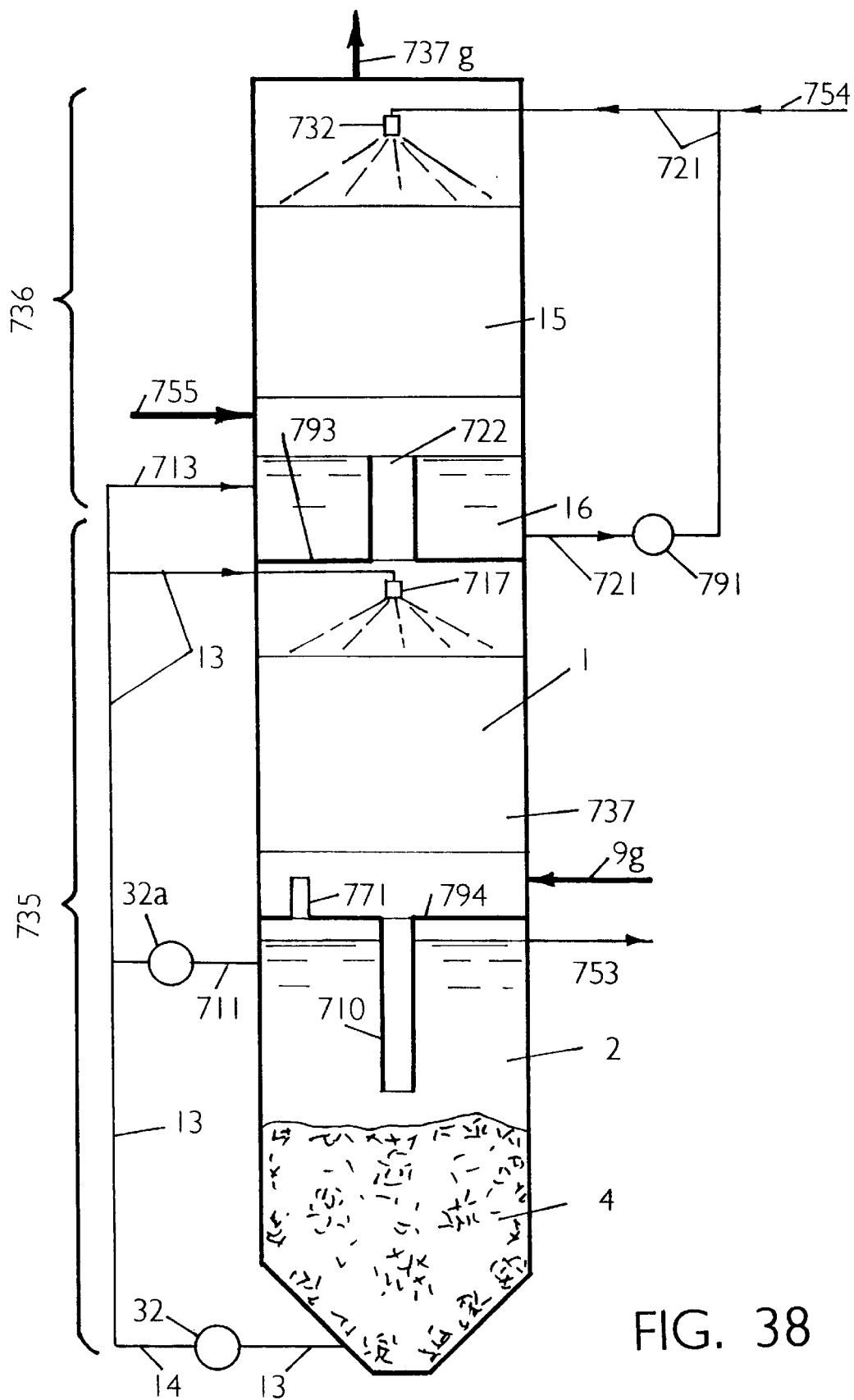
FIG. 38 is an apparatus for gas treatment.

Referring now to FIG. 38, there is shown a system for treatment of gases bearing biodegradable constituents, the biodegradable constituents being in gaseous or particulate form, or both. The system consists of two biological reaction stages: anaerobic stage 735 and aerobic stage 736. Each stage can be made as a biofiltration section, or a packed scrubber. Sludge separators 2 and 16 may be associated with each reaction stage. Gravity separators disposed under the reaction stages are shown in FIG. 38; however, other known separation means as listed above can also be used. A bottom section of the apparatus may be assigned for an optional sludge conditioner 4. As shown in FIG. 38, the entire apparatus, with the exception of auxiliary elements, is assembled in a single column 737, but other arrangements can also be used. The sludge separator 16 is formed by a tray 793, the wall of the column 737, and the wall of the passage 722. The sludge separator 2 is formed by the wall of the column 737, a tray 794 with a pipe 771 for passing gases upstream, and a passage 710 for the mixed liquor. A gas influent line 9g is connected to the bottom section of the reaction stage 1. Line 721 with a pump 791 connects the sludge separator 16 to the top of the reaction stage 736. A means 732, for example a spraying device, is attached to the end of pipe 721 at the top of the reactor stage 736. Lines 711 and 13 with a pump 32a connect a sludge separator 2 to the top of the reaction stage 735. A liquid distribution means 717, for example spraying heads, is attached to the end of pipe 13 at the top of the reaction stage 735. Line 13 connects the sludge conditioner 4 to the spraying device 717. A branch 713 connects the pipe 13 to, the sludge separator 16. Line 14 for sludge discharge is attached to line 13. Line 753 for water discharge is connected to the sludge separator 2 at its top. A pipe 754 is attached to pipe 721 to feed fresh water and reagents, for example, PAC, coagulant salts, supplementary organics, etc. A line 755 for oxygen-containing gas (air, or oxygen, or both) is connected to the bottom of the reaction stage 736. Pipe 737g for discharging the treated gas is attached to the top of the reaction stage 736.

This system is operated as follows: The polluted gas is fed at the bottom of the reaction stage 1 via line 9g and flows upward across the packing. Conditioned anaerobic sludge from the sludge conditioner 4 and a clarified, or partially clarified, anaerobic supernatant from the top of the sludge separator 2 are fed by pumps 32 and 32a via line 13 to the top of the reaction stage 1 and sprayed over the reactor packing by a spraying device 717. The sprayed mixture of anaerobic sludge and supernatant come into contact with the gas fed into the reaction stage 101 and scrub and absorb a fraction of the pollutants from the gas. Biological growth in the reaction stage 1 occurs on the packing (attached growth) and in the suspension. If PAC is fed into the system, biological growth occurs also on suspended PAC particles. Hydrolyzing, acidogenic and methanogenic microorganisms are grown in the reactor stage 1. Other specialized groups of organisms may also be present, particularly sulfate reducers. Organic particulates scrubbed in this reactor are at least partially solubilized by the hydrolyzing organisms, soluble materials are at least partially converted into fatty acids and carbon dioxide, methane, hydrogen, ammonia, and hydrogen sulfide by the acidogenic and other organisms, and fatty acids are at least partially converted into methane and carbon dioxide by the methanogens.

After passing across the packing in the reaction stage 1, the mixed liquor is collected on the tray 794 and flows via pipe 710 into the sludge separator 2. The clarified water in the separator is collected at the top and is partially recycled by pump 32a via lines 13 and 713 to the top of the reaction stage 735, and to the reaction stage 736. The fraction of the clarified water is periodically or continuously discharged via line 735. Make-up water and the above listed reagents are added to the system through the line 754. The settled sludge goes to the sludge conditioner 14 by gravity, where the scrubbed particulates and incompletely digested soluble organics are additionally digested and converted to the final products of anaerobic processes. The gases generated in the sludge conditioner 4 pass through the sludge separator 2, become collected under the tray 794 and are released to the reaction stage 1 via pipe 771.

The conditioned sludge is recycled by pump 32 through lines 13 and 713 to the top of the reaction stage and to sludge separator 16. A portion of the conditioned sludge is discharged continuously or periodically through line 14. After the first stage treatment, the feed gas is transferred through opening 722 to the reaction stage 15 (second treatment stage). At the bottom of this stage, the feed gas is mixed with oxygen-containing gas fed via line 755. The gas mixture flows upward across the packing in the reaction stage 15 and contacts the downflowing aerobic mixed liquor. This mixed liquor is recycled by the pump 791 via lines 721, and distributed over the packing means 732.

Attached and suspended aerobic microorganisms are growing in the reactions stage 15. Residual organics, volatile metabolic products from the previous stage, and ammonia and hydrogen sulfide are additionally absorbed, and removed from the gas by the biomass and water. The bulk of the biodegradable materials are oxidized to carbon dioxide and water, ammonia is partially converted to nitrates and nitrites, sulfides are partially oxidized to sulfites and sulfates. Nitrogen and sulfur are partially formed through the chemical reactions between ammonia, sulfides, and nitrates and nitrites, and sulfites and sulfates. Nitrogen leaves the system with the treated gas via pipe 737g, and sulfur is eventually discharged with the anaerobic sludge. Some mixed liquor overflows through the opening 722 to the reaction stage 1. This constitutes a counterflow of the sludge in the overall system. Moreover, nitrates and nitrites carried down to the reaction stage 1 are used up for oxidation of organics in this stage.

Additional reagents may be placed into the system. Addition of PAC results in adsorption of pollutants from the gas, thus increasing the process rate and efficiency. The PAC will take part in the sludge counterflow and will be used in aerobic and anaerobic reaction steps as previously described. Other reagents can also be used as previously described for the wastewater treatment applications. A specific reagent, source of carbon, or organics, may be needed in the gas treatment systems to improve the process stability at highly variable, and periodic gas loading conditions, or for gases carrying poorly degradable organics. Preferably, nonvolatile organics should be used. Wastewater may also be used as a source of organics.

Figure 39:
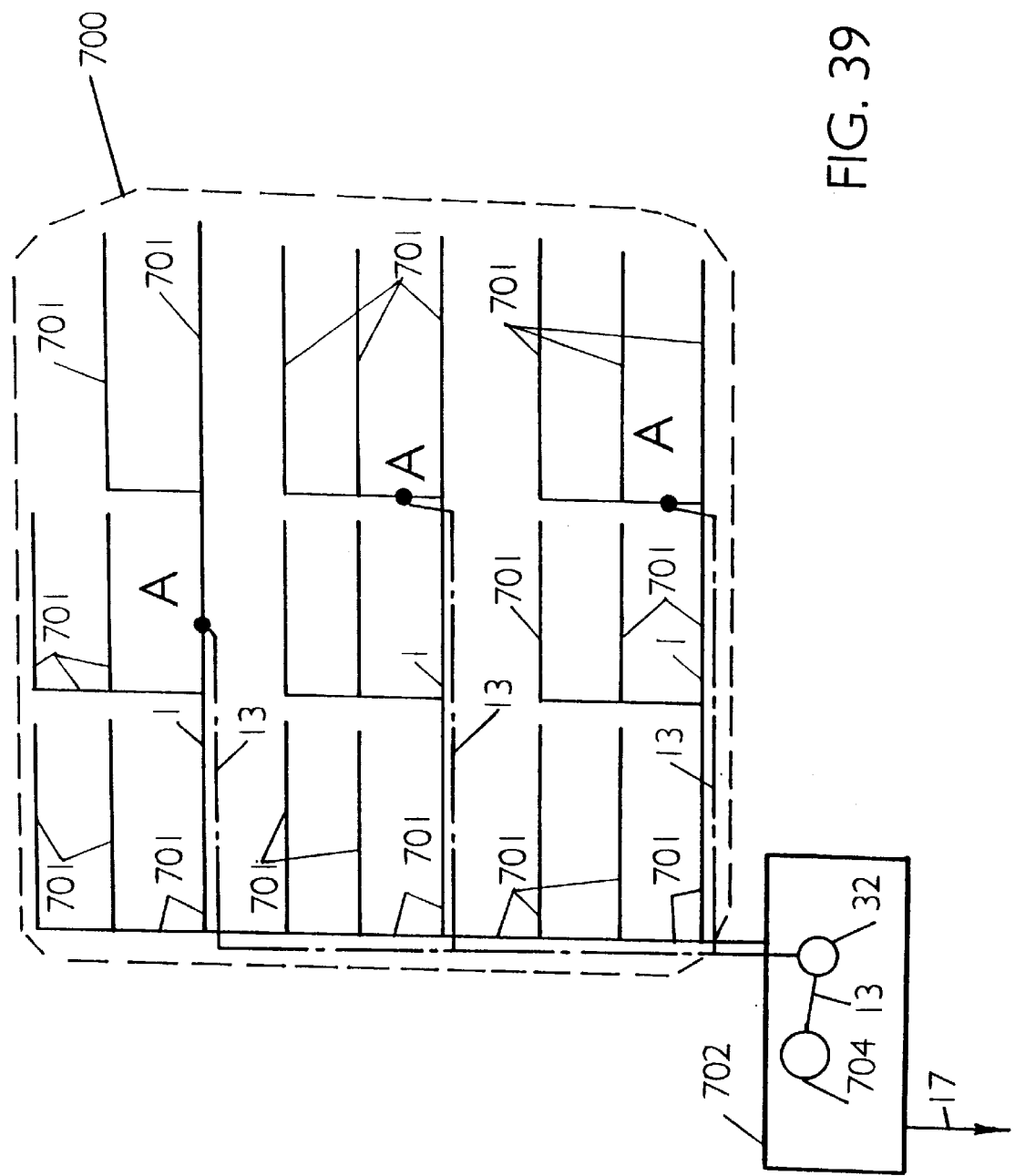
FIG. 39 is a schematic diagram showing the basic arrangement of the wastewater management system with the delivery of the conditioned anaerobic sludge from a wastewater treatment plant.

Referring now to FIG. 39, there is shown a basic system of combined wastewater treatment and transportation. The system comprises the branched network 700 of wastewater collection and transportation pipes and channels 701, and an end-of-pipe treatment plant 702 having units for anaerobic treatment of wastewater or anaerobic sludge conditioning 704, a pumping means 32 and pressure lines 13 for transporting the anaerobic sludge rich in methanogens. The sludge lines 13 are connected to the sewer lines at points A. A treated wastewater outfall 17 is provided at the treatment plant. Detailed structure of the treatment plant is not provided because this information is readily available to those skilled in the art.

The system of FIG. 39 is operated as follows. Wastewater is collected from the waste generators (houses, commercial and industrial establishments) into pipes 701 and is transported by these lines to the treatment plant 702. The methanogens rich sludge is conveyed from the anaerobic treatment or conditioning units 704 by the pumping means 32 via pressure lines 13 and is fed into sewer lines at points A. From this point on, the wastewater-sludge mixture is carried in the pipes 701 downstream.

From the uppermost points in the wastewater network to points A, acidogenic processes are not well developed and just start setting on. Growth of sulfate reducing organisms is also insignificant because they have no good carbon source (fatty acids). Accordingly, methanogenic sludge should not be carried an extra distance to the uppermost point in the network, but preferably should be fed at points A where anaerobic processes become significant. From the points A to the treatment plant, parallel acidogenic and methanogenic processes occur. Feeding methanogens at points A provides rapid conversion and consumption of the fatty acids generated by the acidogens. Accordingly, the sulfate reducers have no food to promote growth. During such biochemical transformations, wastewater becomes at least partially treated, the gases produced have virtually no odorous constituents, and corrosive sulfuric acid is not generated in the pipes.

Optionally, provisions can be made for collecting methane gas generated in the wastewater networks. For example, the manholes on the pipelines 701 can be sealed and gas can be collected from the manholes. This gas can be used for driving gas engines, as a heating fuel, or for other known uses.

As an alternative, trucking of the anaerobic methanogens rich sludge from the unit 704 to points A can be used. The essence and organization of the biological processes in this system modification is the same as has been described elsewhere throughout this application.

Figure 40:
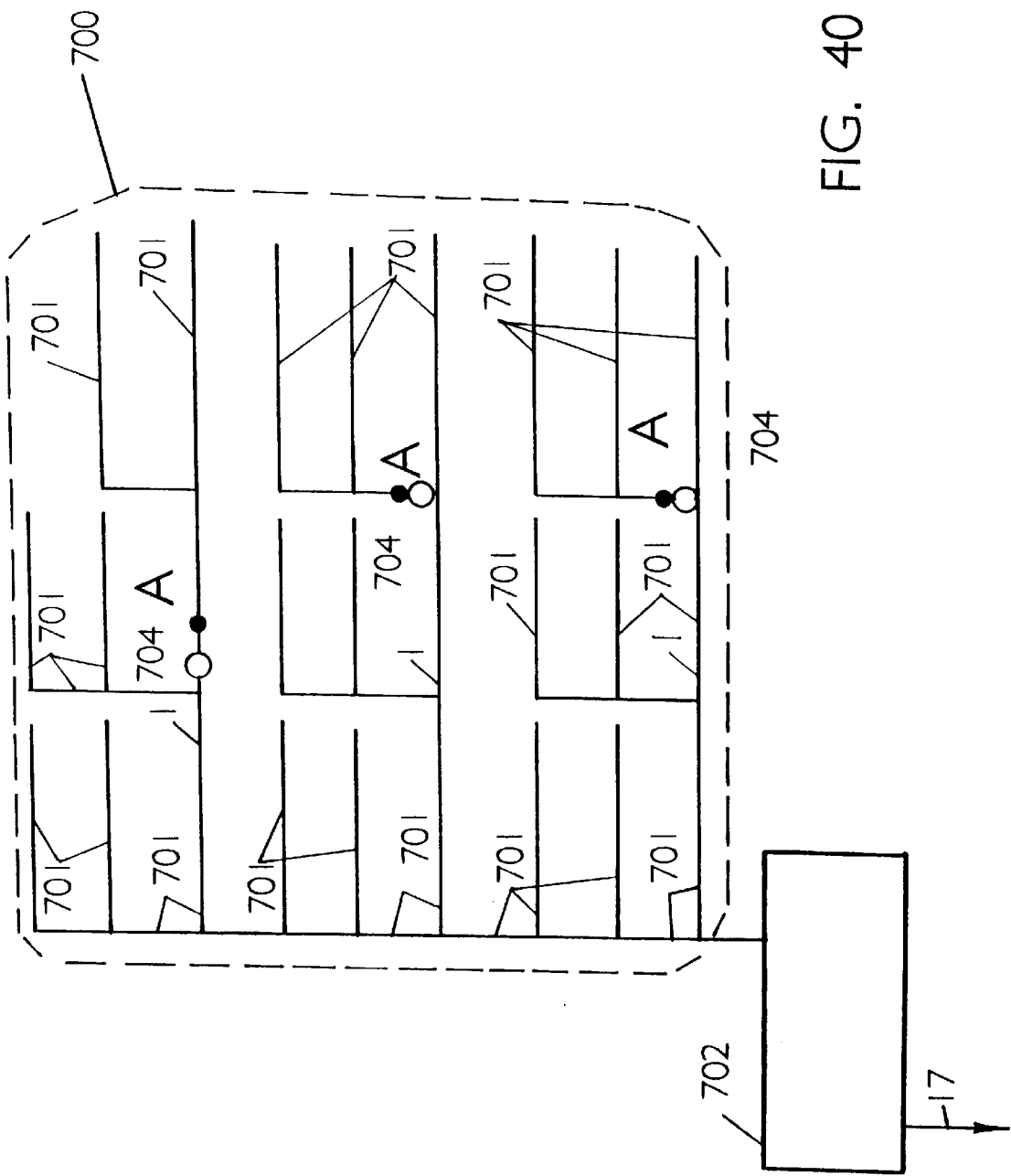
FIG. 40 is a schematic diagram showing a modified form of the system of FIG. 39, the methanogenic sludge generating reactors being installed at the upper reaches of the wastewater networks and using wastewater organics as a source of food.

Referring now to FIG. 40, there is shown another modification of the novel process. The system comprises the branched network 700 of wastewater collection and transportation pipes and channels 701, and an end-of-pipe treatment plant 702. Units for anaerobic treatment of wastewater and sludge conditioning 704 are installed on the pipe networks at points A. A treatment plant 702 is provided at the end-of-pipe. A treated wastewater outfall 17 is provided at the treatment plant.

The system of FIG. 40 is operated as follows. Wastewater is collected from the waste generators (houses, commercial and industrial establishments) into pipes and is transported by these lines to the treatment plant 702. A portion of all wastewater is intercepted from these lines and directed to anaerobic treatment units 704, wherein the methanogens rich sludge is generated as previously described. Thus treated wastewater and excess anaerobic sludge are discharged in the pipes 701. From this point on, the wastewater-sludge mixture is carried in the pipes 701 downstream.

From the uppermost points in the wastewater network to points A, acidogenic processes are not well developed and just are setting on. Growth of sulfate reducing organisms is also insignificant because they have no good carbon source (fatty acids) and the retention time is short. Accordingly, anaerobic treatment and generation of methanogenic sludge need not be carried in the upper reaches of the pipes network. Moreover, there may be not enough wastewater to generate sufficient mass of excess sludge at the upper reaches of the pipes 2. From the points A to the treatment plant, parallel acidogenic and methanogenic processes occur. Feeding methanogens at points A provides rapid conversion and consumption of the fatty acids generated by the acidogens. With such biochemical transformations, wastewater becomes at least partially treated, the gases produced have virtually no odorous constituents, and corrosive sulfuric acid is not generated in the pipes. These gases can be captured from units 704.

Figure 41:
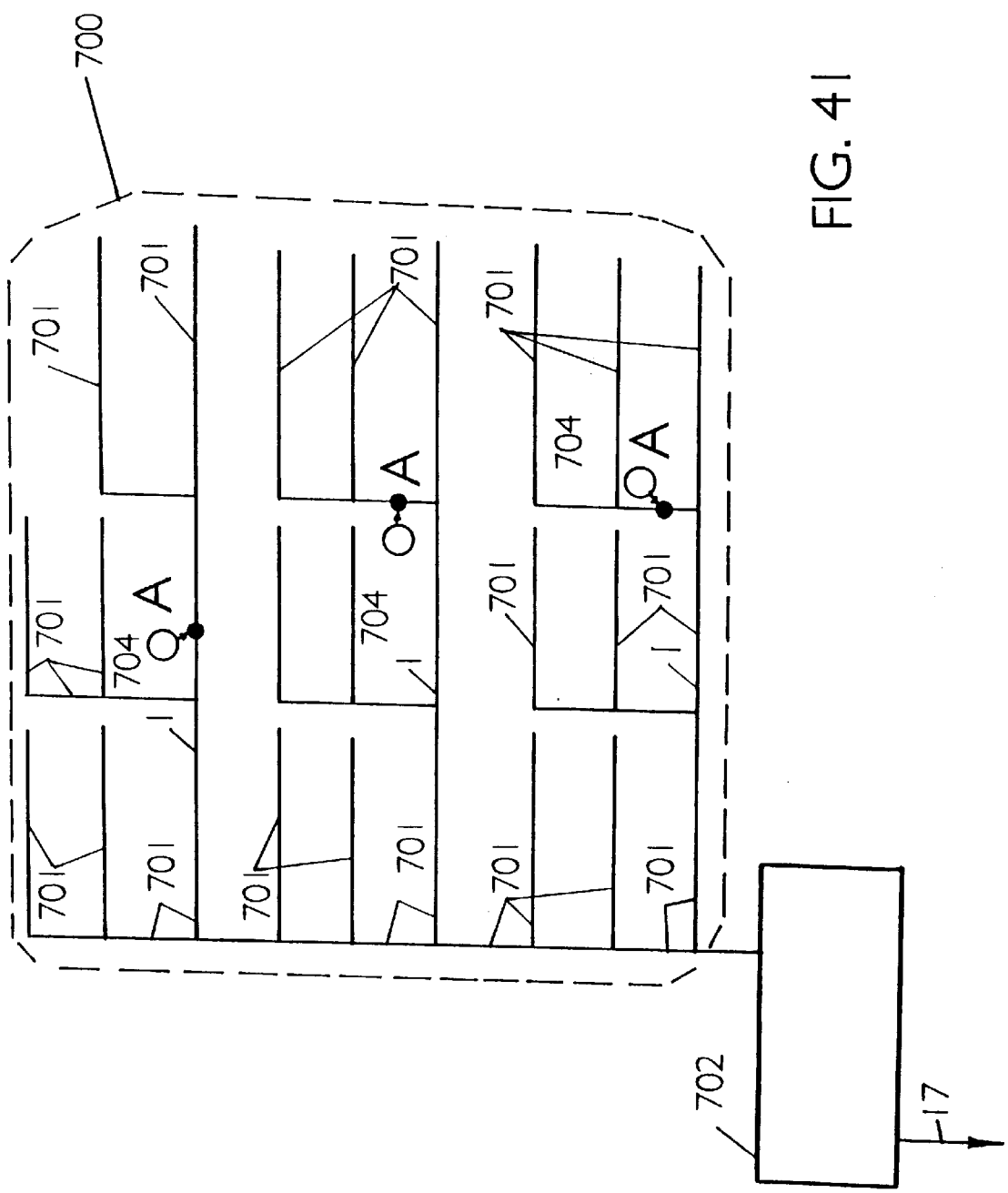
FIG. 41 is a schematic diagram showing a modified form of the system of FIG. 39, the methanogenic sludge generating reactors being installed at the upper reaches of the wastewater networks and using organics of solid or liquid wastewater as a source of food.

Referring now to FIG. 41, there is shown another modification of the novel process. The system comprises the branched network 700 of wastewater collection and transportation pipes and channels 701, and an end-of-pipe treatment plant 702. Units for anaerobic treatment of solid or liquid waste 704 are installed at the pipe network by points A. A treated wastewater outfall 17 is provided at the treatment plant.

The system of FIG. 41 is operated as follows. Wastewater is collected from the waste generators (houses, commercial and industrial establishments) into pipes and is transported by these lines to the treatment plant 702. A stream of solid and/or liquid waste is fed into the anaerobic treatment units 704, wherein the methanogens rich sludge is generated. If needed, water for the units 704 may be provided from the sewerage pipes. Thus treated solid and/or liquid waste is mainly converted into anaerobic sludge rich in methanogens. This sludge is discharged in the pipes 1. From this point on, the wastewater-sludge mixture is carried in the pipes 1 downstream. The rest of the process is the same as previously described.

Units 704 in either process modification may be a conventional anaerobic sludge digestor, or any of the known anaerobic reactors for treatment of wastewater, or an organic stock for gas generation. Preferably, these units shall be anaerobic treatment apparatuses with sludge conditioners as described in the present application. These apparatuses may be provided with means for gas collection and utilization. Combined anaerobic-aerobic apparatuses can also be used.

Multiple units 704 for anaerobic treatment and generation of methanogen rich sludge may be used on all or selected branches of the pipe networks. The number, location and capacity of these units must be determined by balancing the available organic material for the sludge generation and the need in the methanogenic sludge downstream from these units. In case of pumping methanogenic sludge from the treatment plant as illustrated in FIG. 39, multiple points A may be established on all or selected pipeline branches. Units 704 can double for pump stations and flow equalization basins. In the latter case, the capacity of the whole waste management system can be increased.

Figure 42:
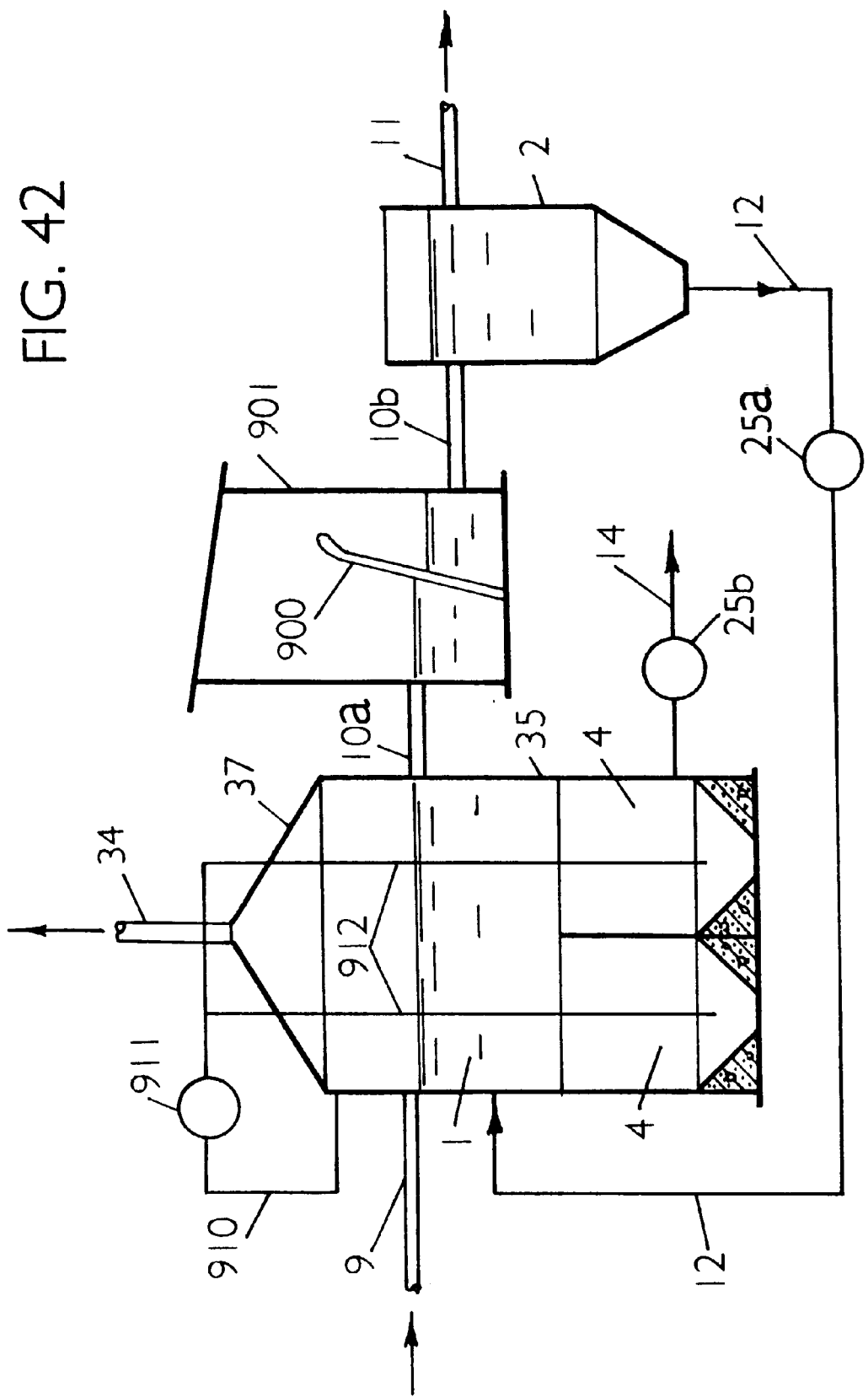
FIG. 42 is a schematic of a use of the anaerobic treatment system at the front end of the treatment plant for removing grit, screening, organics conversion and sludge stabilization and thickening.

Referring now to FIG. 42, there is shown an improvement to a wastewater treatment plant intended for odor control at the front end of the plant. The improvement comprises an anaerobic unit 35 as the first unit at the plant, this unit having an influent line 9 for raw waste. Optionally, a comminutor type on-line means can precede the anaerobic unit. Unit 35 is connected by line 19a to a screen 900, possibly housed in a building 901, and further by a line 101 to a sludge separator 2 (in cases of upgrading, primary clarifiers can be used for sludge separators). Anaerobically treated water is evacuated via line 11. The sludge is pumped from the sludge separator to the unit 35 by a pump 25a via line 12. The unit 35 is similar to that shown in FIG. 8. It has gas line 910, a compressor 911 and lines 912 extending to the pyramidal bottoms for sludge lifting and mixing. Optionally, unit 35 may be open and alternative means can be used for sludge mixing and lifting. Line 14 and pump 25b are provided for discharging excess stabilized sludge from the system.

The operation of the system shown in FIG. 42 is the same as previously described with the exception of screening that is performed not before but after unit 35, wherein odorous constituents are eliminated from wastewater in treatment processes in unit 35.

Figure 43:
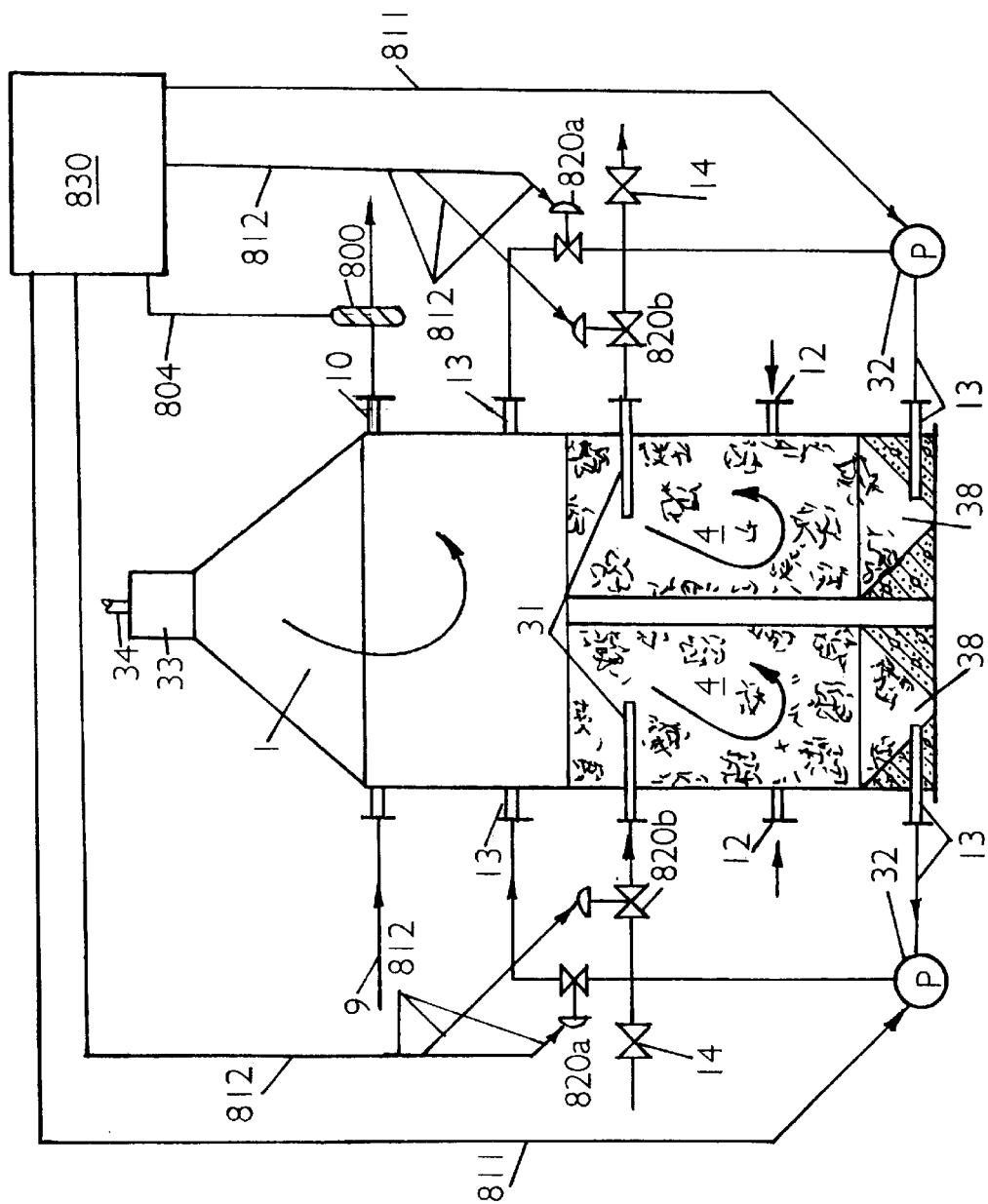
FIG. 43 is a schematic of an automatic control system for apparatus shown in FIG. 8.

The system shown in FIG. 42 can be added with a conventional activated sludge process, or other systems. In many cases, addition of an aerated granular bed filter with or without reagents may be sufficient for the final treatment. Referring now to FIG. 43, there is shown an automatic control system using the embodiment depicted in FIG. 8 as an example. In addition to the elements shown in FIG. 8, there are shown motorized valves 820a and 820b (one valve is energized to open, another is energized to close), a sensing device (probe) 800, preferably a pH meter, or analyzer for fatty acids, or a combination of both, a line 804 for transmitting input signals from the probe 800 to a controller 830, for example, a programmable logic controller or any analog or digital device, and output signal lines 811 and 812 from the controller 830 to the actuation means 820a and 820b, motorized valves, and/or conveying means for conditioned sludge 32, such as pumps.

The control system in FIG. 43 is operated as follows. A variable flow of wastewater (or sludge) with variable concentrations and composition of admixtures enters the reaction zone 1. Due to this variability, the rate of acidogenic conversion changes (increases when the organic loading increases). Accordingly, fatty acids may accumulate in zone 1. This will be indicated by a pH (or acidity) probe 800, and respective signals will be sent to the controller 830. At a preselected set point $X_1$, controller sends signals to actuators 820 and/or 32. When acidity increases (or pH drops), the rate of the conditioned sludge supply from the selected compartment 4 to reaction zone 1 should be increased. This can be achieved by (1) opening of the motorized valve 820b and closing the valve 820a, (2) increasing the pumping rate of a continuously run pump 32, for example by controlling its speed, (3) by increasing the proportion of on/off times for a periodically run pump 32, or (4) a combination of these, or by alternative methods. When acidity deceases (pH rises) to a preselected point $X_2$, controller 830 sends signals to actuators 820 and 32 to reduce the feed rate of the conditioned sludge to the reaction zone 1.

For each compartment 4, the controller 830 computes inventory of the sludge recycled to the reaction zone 1 from the moment of selecting (putting as recycle). The inventory can be computed for the given compartment 4 volume known flowrate produced by pumps 32, and registered timing of operation of pumps 32 and valves 820a and 820b. After a complete turnover of sludge in a selected compartment 4, or some longer time, but insuring the required quality of sludge being recycled, next in que compartment 4 is selected. Periodically, inventory controls must be corrected manually.

Provisions that are standard for all control systems focused on performance and stability are not described here, but the novelty, usefulness, and nonobviousness of the present controls is stressed: The process control by recycling conditioned sludge is possible and very economical due to the following: (1) the use of a partial phase separation between reaction zone 1 (growth of acidogens and supply of methanogens) and sludge conditioning compartments 3 in FIG. 1, or 4 in FIG. 2, or 5 in FIG. 3; and (2) the concentrating (thickening) of the conditioned sludge in the sludge conditioning compartments. Moreover, it is possible to conduct a partial (incomplete) treatment of wastewater by setting $X_1$ value at a level corresponding to a relatively high residual (not consumed by methanogens) content of fatty acids. Such an arrangement is favorable for anaerobic-aerobic combinations, especially with nitrogen removal, wherein a carbon source should be passed to the downstream process steps. Partial treatment without sludge conditioner and automatic controls; would be very unstable because of the highly variable growth rate of methanogens in the reactor. The inventory of conditioned sludge allows for a stable operation of the incomplete treatment by delivering the required quantity of separately cultivated conditioned sludge.

Stabilized incomplete treatment assumes permanent presence of fatty acids in the system. Accordingly sulfur reducers would propagate and hydrogen sulfide would be generated. To avoid the growth of sulfur reducers, the set point $X_1$ can be a variable in accordance with a preprogrammed algorithm in the controller 830: the value of $X_1$ should periodically change from that corresponding to the complete treatment to that corresponding to a lower level of the incomplete treatment than the design level. Concentrations of fatty acids will vary from almost zero at the complete treatment periods to greater than the average design values. However, the average concentrations of fatty acids will be the required concentrations. Using a variable $X_1$ set point, and periods of almost zero fatty acids content, the propagation of sulfur reducers will be suppressed. Small quantities of sulfide generated in such operation will react with the sulfates to form elementary sulfur and water. The current $X_1$ value can be set by using a simple step-wise timing, or any more complex algorithm, for example, an algorithm computing the balance of fatty acids, or a comprehensive pharmacodynamic model can be used. Insuring a process stability in case of the variable $X_1$ value is possible only with the use of a pool of methanogens, reserve alkalinity, and other constituents deliverable on demand from the sludge conditioner.

Figure 44:
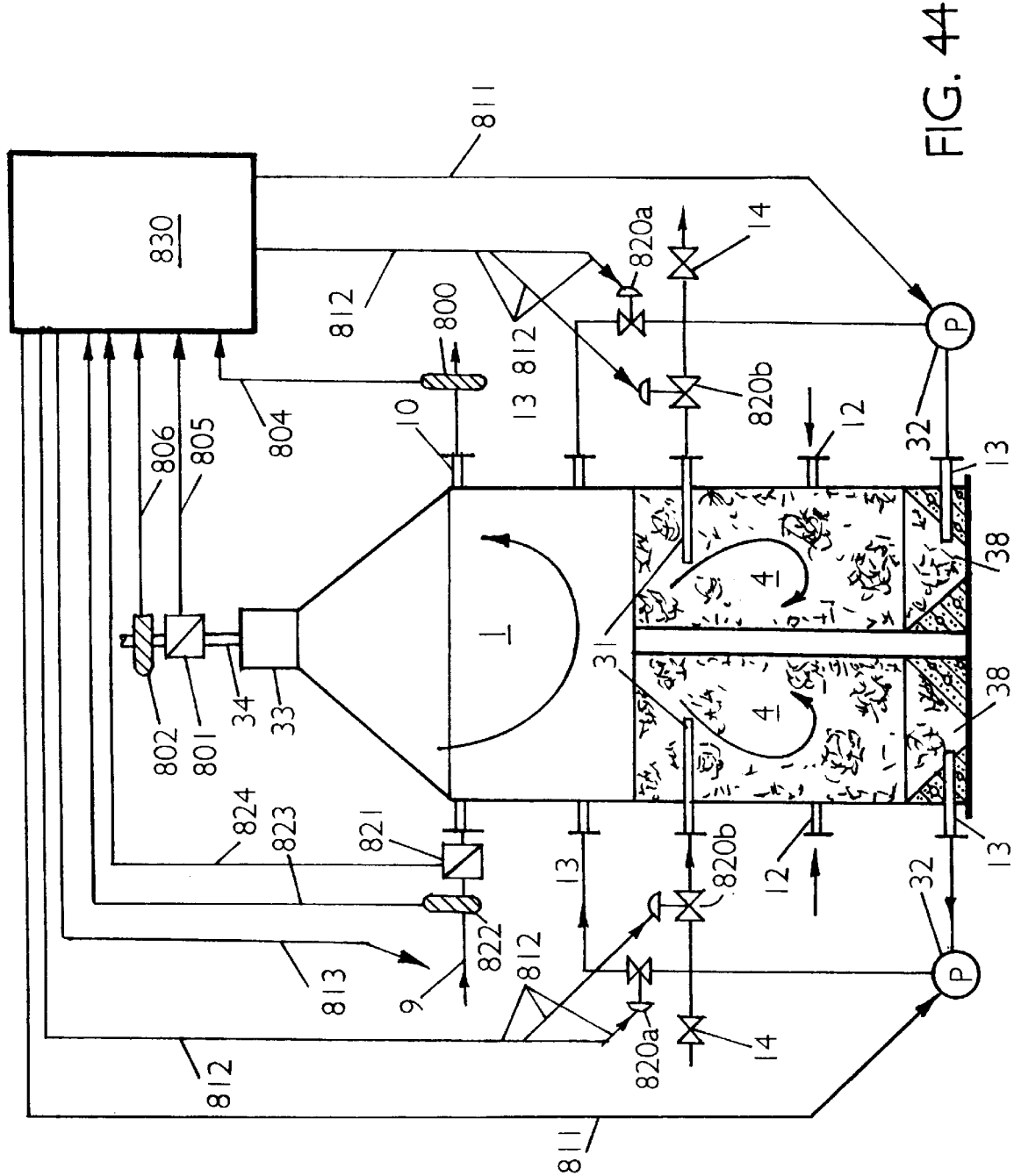
FIG. 44 is another schematic of an automatic system for apparatus shown in FIG. 8.

Referring now to FIG. 44, there are shown additional variants of the control system. The control system is provided with a gas flow meter 801 and gas analyzers 802 for methane (or total hydrocarbons), carbon dioxide and, optionally, for hydrogen sulfide. An additional output signal line 813 from the control means 830 to the feed means (not shown) is also provided. A probe 821 for COD or TOC or both and a flow meter 822 for the feed are optionally provided and connected to the controller 830 by input signal lines 823 and 824. An optional output signal line 813 connects controller 830 with means for controlling the feed flow in the reaction zone 1.

The control system in FIG. 44 includes the procedures related to FIG. 43. These will not be repeated. The gas flow is measured by the flow meter 801, and the ratio $CH_4/CO_2$ is determined by the probe 802. When the ratio $CH_4/CO_2$ decreases and the total gas flow increases, and pH drops, the process in the reaction zone 1 shifts toward the acidogenic phase. The controller 830 increases the recycle rate of the conditioned sludge as previously described. A short term pH drop without noticeable decreases in the $CH_4/CO_2$ ratio is probably caused by a slug of mineral acid. This will be first neutralized by an increase in the conditioned sludge recycle rate. After a predetermined time, if pH is not brought above the set point of $X_1$, the system for feeding strong alkali (not shown) is actuated. The latter is conventional neutralization and is not described here. At a pH above set point $X_2$, the control actions are the same as previously described.

Optionally, COD or TOC probe 821 and the flow meter 822 are used to compute the organic loading rate. The gas flow measured by the flow meter 801 is correlated with the loading rate. When both change proportionally, controller 830 makes a decision to change the conditioned sludge recycle rate based on probes 800 band 802, but not 801.

Specific cases such as an increase in the organic loading rate and decrease in the gas production rate most probably signify a toxic slug in the feed. This can be controlled on a short term basis by increasing the conditioned sludge recycle rate. If the condition persists, other measures such as adding PAC, reducing feed rate, or others should be initiated. This can be done by using the output signal line 813 to actuate the respective control means (not shown). This is also conventional technology, so no further discussion should be required.

Figure 45:
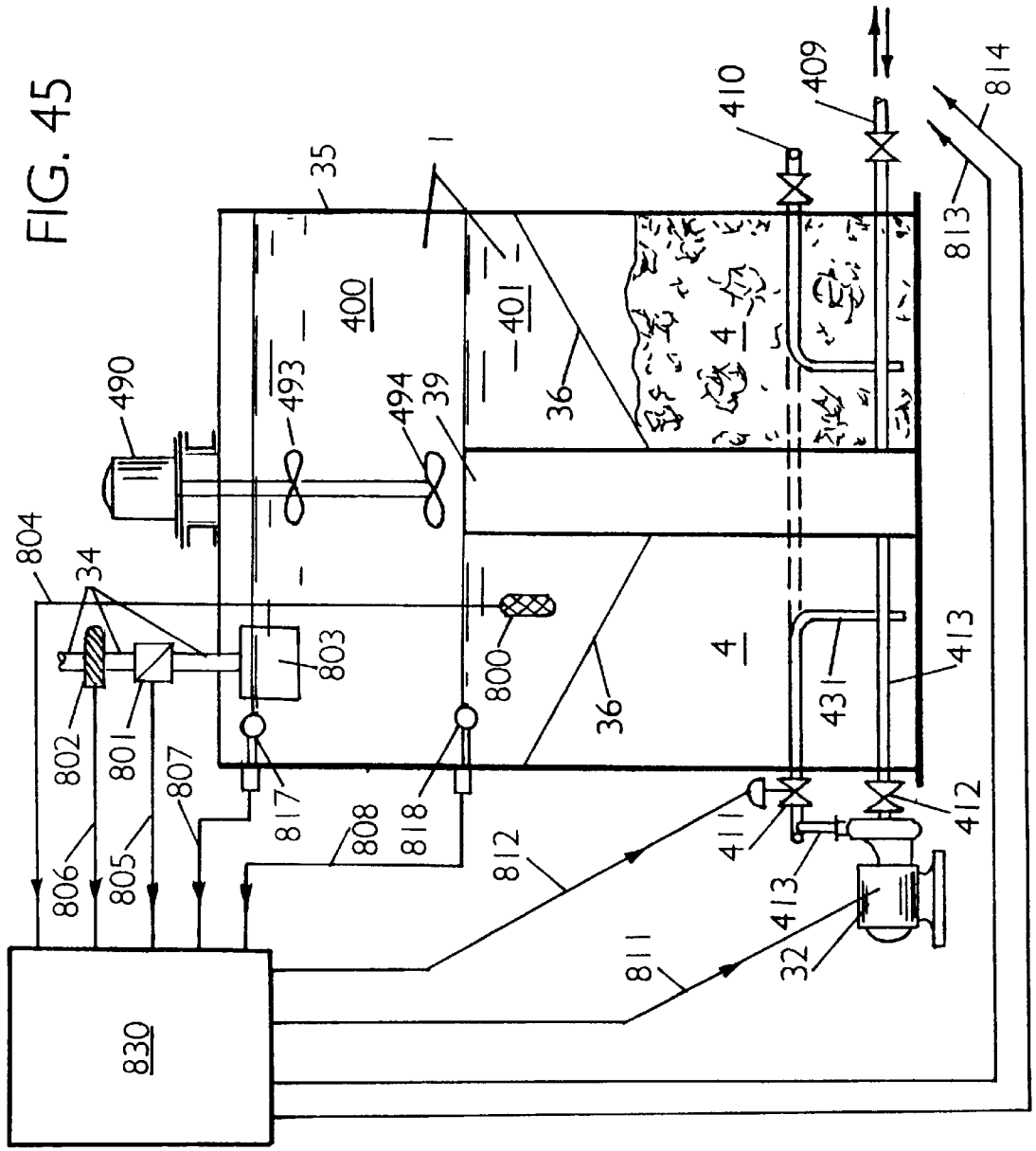
FIG. 45 is a schematic of an automatic control system for apparatus shown in FIG. 18; and, FIG. 46 is a schematic of an automatic control system for apparatus shown in FIG. 35.

Referring now to FIG. 45, there is shown a control system for a sequencing batch reactor as depicted in FIGS. 18 and 19. Similarly to the two previous embodiments, the control system includes a pH (or acidity) probe 800 with signal line 804 going to the control means 830, and gas flow meter 801 and gas analyzer 802 with lines 805 and 806. Units 801 and 802 are installed on a pipe 34 attached to a bell 803 for collecting the off gas for measuring gas rate and composition. Lines 811 and 812 connect the controller 830 to actuators 32 (pumps) and 411 (motorized valves). This portion of the system is operated during the batch cycle as previously described but with the objective to minimize the batching time by providing an adequate supply of methanogens during the cycle.

The system shown in FIG. 45 is also equipped with level indicators for minimum 818 and maximum 817 levels, and respective input signal lines 808 and 807. Output signal lines 813 and 814 are provided for actuating the feed means (not shown, may be a pump) and the discharge means (not shown, may be a motorized valve). When the gas rate at the end of the batch process drops to a predetermined rate, the settling process is initiated by stopping the sludge recycle pump 32. After a predetermined time, a signal from the controller 830 to the discharge means is sent via line 814 and treated wastewater is discharged to the level of the probe 818. At this moment, a signal from the probe 818 goes via line 808 to controller 830, and signals from controller 830 go to the discharge means (via line 814) to stop discharging, and with a small delay via line 813 to the charging means to start pumping the next batch. Simultaneously, the pump 32 is actuated. When the water level reaches the probe 817, signal lines 807 and 813 and the controller 830 are used to stop the charging means.

It is clear from the discussions of embodiments given in FIGS. 43, 44, 45 that the distinct and principal new feature of the novel control system is in sensing the phase shift (trend towards more acidogenic or excessively methanogenic conditions) and correcting it by changing the conditioned sludge recycle rate. Various sensing devices or combination of devices can be used for indicating and measuring the phase shift: pH meters, titrometers, oxidation-reduction potential (ORP) electrodes, gas probes for $CO_2$, $CH_4$, $H_2$, $H_2S$, and other means. This fundamental principle is used in the simplest complete treatment systems and in a more sophisticated incomplete treatment systems with variable regimes of the fatty acids released downstream.

Referring now to FIG. 45, there is shown an automatic control system for the process embodiment depicted in FIG. 35, which is a combined anaerobic-aerobic system. The anaerobic portion of this system is depicted in FIGS. 15, 16, and elements Of the control system are shown in FIGS. 44 and 45. Discussions of the described elements will not be repeated. Additional elements of the control system include sensors 861 (ORP, $O_2$, $NO^x$) for measuring phase shifts between the aerobic organics transformation and nitrification, and a sensor 862 for the sludge concentration in the section 15. These sensors are connected by the input signal lines 865 and 866 to the control means 830. Other sensors and elements used in known prior art systems (for example, air flow meters) may also be used, but are considered trivial and are not described herein. Motorized valves 843 and 850 are provided on air lines supplying air to the airlift 470 and to the aerators 217. Motorized valves 841 and 842 are installed on lines lib and hla for conveying the clarified anaerobic effluent to sections 15 and 600. Motorized valves 844, 845 and 846 are installed on the effluent feed branches 9, 609 and 119 going to the anaerobic reactor 1, and sections 600 and 15. These valves are connected to the control means 830 by the output lines 874, 875 and 876. Motorized valves 820 and 843 are installed on the sludge recycle lines and are connected via lines 812 and 873 to the controller 830. Motorized valves 847 and 848 are provided on the mixed liquor lines 610 and 631 leading from the airlift 470 to the anaerobic reactor 1 and the section 600. These valves are connected to the control means 830 by the output signal lines 877 and 878.

Figure 46:
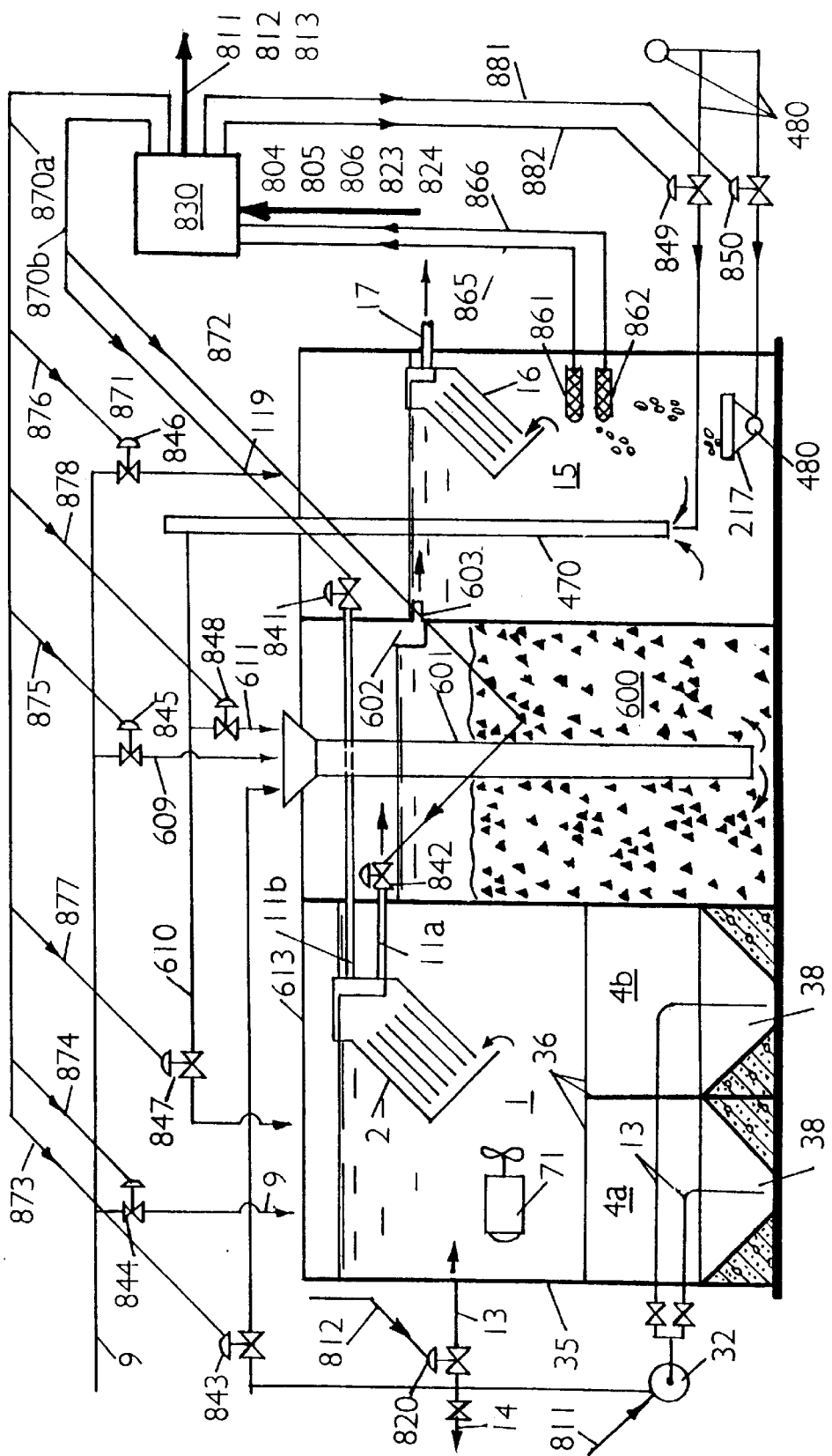

The control system shown in FIG. 46 is operated as follows. The anaerobic section comprising the reactor 1, sludge conditioner compartments 4, and associated means is operated and controlled in the regime of incomplete treatment as has been previously described. That description will not be repeated. The anaerobically treated wastewater from the sludge separator 2 is split into two portions, one directed by line 11a in the section 600, and the other is conveyed into section 15. Both portions of the flow carry fatty acids and other aerobically degradable constituents, and also a residual nonbiodegradable fraction. These flows also carry nitrogen compounds, predominately as ammonia and organic nitrogen. In section 15, nitrogen is largely converted into nitrites and nitrates. Recycle of the mixed liquor from the section 15 in the reactor 1 and the section 600 causes nitrites and nitrates to be reduced to nitrogen. Several reduction mechanisms are operative: Biological denitrification, and chemical reaction with ammonia, both resulting in elemental nitrogen. During denitrification, especially in section 600, toxic and recalcitrant organics are oxidized. Reaction with ammonia causes a greater removal of nitrogen. Nitrification and denitrification require a carbon source. In this case the carbon source is the fatty acids and other products of incomplete treatment in reactor 1. Accordingly, the objective of the automatic control system is to provide balanced nitrification and denitrification—chemical nitrogen removal. This control is provided by the three interacting loops:

(1) nitrification-denitrification/chemical reaction loop,
(2) incomplete anaerobic treatment loop, and
(3) fatty acid displacement and anaerobic sludge advance loop.

The nitrification-denitrification loop is operated-as follows. A probe 861 measures $NO_X$ concentration and sends a signal via line 865 to the controller 830. If the measured value exceeds $Y_1$, the recycle rate of mixed liquor from the section 15 to the section 600 is increased by the command from the controller 830 by increasing airlift pumping rate via feeding more air (greater opening of valve 849), or by greater opening of the valve 848, or by both.

Simultaneously a proportional increase in the supply of the fatty acids and other organics is effected by recycling a greater flow of mixed liquor from the section 15 to the reactor 1 via a greater opening of valve 847. A greater flow of mixed liquor into reactor 1 displaces larger amount of fatty acids (as needed for denitrification) and brings a greater mass of ammonia (as needed for chemical nitrogen reduction). The response for this action is fast because this is a low inertia hydraulic process.

Simultaneously with the increase in the fatty acids displacement rate, the already described control of the incomplete anaerobic treatment is reset towards producing more fatty acids. This process has already been discussed. Such a reset will not cause excessive acidification of the reactor 1 content because of the bicarbonate buffering due to the recycled mixed liquor and denitrification of $NO_X$ in this liquor. When the set point for $NO_X$ in the section 15 reaches $Y_2$ (low level), all corrections are stepped down.

The system should also have conventional controls for aeration air supply and the solids inventory. This is not described here.

It follows from the description provided here that the novel anaerobic treatment method affords stable operation and control of the interrelated anaerobic-aerobic treatment system by the use of multiple but interrelated control loops and subsystems. In view of the above and foregoing description and discussion, it will be understood that the present invention provides waste management and treatment systems that are great improvements over the prior art systems. In the systems of the present invention, optionally, technical oxygen or oxygen-enriched air can be used in aerobic conditioning steps. In addition to supporting aerobic processes, oxygen derived from any source will produce heating of the sludge, and the heat can be beneficial in all conditioning steps: the biological growth and matter transformation, and chemical processes will be faster; and, the reduced water viscosity will accelerate solid/water separation.

Anaerobic process step can be used for removing heavy metals from the sludge. Under aerobic conditions, these metals solubilize due to oxidation of sulfides and can be removed by separating some water with metals from the sludge. A step of sludge heating by external means can be also provided.

The sludge conditioning step can be further enhanced by the use of reagents, for example sulfur-bearing materials for immobilization of heavy metals in the form of sulfides, and aluminum or iron salts for phosphorus and hydrogen sulfide control, and additional feed of organic waste. Organic solid waste or concentrated liquids, with or without water content, can also be fed into the conditioning steps for the purposes of treating these materials and enhancing sludge conditioning. These materials will also provide a mass for retaining specific constituents of wastewater, particularly slow and poorly degradable and toxic organics, and heavy metals. Simultaneously, combustible gas and fertilizer (biological solids with high nutrients and soil conditioning organics) can be produced. If oxygen is used in the sludge conditioning steps, heat can also be produced and utilized.

The conditioning process steps fulfill three major functions. First, a consortium of microorganisms and pools of (a) chemical compounds, (b) alkalinity reserve, (c) nutrients and micronutrients, and (d) enzymes generated by various types of microorganisms can be cultivated and formed in sludge conditioning steps. Second, the sludge can be cleaned from undesirable constituents, for example, heavy metals, and excessive amount of nutrients. Third, the constituents of wastewater which cannot be sufficiently treated and transformed in the reaction steps (slowly and poorly degradable and toxic) but can be incorporated in the sludge in the reaction step, for example by adsorption, biosorption, flocculation and coagulation with anaerobic sludge, are treated and largely transformed into the target final treatment products (gas, biological solids, water) in the sludge conditioning steps due to prolonged retention time and favorable conditions (temperature, mixing, chemical environment) in the sludge conditioning zone.

The functions of sludge conditioning are not separated from reaction steps in the known technologies, and therefore cannot be performed in a controllable way. The sludge components necessary for the anaerobic treatment cannot be formed in conventional systems, or can be only partially formed at longer retention times. The balance between the necessary components is difficult to maintain because there are no specifically assigned steps for cultivating and producing these components. Recycling of the intentionally and specifically conditioned sludge in the anaerobic reactor provides the components necessary for the anaerobic treatment of wastewater. Moreover, sludge conditioner holds a large sludge mass sufficient for process control.

The single most important conditioning effect is provided by cultivating methanogenic organisms in the conditioning process step. The growth rate of methanogens is very low as compared to acidogenic organisms. Accordingly, the retention time must be very long to maintain both acidogens and methanogens in the anaerobic reactor. This is especially difficult at low substrate concentration, because the growth and accumulation of methanogens becomes extremely slow. In systems with the sludge conditioner, methanogens are grown at a high substrate and sludge concentration in a small volume conditioner. Concentrations in the sludge conditioner are controllable independently of the regimes in the anaerobic reactor. Enzymes generated by methanogens and capable of converting fatty acids are also produced in the conditioning process step. When wastewater influent is fed in the anaerobic reactor, the fast growing acidogenic organisms rapidly propagate, establish themselves at a sufficiently high concentration and produce fatty acids. The conditioned sludge fed into this reactor brings methanogenic organisms and enzymes previously generated by these organisms at high concentrations (which can be controlled by the design and by an operator). Fatty acids generated by acidogens are rapidly consumed by the recycled conditioned sludge rich with methanogens. Due to the fatty acids consumption by methanogens, the sulfur reducing organisms can be controllably deprived of the carbon source, so they will not grow, and hydrogen sulfide will be produced in very small concentrations. Partially, organics in the anaerobic reactor are adsorbed in the biological flocks of sludge, suspended solids are flocculated and coagulated by the biological sludge. The sludge loaded with these organics is separated from the reactor effluent and undergoes the next round Of conditioning, when the organics are largely decomposed and methanogens are cultivated. This sludge management strategy provides advantageous conditions for treatment of low strength waste, for degradation of suspended solids, for degradation of slowly and poorly degradable organics, and toxic organics. It also insures the stable presence of acidogenic and methanogenic organisms in the anaerobic reactor. The conditioned sludge contains substantial amounts of bicarbonates which provide good pH buffering. This buffering, due to the recycled conditioned sludge and the uninterrupted presence of methanogens, precludes acidification of the reactor contents.

The propagation, accumulation, and retention of methanogens in the sludge conditioner facilitates rapid start up of anaerobic systems. Systems with sludge conditioners can be started in weeks, or a few months.

Massive toxic shocks affect only the biomass present in the reactor at the time of the slug. The bulk of the sludge inventory is stored off-line in the sludge conditioner, and therefore is spared from poisoning.

Reduction of sulfur bearing species, for example, sulfates or organics having sulfur, results in controllable formation of sulfides. Most heavy metals form poorly soluble sulfides; therefore, heavy metals can be precipitated and incorporated into sludge as salts of sulfides. If the sulfur content in the original wastewater influent is deficient, sulfur-containing reagents can be added to the reactor, or to the sludge conditioner. For example, the following reagents can be used: elemental sulfur, sulfuric acid, polysulfides, aluminum sulfate. These reagents will not increase the total dissolved solids (TDS) of the effluent, or will increase it only slightly. Other reagents, for example sodium sulfide or sodium sulfate, can also be used. However, these salts will increase the TDS more significantly. Sulfide can be generated in a separate section so that clean gases are still produced in the system.

The use of aluminum sulfate is also beneficial for removal of phosphates (a nutrient) in the form of poorly soluble aluminum phosphate, and for coagulation of suspended solids and biological solids in the reactor, which can be helpful for the separation step. Virtually all aluminum will be incorporated in the sludge.

If the contents of the sludge conditioner are heated, methanogens will grow faster. Recycle of thus conditioned sludge and associated enzymes into the anaerobic reactor will support a rapid degradation of fatty acids generated by the action of the acidogens, the organisms growing relatively fast even at submesophilic temperatures. Accordingly, the wastewater can be treated at low temperatures. As an option, the sludge heating can be provided by aerobic treatment of a portion or all the sludge being conditioned. Use of oxygen or oxygen-enriched air is helpful for reducing the heat loss by eliminating the heating of the nitrogen in the air. Combined aerobic-anaerobic sludge conditioning will also accelerate the sludge conditioning process and may be helpful in degrading certain compounds when oxidation and reduction reactions are useful. The aerobic treatment stage can either precede the anaerobic conditioning stage, or be parallel to the anaerobic stage with sludge being fed from the anaerobic stage to the aerobic stage and recycled after-heating, back to the anaerobic stage. A portion of the heat generated in the aerobic stage can be transferred to the anaerobic stage by the e of heat exchangers. Excess heat may be utilized for purposes other than waste treatment.

Removal and degradation of slowly and poorly degradable and toxic constituents can be further enhanced by adding adsorbents, particularly powdered activated carbon (PAC), to the wastewater influent or to the reactor, or to the sludge conditioner. PAC also improves the performance of the sludge separation step. Organics adsorbed on the PAC are retained in the system for a very long time. Moreover, the mobility of adsorbed organics between the water and the sludge phases is very limited. Accordingly, a high degree of transformation can be achieved even for slowly and poorly degradable and toxic organics. Such organics may include surfactants, dyes, and solvents, including halogenated solvents. In many industrial wastewater treatment systems, such organics are discharged periodically or occasionally. In order to keep the sludge adapted to such organics, a microfeed of such organics may be provided continuously.

Usually an anaerobic treatment system is a part of a wastewater treatment plant. Interconnections and interdependencies between unit processes and operations in the entire system should be considered when improving separate treatment processes. A novel method of improving hydraulic stability of anaerobic reactors includes the steps of feeding a variable flow of wastewater influent and a constant or variable flow of recycled water (after a given treatment unit, or after one or several subsequent units) into a fluid flow control box and discharging a constant flow from the flow control box. The discharge flow is equal to or greater than the maximum design flow of the wastewater influent. At any time, the sum of the feed to the control box is equal to, or greater than, the maximum design flow of the wastewater influent. The excess of the recycle feed to the control box is discharged to the point from which it was taken for recycle. If needed, other recycle flows, for example, recycle of activated sludges, and feed of reagents can be considered to make up a constant flow rate. This method insures a constant flow rate through the treatment units. Accordingly, operations of suspended sludge blanket reactors or clarifiers, settling tanks, filters, and other processes sensitive to the flow variations and surges are completely stabilized. In addition to hydraulic stability, recirculation of water produces equalization of concentrations of admixtures and sludge. Moreover, recirculation of water into an anaerobic reactor after, for example, an aerobic treatment with nitrification will reduce the nitrates and nitrites in the recycled portion of water. Aerobically treated water is usually rich in bicarbonates. The reduction of nitrates and nitrites and feeding of bicarbonates will increase alkalinity in the anaerobic reactor and reduce pH variations. Equalizations of flows, concentrations of admixtures and concentrations of sludge will improve stability of the biological consortia in the system.

Removal of slowly and poorly degradable and toxic organics, and also heavy metals, can be further improved by the use of a multiple stage anaerobic system with sludge conditioning steps.

Such a system will also be able to increase the efficiency of organics removal as determined by COD or BOD. Preferably, the sludge from the downstream stages is used in the upstream stages. The same or different conditioning methods can be used in different stages. The improved removal of specific constituents is due to counterflow of water and sludge. In the first stage, the sludge meets specific constituents and removes the bulk of them. This sludge is gradually discharged from the system. In the second stage, the wastewater with a significantly depleted amount of specific constituents is contacting a cleaner sludge (sludge grown in the second stage on wastewater with depleted specific constituents). This sludge removes the bulk of the residual specific constituents in the wastewater. Accordingly, removal of specific admixtures is improved in multistage systems. Some process steps and treatment units for sludge conditioning can be shared by various process stages.

In the present invention, the improved sludge management strategy is provided by splitting the growth of acidogenic and methanogenic organisms into two separate and distinct steps: acidogens are grown in an anaerobic reactor in which the influent material is subjected to the simultaneous treatment step, while the methanogenic organisms are grown and accumulated in large mass off-line (not necessarily on the sludge recycle line) in a long retention time and high sludge concentration reactor (conditioner), and fed in the quantity instantly needed into the said reactor to effect the second phase conversion of the influent material simultaneously and within the same space with the first process phase. This improvement results in the novel mainstream system having two different and separately grown but interactively managed sludges. The principle can be broadly applied for systems involving various groups of organisms, e.g. as previously described, aerobic and methanogenic anaerobic. It is believed that such systems and sludge management strategies have never been described in patent or other literature, or otherwise disclosed.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

What is claimed is:

1. A method of wastewater treatment in a pipe network for collecting and transporting wastewater comprising the step of feeding conditioned sludge in the said pipe network, whereby the said conditioned sludge comprises organisms selected from the group consisting of nitrifying organisms, aerobic organisms, facultative organisms, anaerobic organisms, methanogenic organisms, and combinations thereof.

2. A method of wastewater treatment as claimed in claim 1 and further providing a wastewater treatment plant, wherein the said conditioned sludge is generated at said wastewater treatment plant.

3. A method of wastewater treatment as claimed in claim 1 and further providing a step of generating said conditioned sludge from said wastewater at the said pipe network.

4. A method of wastewater treatment as claimed in claim 1 and further providing a step of generating said conditioned sludge from solid or liquid materials outside the said pipe network.

5. A method of wastewater treatment as claimed in claim 1, wherein combustible gas is produced.

6. A method of wastewater treatment as described in claim 5 wherein the said gas is handled in a step selected from a group consisting of discharge of the said gas to the atmosphere, collection and incineration of the said gas, collection and utilization of the said gas, and combinations thereof.

7. A method of wastewater treatment as claimed in claim 1, wherein said step of providing the conditioned sludge is selected from the group consisting of transporting said conditioned sludge via pipe lines, trucking said conditioned sludge, and combination thereof.

8. A method of wastewater treatment as claimed in claim 1 wherein the said conditioned sludge comprises organisms selected from the group consisting of nitrifying organisms, aerobic organisms, facultative organisms, anoxic organisms, anaerobic organisms, methanogenic organisms, and combinations thereof.

9. A method of wastewater treatment as claimed in claim 1 wherein the said organisms are selected from the group consisting of attached growth organisms, suspended growth organisms, organisms attached to particulate materials, organisms forming granular sludge, and combinations thereof.

10. A method of wastewater treatment as claimed in claim 1 wherein the said wastewater includes constituents of pollutants and the said treatment is controlling the said constituents of pollutants in the said wastewater in the said pipe network, whereby the said pollutants are selected from the group consisting of BOD, COD, recalcitrant organics, toxic organics, heavy metals, nutrients, and combinations thereof.

11. A method of wastewater treatment as claimed in claim 1 wherein the said treatment is controlling odors in the said pipe network.

12. A method of wastewater treatment as claimed in claim 1 wherein the said treatment is controlling corrosion in the said pipe network.

13. A method of wastewater treatment as claimed in claim 1 wherein the said conditioned sludge is provided at a controllable feed rate.

14. A method of wastewater treatment as claimed in claim 13 wherein the said controllable feed rate is selected from the group including manual controls, automatic controls, and combinations thereof.

15. A method of wastewater treatment as claimed in claim 14 wherein the said automatic control comprises steps of measuring the wastewater characteristics with at least one sensing device, determining the control action with the use of a controller, and applying the said control action to correct the feed rate of the said conditioned sludge with the use of at least one actuator.

16. A method of wastewater treatment as claimed in claim 1 wherein the said conditioned sludge is provided from at least one sludge conditioning unit, the capacity of the said sludge conditioning unit is balanced with the need in the conditioned sludge in the said pipe network.

17. A method of wastewater treatment as claimed in claim 16 wherein the said sludge conditioning unit is selected from the group consisting of anaerobic section, aerobic section, and combinations thereof.

18. A method of wastewater treatment as claimed in claim 1 wherein the said conditioned sludge is additionally provided with reagents selected from the group consisting of nutrients, sulfur bearing reagents, coagulants, neutralizing agents, adsorbents including powdered activated carbon, oxyions including nitrite and nitrate, liquid or solid organics of plant, animal, or fossil origin, vitamins, biostimulators, microquantities of specific pollutants, and combinations thereof.

19. A method of wastewater treatment as claimed in claim 3 wherein the said conditioned sludge is produced from the said wastewater intanks provided at the said pipe network.

20. A method of wastewater treatment as claimed in claim 1 wherein the said conditioned sludge is provided in a concentrated form.

* * * * *